United States Patent
Takano

(10) Patent No.: US 10,306,626 B2
(45) Date of Patent: May 28, 2019

(54) DEVICE

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 159 days.

(21) Appl. No.: 15/501,027

(22) PCT Filed: Aug. 4, 2015

(86) PCT No.: PCT/JP2015/072150
§ 371 (c)(1),
(2) Date: Feb. 1, 2017

(87) PCT Pub. No.: WO2016/047279
PCT Pub. Date: Mar. 31, 2016

(65) Prior Publication Data
US 2017/0223707 A1   Aug. 3, 2017

(30) Foreign Application Priority Data
Sep. 25, 2014   (JP) ................. 2014-194970

(51) Int. Cl.
*H04W 72/04*   (2009.01)
*H04W 16/14*   (2009.01)
(Continued)

(52) U.S. Cl.
CPC ....... *H04W 72/0446* (2013.01); *H04W 16/14* (2013.01); *H04W 24/08* (2013.01);
(Continued)

(58) Field of Classification Search
CPC .......... H04W 72/0446; H04W 72/005; H04W 56/001; H04W 24/08; H04W 16/14;
(Continued)

(56) References Cited

U.S. PATENT DOCUMENTS

2004/0053622 A1* 3/2004 Nakakita ............. H04L 63/0428
                                                            455/450
2009/0122765 A1   5/2009 Dimou et al.
(Continued)

FOREIGN PATENT DOCUMENTS

JP   2006-94001      4/2006
JP   2008-532393 A   8/2008
(Continued)

OTHER PUBLICATIONS

International Search Report dated Sep. 15, 2015, PCT/JP2015/072150 filed Aug. 4, 2015.
(Continued)

*Primary Examiner* — Kiet Tang
(74) *Attorney, Agent, or Firm* — Xsensus LLP

(57) ABSTRACT

[Object] To enable a terminal device to more easily maintain synchronization for communication of a cellular system in a frequency band shared between the cellular system and a wireless LAN.
[Solution] There is provided a device including: a communication processing unit configured to perform communication of a cellular system in a frequency band shared between the cellular system and a wireless LAN within a first period and stop the communication of the cellular system in the frequency band within a second period. The first period is one or more subframes including a subframe in which a synchronization signal of the cellular system is transmitted, and the second period is one or more other subframes not including the subframe in which the synchronization signal is transmitted.

13 Claims, 35 Drawing Sheets

(51) Int. Cl.
  *H04W 36/20* (2009.01)
  *H04L 29/06* (2006.01)
  *H04W 74/02* (2009.01)
  *H04W 68/00* (2009.01)
  *H04W 48/16* (2009.01)
  *H04W 48/02* (2009.01)
  *H04W 48/18* (2009.01)
  *H04W 56/00* (2009.01)
  *H04W 24/08* (2009.01)
  *H04W 72/00* (2009.01)
  *H04W 84/12* (2009.01)

(52) U.S. Cl.
  CPC .......... *H04W 48/02* (2013.01); *H04W 48/18* (2013.01); *H04W 56/00* (2013.01); *H04W 56/001* (2013.01); *H04W 72/005* (2013.01); *H04W 84/12* (2013.01)

(58) Field of Classification Search
  CPC ..... H04W 56/00; H04W 48/18; H04W 48/02; H04W 84/12
  See application file for complete search history.

(56) References Cited

U.S. PATENT DOCUMENTS

| | | | |
|---|---|---|---|
| 2010/0128646 A1* | 5/2010 | Gao | H04W 68/00 370/312 |
| 2010/0215116 A1* | 8/2010 | Kogawa | H04L 27/04 375/269 |
| 2010/0284312 A1* | 11/2010 | Sampath | H04W 74/02 370/276 |
| 2012/0188907 A1 | 7/2012 | Dayal et al. | |
| 2013/0322286 A1* | 12/2013 | Van Doorselaer | H04L 43/0864 370/252 |
| 2013/0324113 A1 | 12/2013 | Jechoux et al. | |
| 2014/0162656 A1* | 6/2014 | Chai | H04W 48/16 455/437 |
| 2014/0301254 A1* | 10/2014 | Yamazaki | H04W 36/20 370/278 |
| 2015/0195849 A1* | 7/2015 | Bashar | H04W 16/14 370/330 |
| 2017/0055278 A1 | 2/2017 | Jechoux et al. | |

FOREIGN PATENT DOCUMENTS

| | | |
|---|---|---|
| JP | 2011-4003 A | 1/2011 |
| JP | 2014-506077 A | 3/2014 |
| WO | WO 2014/081421 A1 | 5/2014 |

OTHER PUBLICATIONS

Partial Supplementary European Search Report dated Mar. 26, 2018 in Patent Application No. 15845336.5 citing references AA-AB and AO therein, 13 pages.
Extended Search Report issued in European Application 15845336.5-1219 dated Jul. 9, 2018.

* cited by examiner

DEVICE

TECHNICAL FIELD

The present disclosure relates to a device.

BACKGROUND ART

In the 3$^{rd}$ Generation Partnership Project (3GPP), various technologies for improving system throughput have been discussed. It may be said that a first shortcut for improving the system throughput is increasing a frequency to be used. In the 3GPP, the technology of carrier aggregation (CA) has been considered in Release 10 and Release 11. CA is a technology for improving the system throughput and a maximum data rate by aggregating component carriers (CCs) having a bandwidth of 20 MHz for use. A frequency band available as a CC must adopt the technology of such CA. Thus, a frequency band available for wireless communication of a cellular system is required.

For example, in Patent Literature 1, technology which enables a registered frequency band available for a registered provider and an unlicensed band available when a predetermined condition is satisfied to be used in addition to a dedicated frequency band allocated to each provider for exclusive use is disclosed.

CITATION LIST

Patent Literature

Patent Literature 1: JP 2006-094001A

DISCLOSURE OF INVENTION

Technical Problem

For example, a frequency band (for example, a wireless local area network (LAN) included in a band of 5 GHz) is shared between a cellular system and a wireless LAN. In this case, communication of a cellular system is performed in the frequency band for a certain period and communication of a wireless LAN is performed in the frequency band for another period.

However, depending on a period in which communication of a wireless LAN is performed in the foregoing frequency band, it may be difficult for a terminal device to maintain synchronization for communication of a cellular system in the frequency band.

Accordingly, it is desirable to provide a structure enabling a terminal device to more easily maintain synchronization for communication of a cellular system in a frequency band shared between the cellular system and a wireless LAN.

Solution to Problem

According to the present disclosure, there is provided a device including: a communication processing unit configured to perform communication of a cellular system in a frequency band shared between the cellular system and a wireless LAN within a first period and stop the communication of the cellular system in the frequency band within a second period. The first period is one or more subframes including a subframe in which a synchronization signal of the cellular system is transmitted, and the second period is one or more other subframes not including the subframe in which the synchronization signal is transmitted.

According to the present disclosure, there is provided a device including: an acquiring unit configured to acquire information regarding a first period in which communication of a cellular system is performed in a frequency band shared between the cellular system and a wireless LAN or a second period in which the communication of the cellular system in the frequency band is stopped; and a communication processing unit configured to transmit a wireless LAN frame in the frequency band in tune with starting of the first or second period. The wireless LAN frame includes duration information for setting an NAV.

According to the present disclosure, there is provided a device including: an acquiring unit configured to acquire information indicating a first period in which communication of a cellular system is performed in a frequency band shared between the cellular system and a wireless LAN or a second period in which the communication of the cellular system in the frequency band is stopped; and a measurement unit configured to perform measurement on the frequency band based on the information. The first period is one or more subframes including a subframe in which a synchronization signal of the cellular system is transmitted, and the second period is one or more other subframes not including the subframe in which the synchronization signal is transmitted.

According to the present disclosure, there is provided a device including: an acquiring unit configured to acquire duration information included in a wireless LAN frame according to reception of the wireless LAN frame transmitted by a base station of a cellular system in a frequency band shared between the cellular system and a wireless LAN; and a communication processing unit configured to set an NAV of the frequency band based on the duration information.

Advantageous Effects of Invention

According to the present disclosure described above, it is possible to more easily maintain synchronization for communication of a cellular system in a frequency band shared between the cellular system and a wireless LAN. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
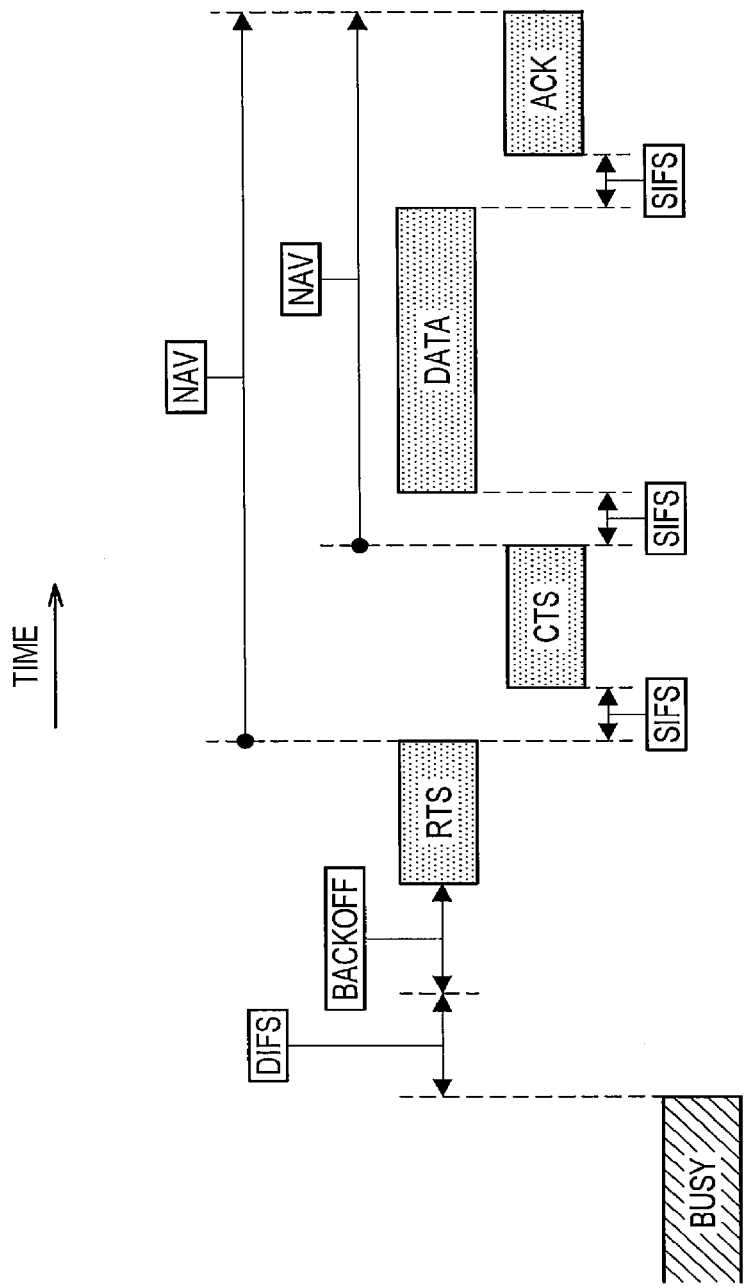
FIG. 1 is an explanatory diagram illustrating an example of data transmission according to IEEE 802.11.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Also, the description will be made in the following order.
1. Introduction
2. Schematic configuration of system
3. Configuration of each device
3.1. Configuration of base station
3.2. Configuration of terminal device
3.3. Configuration of access point
3.4. Configuration of station
4. First embodiment
4.1. Overview
4.2. Technical features
4.3. Flow of process
4.4. First modification example
4.5. Second modification example
5. Second embodiment
5.1. Overview
5.2. Technical features
5.3. Flow of process
6. Third embodiment
6.1. Overview
6.2. Technical features
6.3. Flow of process
7. Application examples
7.1. Application examples regarding base station
7.2. Application examples regarding terminal device/station
7.3. Application example regarding access point
8. Conclusion

1. INTRODUCTION

First, sharing of a frequency band, technology related to wireless communication, and technology related to a cellular system will be described with reference to FIGS. 1 to 5.
(Sharing of Frequency Band)
(a) Background of Frequency Sharing A frequency band available for the cellular system is required. For example, a band of 5 GHz is considered as a frequency band for use in the cellular system.

However, the band of 5 GHz is also used in the wireless LAN. Thus, when the cellular system uses the band of 5 GHz, for example, the band of 5 GHz is shared between cellular system and wireless LAN. Specifically, for example, a frequency band of 5 GHz (for example, a channel of a wireless LAN) is used in the wireless LAN communication at a certain time and used in the cellular system at another time. Thereby, frequency utilization efficiency of the band of 5 GHz is improved. Also, the wireless LAN standard includes Institute of Electrical and Electronics Engineers (IEEE) 802.11a, 11b, 11g, 11n, 11ac, and 11ad, etc. and these standards are characterized in that IEEE 802.11 is adopted for a media access control (MAC) layer.

(b) Sharing Technique

Wireless LAN nodes (an access point and a station) are already widespread around the world. For this reason, from the point of view of backward compatibility, it is desirable for a mechanism for sharing a frequency band between a cellular system and a wireless LAN that does not change operations of the wireless LAN nodes to be reviewed as a technique of Long Term Evolution (LTE) and decided as a new standard of LTE. A terminal device conforming to the new standard is considered to use a frequency band shared between the cellular system and the wireless LAN (hereinafter referred to as a "shared band"), while a terminal device not conforming to the new standard is considered not to use the shared band.

(c) Usage as Component Carrier

In LTE, LTE-Advanced, or a cellular system conforming to a communication standard equivalent thereto, the shared band will be used as, for example, a component carrier (CC). Further, it is assumed that the frequency band of the cellular system is used as a primary component carrier (PCC) and the shared band is used as a secondary component carrier (SCC). Also, a control signal and a data signal can be transmitted and received using a frequency band of the cellular system and the data signal can be transmitted and received using the shared band.

(d) Fair Sharing

It is desirable for the shared band to be fairly shared between the cellular system and the wireless LAN. In the wireless LAN, since a channel (the shared band) is fairly shared according to carrier sense multiple access (CSMA), it is desirable for the channel (the shared band) to be fairly shared, for example, even between the cellular system and the wireless LAN through a technique in which CSMA is considered.

Various sharing techniques can be considered as fair sharing. For example, fair sharing can be defined as "the case in which opportunities for the wireless LAN to use the shared band and opportunities for the cellular system to use the shared band are equally given." In other words, it does not means that the cellular system and the wireless LAN are the same in actual communication traffic, and any case in which the same opportunities of communication are given to the cellular system and the wireless LAN is regarded as fair sharing.

As an example, when the shared band is used in the cellular system for a certain period, then the shared band is not used in the cellular system for the same period.

(2) Technology Related to Wireless LAN (a) Data Transmission

An example of data transmission according to IEEE 802.11 will be described with reference to FIG. 1. FIG. 1 is an explanatory diagram illustrating an example of data transmission according to IEEE 802.11.

In IEEE 802.11, a DATA frame and an acknowledgement (ACK) frame are basic frames. When the DATA frame is correctly received, the ACK frame is a frame which causes a transmitting side to know the success of reception of the DATA frame. Although wireless communication can be performed only by the DATA frame and the ACK frame in the wireless LAN, two frames such as a request to send (RTS) frame and a clear to send (CTS) frame are generally further used.

Before the RTS frame is transmitted, each wireless LAN node which performs the wireless LAN communication confirms that no signal is transmitted during a period referred to as a distributed coordination function (DCF) inter-frame space (DIFS). This is referred to as carrier sense. When nodes simultaneously start to transmit signals at a point in time at which the DIFS has elapsed, the signals may collide with each other. Thus, each node waits for a backoff time randomly set for each node and transmits a signal if no signal is transmitted for the backoff time.

Basically, the node cannot transmit the signal while any signal is detected. However, because there is a hidden terminal problem, an RTS frame and a CTS frame including a duration field for setting a value referred to as a network allocation vector (NAV) are added. The NAV is set on the basis of a value included in the duration field. The node setting the NAV avoids transmitting a signal during a period of the NAV.

First, a first node for transmitting the DATA frame transmits the RTS frame. Then, another node located around the first node receives the RTS frame and acquires a value included in the duration field in the RTS frame. The other node sets, for example, its own NAV to the above-mentioned acquired value and avoids transmitting a signal during the period of the NAV For example, the period of the NAV is a period from the end of the RTS frame to the end of the ACK frame.

Also, a second node for receiving the DATA frame transmits the CTS frame after only a short inter-frame space (SIFS) from the end of the RTS frame according to the reception of the RTS frame. Then, another node located around the above-mentioned second node receives the CTS frame and acquires a value included in the duration field in the CTS frame. The other node sets, for example, its own NAV to the above-mentioned acquired value and avoids transmitting a signal during the period of the NAV. The period of the NAV is a period from the end of the CTS frame to the end of the ACK frame. Thereby, for example, it is possible to prevent the other node (that is, a hidden node for the above-mentioned first node) close to the above-mentioned second node without being close to the above-mentioned first node from transmitting a signal during communication of the above-mentioned first node and the above-mentioned second node.

Also, the RTS frame includes a frame control field, a reception address field, a transmission address field, and a frame check sequence (FCS) in addition to the duration field. Also, the CTS frame includes a frame control field, a reception address field, and an FCS in addition to the duration field.

Also, the DIFS and the SIFS in the standard of the IEEE 802.11 series have, for example, the following lengths.

TABLE 1

|      | 802.11b | 802.11g | 802.11a | 802.11n | 802.11ac |
|------|---------|---------|---------|---------|----------|
| SIFS | 10 us   | 10 us   | 16 us   | 16 us   | 16 us    |
| DIFS | 50 us   | 28 us   | 34 us   | 34 us   | 34 us    |

(b) Beacon

A beacon in IEEE 802.11 will be described with reference to FIG. 2.

(b-1) Beacon Frame

In IEEE 802.11, there are three types of a MAC frame, a management frame, a control frame, and a data frame. The above-described RTS frame, CTS frame, and ACK frame are control frames and the beacon frame is a management frame.

The beacon frame has the same structure as other frames (for example, the RTS frame, the CTS frame, the ACK frame, and the data frame) and includes different information from the other frames.

Also, in the header of the MAC frame, there are fields (a type field and a subtype field) indicating a type of frame. Each of the beacon frame, the RTS frame, the CTS frame, the ACK frame, and the data frame includes the following value in the fields.

TABLE 2

| MAC Frame | Type | Subtype |
|---|---|---|
| Beacon | 00 | 1000 |
| RTS | 01 | 1011 |
| CTS | 01 | 1100 |
| ACK | 01 | 1101 |
| DATA | 10 | 0000 |

(b-2) Information Included in Beacon Frame

In IEEE 802.11, an access point periodically transmits a beacon frame. A station receiving the beacon frame can acquire information regarding the access point. The beacon frame in a wireless LAN can also be said to correspond to system information in a cellular system.

For example, the beacon frame includes a beacon interval. The beacon interval is a time interval of transmission of a beacon. The station can ascertain an approximate time at which a subsequent beacon is transmitted from the beacon interval. The beacon interval can be set with fineness of 10 ms between 20 ms to 1000 ms. For example, the beacon interval is set to 100 ms.

For example, the beacon frame includes a time stamp. The time stamp is information used for time synchronization between the access point and the station.

For example, the beacon frame includes a service set ID. The service set ID in a wireless LAN can also be said to correspond to a cell ID in a cellular system.

Also, for example, the beacon frame includes other information such as a channel and a modulation scheme to be supported.

(b-3) Transmission of Beacon Frame

The access point attempts to transmit the beacon frame at the beacon interval. Even at the time of transmission of the beacon frame, the access point performs carrier sense over the DIFS and waits for the backoff time. Therefore, when channels are exclusively used by other nodes, a time in which the access point transmits the beacon frame is shifted backward. Hereinafter, a specific example of this point will be described with reference to FIG. 2.

Figure 2:
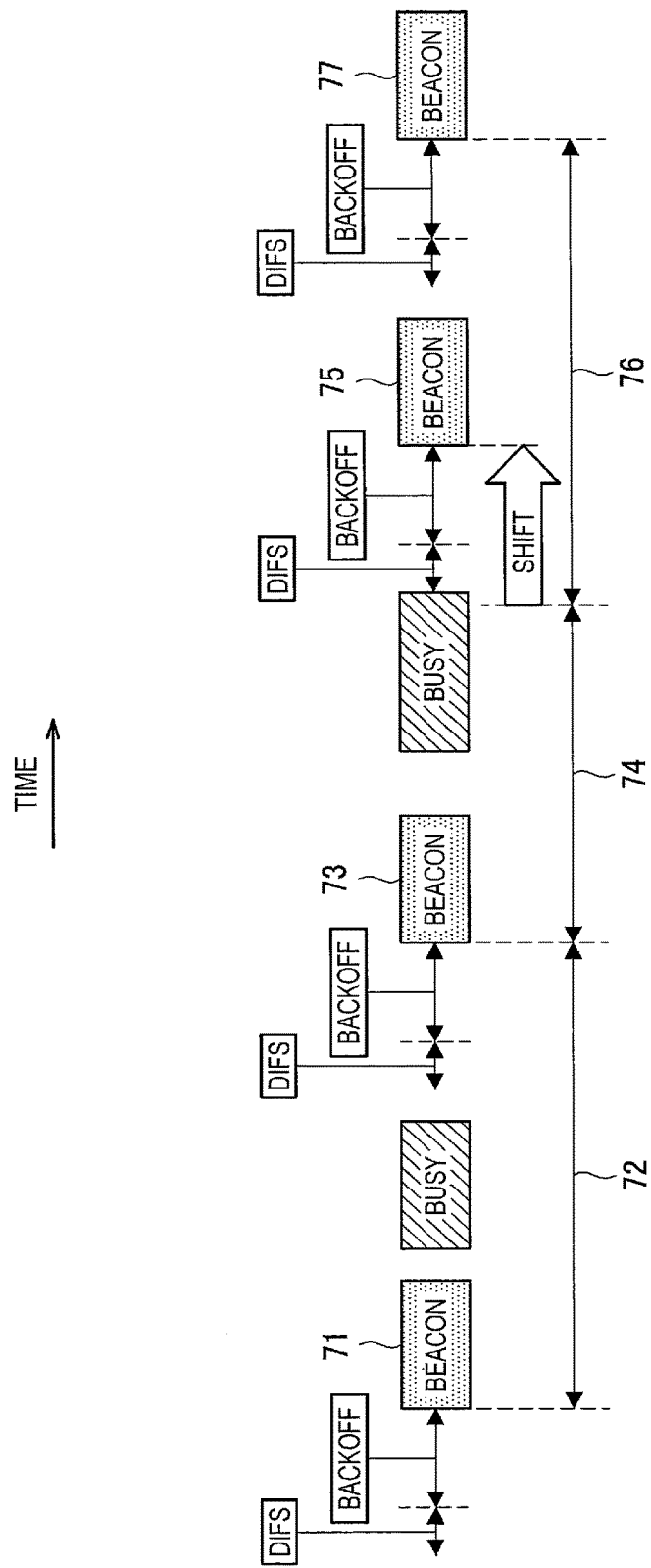
FIG. 2 is an explanatory diagram illustrating an example of beacon transmission according to IEEE 802.11.

FIG. 2 is an explanatory diagram illustrating an example of beacon transmission according to IEEE 802.11. For example, after the access point performs carrier sense over the DIFS and waits for the backoff time, the access point transmits the beacon frame 71. Further, the access point transmits a beacon frame 73 after a beacon interval 72 elapses. Thereafter, after a beacon interval 74 elapses, a channel enters a busy state due to transmission of a signal by another node. Therefore, after the busy state ends, the access point performs carrier sense over the DIFS, waits for only the backoff time, and subsequently transmits a beacon frame 75. Thereafter, after a beacon interval 76 elapses, the access point transmits a beacon frame 77.

As described above, the access point performs carrier sense over the DIFS, waits for the backoff time, and subsequently transmits a beacon frame.

(c) PCF

The above-described contention-based scheme is referred to as a distributed control function (DCF). On the other hand, in the wireless LAN, a non-contention-based scheme referred to as a point coordination function (PCF) is prepared in addition to the DCF. It can be said to be that the DCF is an access scheme in accordance with distributed control and the PCF is an access scheme in accordance with integrated control.

In the PCF, the access point performs polling on a station in a channel of a wireless LAN. Then, the station transmits a wireless LAN frame with the channel. Hereinafter, a specific example of a PCF operation will be described with reference to FIGS. 3 and 4.

Figure 3:
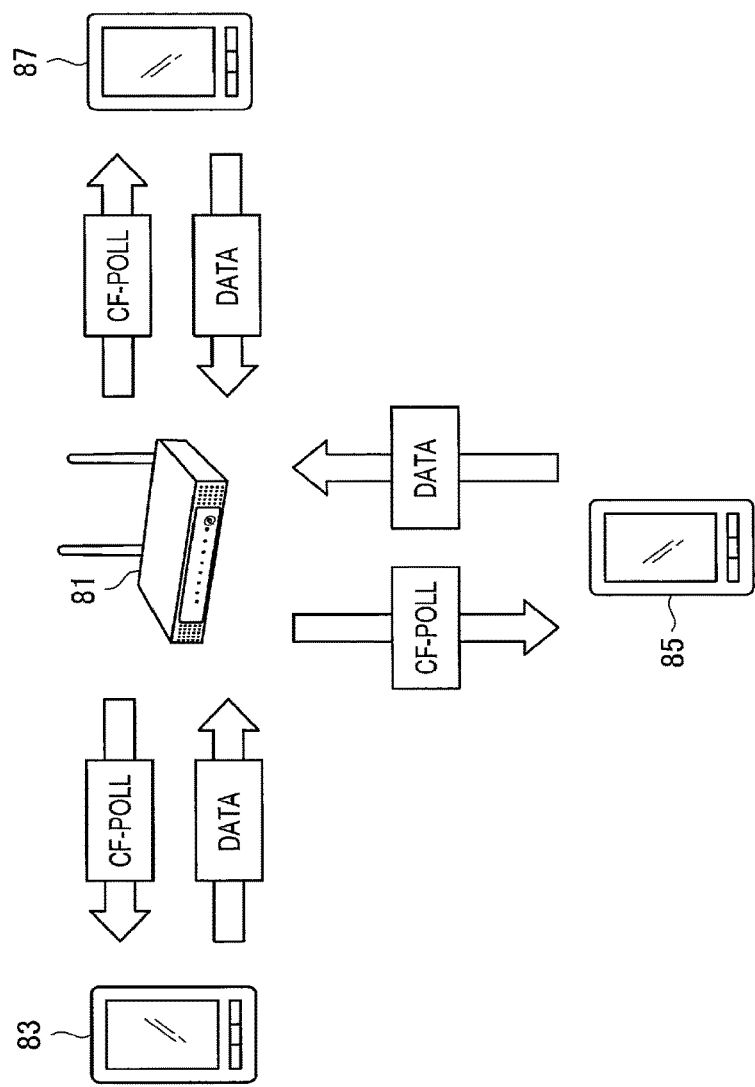
FIG. 3 is a first explanatory diagram illustrating an example of a PCF operation.

FIG. 3 is a first explanatory diagram illustrating an example of the PCF operation. Referring to FIG. 3, an access point 81 and stations 83, 85, and 87 are illustrated. The access point 81 performs polling on each of the stations 83, 85, and 87. That is, the access point 81 transmits a CF-Poll frame to each of the stations 83, 85, and 87. Each of the stations 83, 85, and 87 transmits a data frame according to the reception of the CF-Poll frame.

Figure 4:
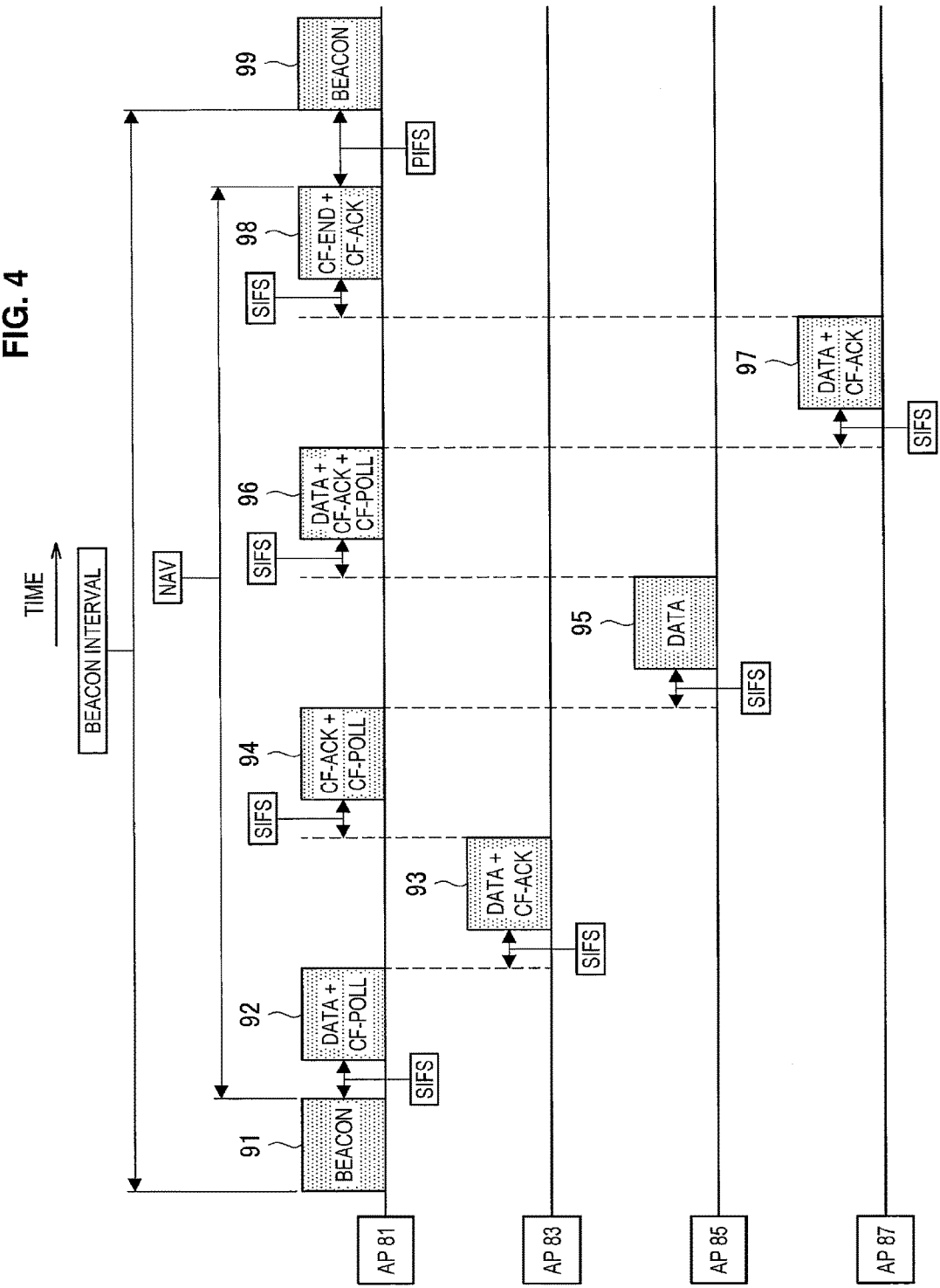
FIG. 4 is a second explanatory diagram illustrating an example of a PCF operation.

FIG. 4 is a second explanatory diagram illustrating an example of the PCF operation. Referring to FIG. 4, the access point 81 and the stations 83, 85, and 87 are illustrated. First, the access point 81 transmits a beacon frame 91 including a contention free (CF) parameter. The CP parameter includes duration information to set the NAV, and the stations 83, 85, and 87 receiving the beacon frame 91 set the NAV based on the duration information. After the beacon frame 91, the access point 81 transmits a Data+CF-Poll frame 92 destined for the station 83, and the station 83 transmits a Data+CF-ACK frame 93 destined for the access point 81. Further, the access point 81 transmits a CF-ACK+CF-Poll frame 94 destined for the station 85, and the station 85 transmits a Data frame 95 destined for the access point 81. Further, the access point 81 transmits a DATA+CF-ACK+CF-Poll frame 96 destined for the station 87, and the station 87 transmits a DATA+CF-ACK frame 97 destined for the access point 81. Thereafter, the AP 81 transmits a CF-END+CF-ACK frame. Then, the access point 81 transmits a beacon frame 99. The access point 81 transmits the beacon frame after a polling interframe space (PIFS) which is a shorter time other than the DIFS and the backoff time elapses. As described above, in the PCF, polling and transmission and reception of data are performed while the NAV is set by transmission of a beacon frame and communication of a wireless LAN is suppressed by setting of the NAV.

Also, the PCF has been described as the non-contention-based scheme. However, this does not mean that there is no contention at all. As described above, in the PCF operation, there can be no contention in one access point and one or more stations close to the one access point. However, there can be contention between one access point (and one or more stations close to the one access point) and another access point (and one or more stations close to the other access point).

(3) Technology Related to Cellular System (a) Frame Format

Figure 5:
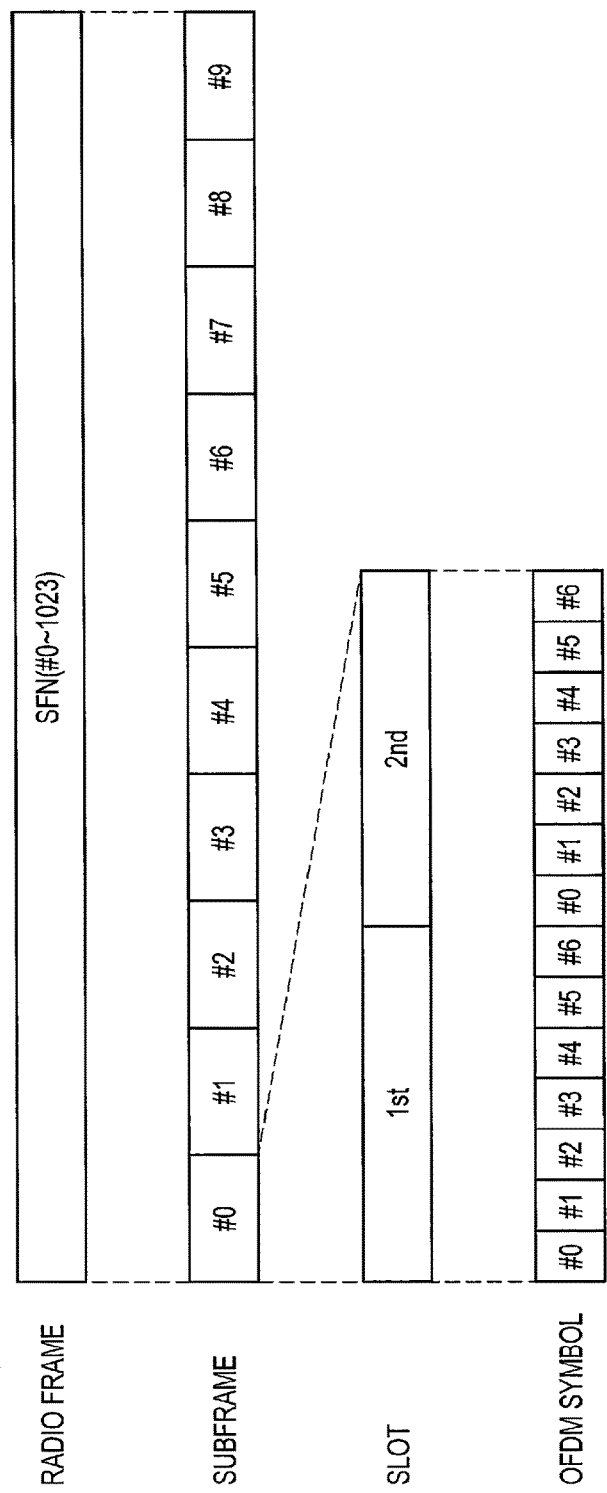
FIG. 5 is an explanatory diagram illustrating a frame format of long-term evolution (LTE).

The frame format of LTE will be described with reference to FIG. 5. FIG. 5 is an explanatory diagram illustrating the frame format of LTE.

First, a unit of time such as a radio frame is used in LTE. One radio frame is 10 ms. Each radio frame is identified by a system frame number (SFN) which is any one of 0 to 1023.

The radio frame includes 10 sub-frames identified by #0 to #9. Each sub-frame is 1 ms. Further, each sub-frame includes two slots and each slot includes, for example, seven orthogonal frequency division multiplexing (OFDM) symbols. That is, each sub-frame includes 14 OFDM symbols. Also, the frame format illustrated in FIG. 5 is a frame format of a downlink and the frame format of an uplink includes a single carrier frequency division multiple access (SC-FDMA) symbol in place of an OFDM symbol.

(b) Carrier Aggregation (b-1) Component Carriers

With carrier aggregation in Release 10, up to a maximum of five CCs are aggregated for use by user equipment (UE). Each CC is a band with a maximum width of 20 MHz. Carrier aggregation includes a case in which successive CCs in the frequency direction are used, and a case in which separated CCs in the frequency direction are used. With carrier aggregation, the CCs to be used may be set for each UE.

(b-2) PCC and SCC

In carrier aggregation, one of the multiple CCs used by a UE is a special CC. This special CC is called the primary component carrier (PCC). Also, the remaining CCs among the multiple CCs are called secondary component carriers (SCCs). The PCC may be different depending on the UE.

Since the PCC is the most important CC among the multiple CCs, it is desirable for the PCC to be the CC with the most stable communication quality. Note that in actual practice, which CC to treat as the PCC depends on the implementation.

The SCC is added to the PCC. In addition, an existing SCC that has been added may also be removed. Note that changing an SCC is conducted by removing an existing SCC and adding a new SCC.

(b-3) PCC Determination Method and Changing Method

When a UE connection is initially established and the status of the UE goes from Radio Resource Control (RRC) Idle to RRC Connected, the CC that the UE used during the establishment of the connection becomes the PCC for that UE. More specifically, a connection is established through a connection establishment procedure. At this point, the status of the UE goes from RRC Idle to RRC Connected. Also, the CC used in the procedure becomes the PCC for the above UE. Note that the above procedure is a procedure initiated from the UE side.

Additionally, PCC changing is conducted by a handover between frequencies. More specifically, if a handover is specified in a connection reconfiguration procedure, a PCC handover is conducted, and the PCC is changed. Note that the above procedure is a procedure initiated from the network side.

(b-4) Adding SCC

As discussed above, the SCC is added to the PCC. As a result, the SCC is associated with the PCC. In other words, the SCC is subordinate to the PCC. SSC addition may be conducted through a connection reconfiguration procedure. Note that this procedure is a procedure initiated from the network side.

(b-5) Removing SSC

As discussed above, an SCC may be removed. SSC removal may be conducted through a connection reconfiguration procedure. Specifically, a specific SCC specified in a message is removed. Note that the above procedure is a procedure initiated from the network side.

In addition, the removal of all SCCs may be conducted through a connection re-establishment procedure.

(b-6) Special Role of PCC

The connection establishment procedure, the transmitting and receiving of non-access stratum (NAS) signaling, and the transmitting and receiving of uplink control signals on the physical uplink control channel (PUCCH) are conducted only by the PCC, and not by the SCCs.

In addition, the detection of a radio link failure (RLF) and a subsequent connection re-establishment procedure are also conducted only by the PCC, and not by the SCCs.

(b-7) Conditions of Backhauling for Carrier Aggregation

For example, an ACK of a downlink signal on an SCC is transmitted by the PUCCH of the PCC. Since the ACK is used for the retransmission of data by the evolved Node B (eNB), a delay of the ACK is not acceptable. Consequently, when a first eNB using a CC that acts as the PCC for a UE is different from a second eNB using a CC that acts as an SCC for the UE, a backhaul delay of approximately 10 ms between the first eNB and the second eNB is desirable.

2. SCHEMATIC CONFIGURATION OF COMMUNICATION SYSTEM

Figure 6:
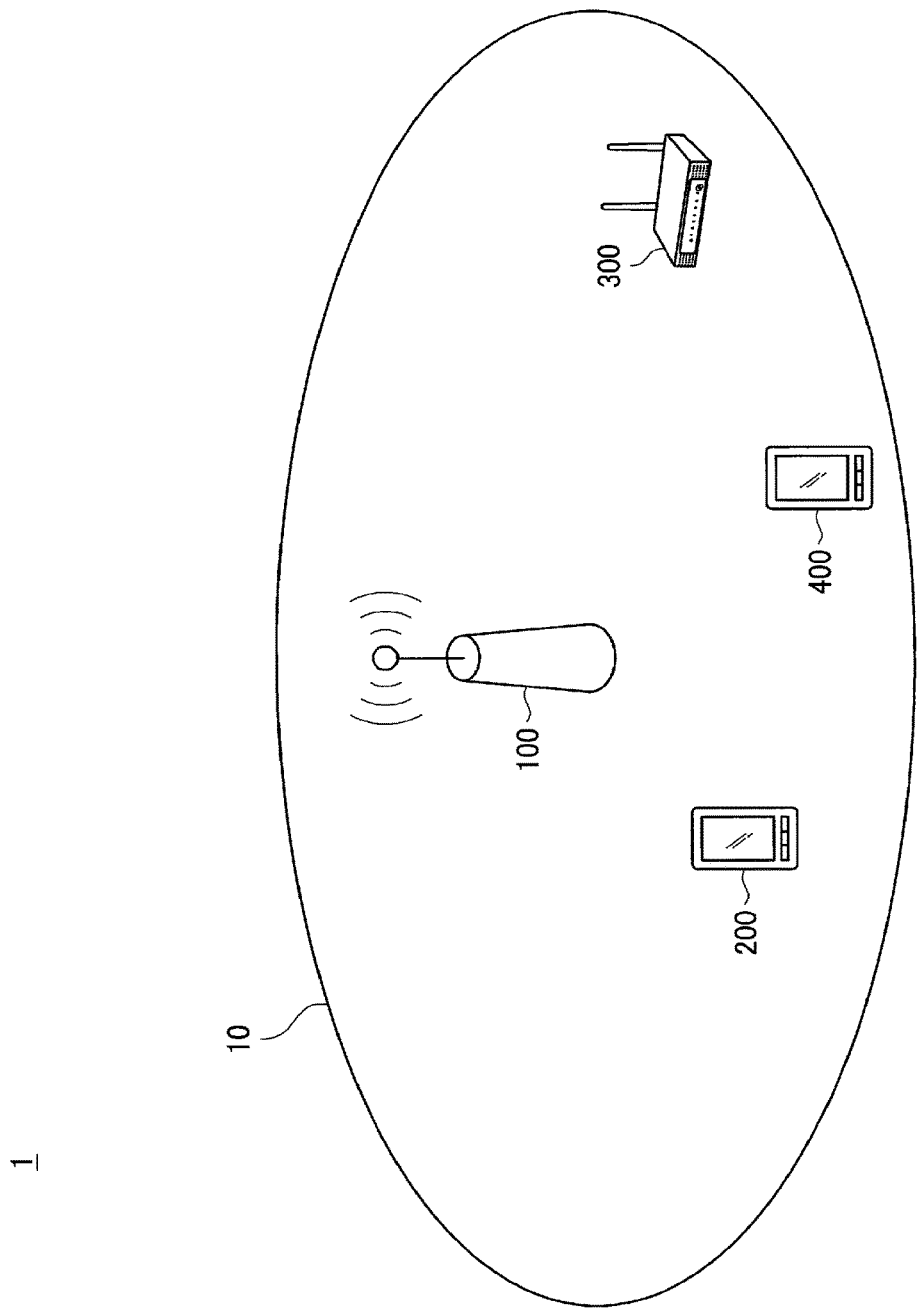
FIG. 6 is an explanatory diagram illustrating an example of a schematic configuration of a system according to an embodiment of the present disclosure.

Next, a schematic configuration of a system 1 according to an embodiment of the present disclosure will be described with reference to FIGS. 6 and 7. FIG. 6 is an explanatory diagram illustrating an example of a schematic configuration of the system 1 according to an embodiment of the present disclosure. Referring to FIG. 4, the system 1 includes a base station 100 and a terminal device 200, an access point 300, and a station 400.

(1) Base Station 100

The base station 100 is a base station of a cellular system. For example, the cellular system is a system conforming to LTE, LTE-advanced, or a communication standard equivalent thereto. The base station 100 operates according to the communication standard. The base station 100 may be a small cell or a macro cell.

(a) Frequency Band (a-1) Frequency Band for Cellular System

The base station 100 performs wireless communication in a frequency band for the cellular system. For example, the frequency band is a component carrier for the cellular system.

The frequency band for the cellular system is a frequency band included in a licensed band.

(a-2) Shared Band

In particular, in an embodiment of the present disclosure, the base station 100 performs wireless communication in a frequency band (that is, a shared band) shared between the cellular system and a wireless LAN. For example, the shared band is a channel of the wireless LAN. More specifically, for example, the shared band is a channel of a band of 5 GHz (or a band of 2.4 GHz) and has a bandwidth of 20 MHz. Also, the shared band is not limited to this example, but may be a frequency band included in another band such as a band of 3.5 GHz or a band of 60 GHz.

The shared band is a frequency band included in an unlicensed band.

(b) Wireless Communication with Terminal Device

The base station 100 performs wireless communication with a terminal device (for example, the terminal device 200). For example, the base station 100 performs wireless communication with a terminal device located within a cell 10 of the base station 100. More specifically, for example, the base station 100 transmits a downlink signal to the terminal device, and receives an uplink signal from the terminal device.

(2) Terminal Device 200

(a) Wireless Communication in Cellular System

The terminal device 200 is a terminal device that can perform communication in the cellular system. As described above, for example, the cellular system is a system conforming to LTE, LTE-advanced, or a communication standard equivalent thereto. The terminal device 200 operates according to the communication standard.

The terminal device 200 performs wireless communication in the frequency band for the cellular system. Further, for example, the terminal device 200 performs wireless communication in the shared band.

For example, the terminal device 200 performs wireless communication with a base station (for example, the base station 100). For example, when the terminal device 200 is located within a cell of a base station (for example, the cell 10 of the base station 100), the terminal device 200 performs wireless communication with the base station. Specifically, for example, the terminal device 200 receives the downlink signal from the base station and transmits the uplink signal to the base station 100.

(b) Wireless Communication in Wireless LAN

Further, the terminal device 200 may also be able to perform communication in a wireless LAN. For example, the terminal device 200 may operate according to an IEEE 802.11 standard (for example, IEEE 802.11a, 11b, 11g, 11n, 11ac, or 11ad).

The terminal device 200 may perform wireless communication with an access point with the shared band or another channel of a wireless LAN. That is, the terminal device 200 may operate as a station of the wireless LAN.

(3) Access Point 300

The access point 300 is an access point of a wireless LAN. For example, the access point 300 operates according to an IEEE 802.11 standard (for example, IEEE 802.11a, 11b, 11g, 11n, 11ac, or 11ad).

For example, the access point 300 performs wireless communication with a station (for example, the station 400) of the wireless LAN with the shared band or another channel of the wireless LAN.

(4) Station 400

The station 400 is a station of a wireless LAN. For example, the station 400 operates according to an IEEE 802.11 standard (for example, IEEE 802.11a, 11b, 11g, 11n, 11ac, or 11ad).

For example, the station 400 performs wireless communication with an access point (for example, the access point 300) of the wireless LAN with the shared band or another channel of the wireless LAN.

(5) Use of Shared Band in Cellular System (a) Occupation and Release of Shared Band For example, the base station 100 occupies the shared band over a predetermined time and subsequently releases the shared band. That is, the base station 100 performs wireless communication in the shared band over the predetermined time and subsequently stops the wireless communication in the shared band. Hereinafter, a specific example of this point will be described with reference to FIG. 7.

Figure 7:
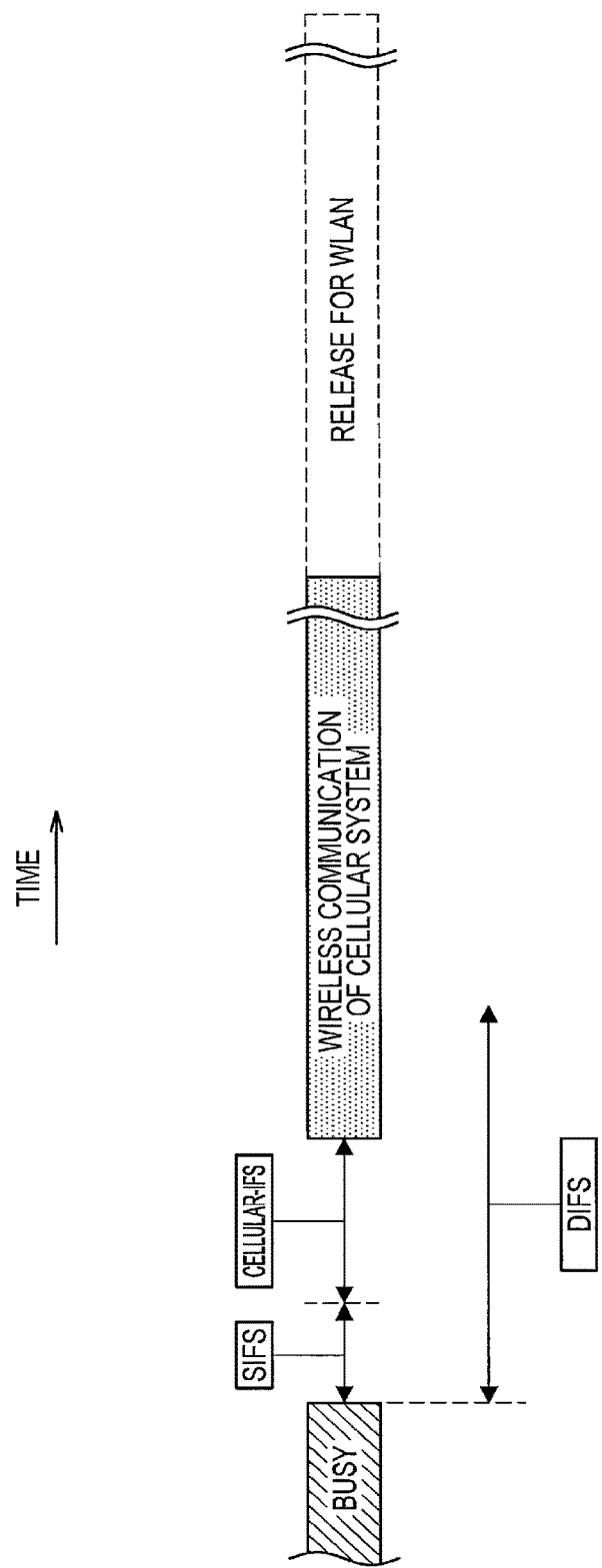
FIG. 7 is an explanatory diagram illustrating an example of exclusive use and release of a shared band in a cellular system.

FIG. 7 is an explanatory diagram illustrating an example of exclusive use and release of the shared band in a cellular system. Referring to FIG. 7, for example, the base station 100 waits for a short interframe space (SIFS) and a cellular IFS (that is, IFS for the cellular system) after ending of a busy state of the shared band and performs wireless communication (wireless communication of the cellular system) in the shared band over a predetermined period. Thereafter, the base station 100 stops the wireless communication in the shared band (that is, releases the shared band for the wireless LAN). For example, the SIFS is 1 us, the cellular IFS is 10 us, and the DIFS is 34 us. Therefore, after the ending of the busy state of the shared band, the base station 100 can transmit a signal earlier than a node of the wireless LAN.

(b) Carrier Aggregation

For example, the shared band is used as a component carrier in the cellular system. For example, a periodicity band for the cellular system is used as a primary component carrier (PCC) or a secondary component carrier (SCC) in a terminal device, and the shared band is used as the SCC in the terminal device.

Further, for example, the periodicity band for the cellular system is used to transmit a control signal and the shared band is used to transmit a data signal. Also, the shared band can be used as a downlink dedicated frequency band.

3. CONFIGURATION OF EACH DEVICE

Next, an example of the configuration of each device will be described with reference to FIGS. 8 to 11.

3.1. Configuration of Base Station

Figure 8:
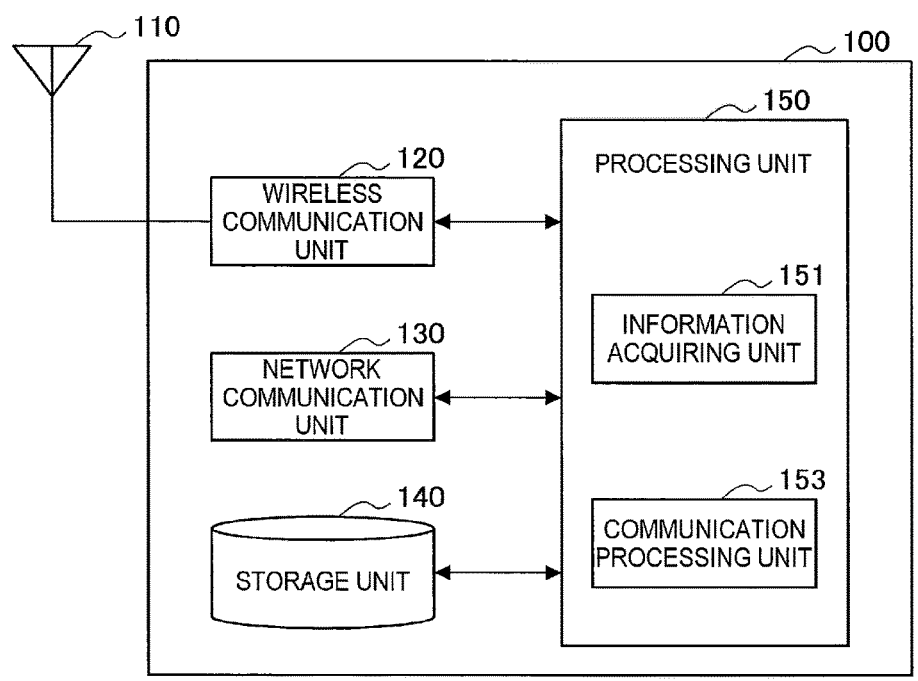
FIG. 8 is a block diagram illustrating an example of a configuration of a base station according to the embodiment.

Next, an example of the configuration of a base station 100 according to an embodiment of the present disclosure will be described with reference to FIG. 8. FIG. 8 is a block diagram illustrating an example of the configuration of the base station 100 according to an embodiment of the present disclosure. Referring to FIG. 8, the base station 100 is equipped with an antenna unit 110, a wireless communication unit 120, a network communication unit 130, a storage unit 140, and a processing unit 150.

(1) Antenna Unit 110

The antenna unit 110 emits a signal output by the wireless communication unit 120 into space as a radio wave. Additionally, the antenna unit 110 converts a radio wave from space into a signal, and outputs the signal to the wireless communication unit 120.

(2) Wireless Communication Unit 120

The wireless communication unit 120 transmits and receives signals. For example, the wireless communication unit 120 transmits and receives signals with a frequency band for the cellular system and/or a frequency band (that is, the shared band) shared between the cellular system and the wireless LAN.

(3) Network Communication Unit 130

The network communication unit 130 performs transmission and reception of information. For example, the network communication unit 130 transmits information to another node, and receives information from another node. For example, the other node includes another base station and a core network node.

(4) Storage Unit 140

The storage unit 140 temporarily or permanently stores programs and data for the operation of the base station 100.

(5) Processing Unit 150

The processing unit 150 provides various functions of the base station 100. The processing unit 150 includes an information acquiring unit 151 and a communication processing unit 153. The processing unit 150 may further include any other component in addition to these components. In other words, the processing unit 150 can perform an operation other than operations of these components.

Operations of the information acquiring unit 151 and the communication processing unit 153 will be described in detail below.

3.2. Configuration of Terminal Device

Figure 9:
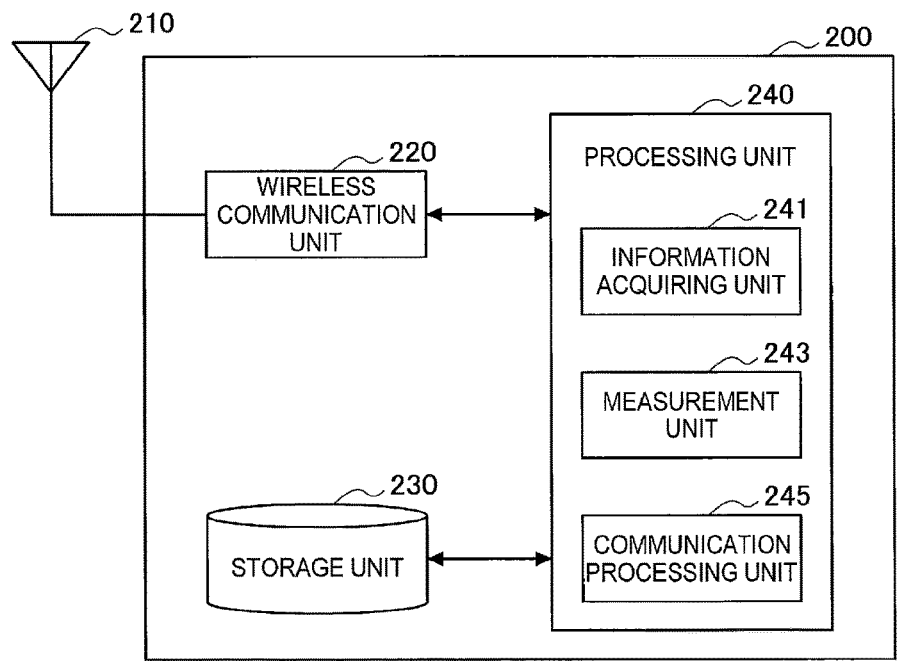
FIG. 9 is a block diagram illustrating an example of a configuration of a terminal device according to the embodiment.

Next, an example of the configuration of terminal device 200 according to an embodiment of the present disclosure will be described with reference to FIG. 9. FIG. 9 is a block diagram illustrating an example of the configuration of the terminal device 200 according to an embodiment of the present disclosure. Referring to FIG. 9, the terminal device 200 is equipped with an antenna unit 210, a wireless communication unit 220, a storage unit 230, and a processing unit 240.

(1) Antenna Unit 210

The antenna unit 210 emits a signal output by the wireless communication unit 220 into space as a radio wave. Additionally, the antenna unit 210 converts a radio wave from space into a signal, and outputs the signal to the wireless communication unit 220.

(2) Wireless Communication Unit 220

The wireless communication unit 220 transmits and receives signals. For example, the wireless communication unit 220 transmits and receives signals with a frequency band for the cellular system and/or a frequency band (that is, the shared band) shared between the cellular system and the wireless LAN.

(3) Storage Unit 230

The storage unit 230 temporarily or permanently stores programs and data for the operation of the terminal device 200.

(4) Processing Unit 240

The processing unit 240 provides various functions of the terminal device 200. The processing unit 240 includes an information acquiring unit 241, a measurement unit 243, and a communication processing unit 245. The processing unit 240 may further include any other component in addition to these components. In other words, the processing unit 240 can perform an operation other than operations of these components.

Operations of the information acquiring unit 241, the measurement unit 243, and the communication processing unit 245 will be described in detail below.

3.3. Configuration of Access Point

Figure 10:
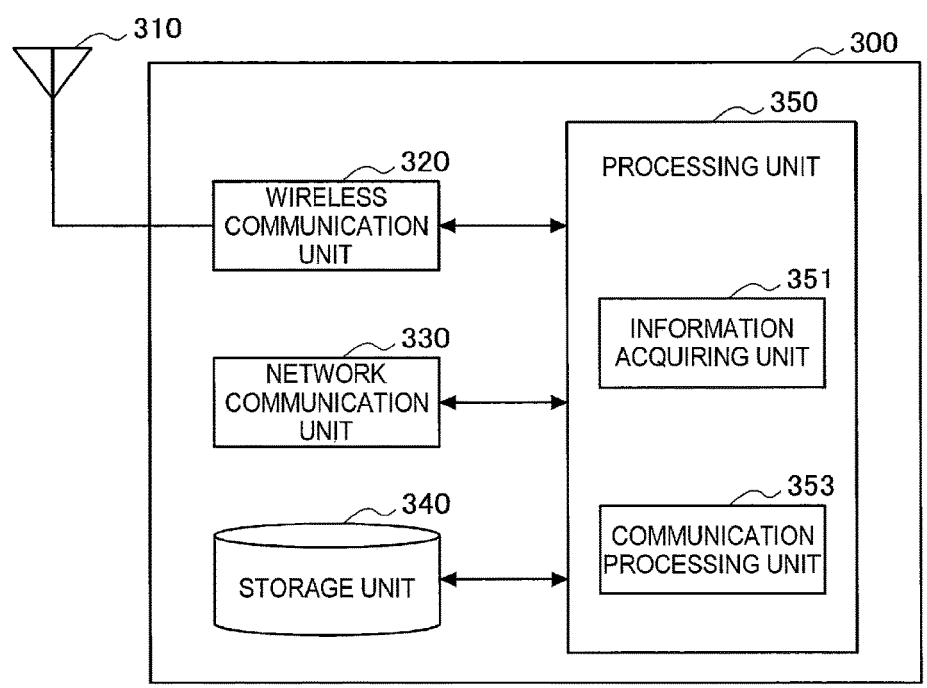
FIG. 10 is a block diagram illustrating an example of a configuration of an access point according to the embodiment.

Next, an example of the configuration of the access point 300 according to an embodiment of the present disclosure will be described with reference to FIG. 10. FIG. 10 is a block diagram illustrating an example of the configuration of the access point 300 according to an embodiment of the present disclosure. Referring to FIG. 10, the access point 300 is equipped with an antenna unit 310, a wireless communication unit 320, a network communication unit 330, a storage unit 340, and a processing unit 350.

(1) Antenna Unit 310

The antenna unit 310 emits a signal output by the wireless communication unit 320 into space as a radio wave. Additionally, the antenna unit 310 converts a radio wave from space into a signal, and outputs the signal to the wireless communication unit 320.

(2) Wireless Communication Unit 320

The wireless communication unit 320 transmits and receives signals. For example, the wireless communication unit 320 transmits and receives signals with a frequency band (that is, the shared band) shared between the cellular system and the wireless LAN. The wireless communication unit 320 may transmit and receive signals with still another frequency band (a channel of the wireless LAN).

(3) Network Communication Unit 330

The network communication unit 330 performs transmission and reception of information. For example, the network communication unit 330 transmits information to another node, and receives information from another node.

(4) Storage Unit 340

The storage unit 140 temporarily or permanently stores programs and data for the operation of the access point 300.

(5) Processing Unit 350

The processing unit 350 provides various functions of the access point 300. The processing unit 350 includes an information acquiring unit 351 and a communication processing unit 353. The processing unit 350 may further include any other component in addition to these components. In other words, the processing unit 350 can perform an operation other than operations of these components.

Operations of the information acquiring unit 351 and the communication processing unit 353 will be described in detail below.

3.4. Configuration of Station

Figure 11:
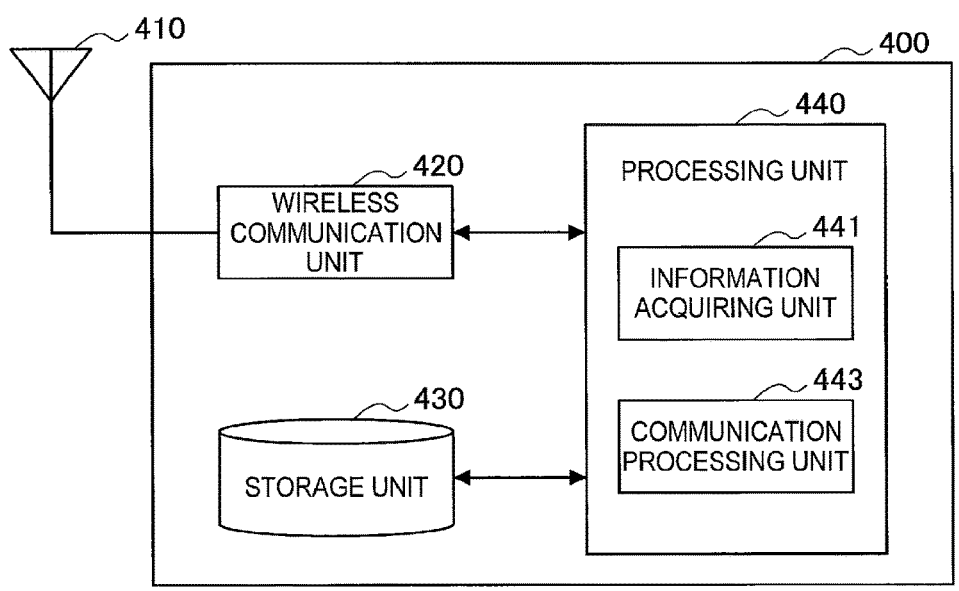
FIG. 11 is a block diagram illustrating an example of a configuration of a station according to the embodiment.

Next, an example of the configuration of the station 400 according to an embodiment of the present disclosure will be described with reference to FIG. 11. FIG. 11 is a block diagram illustrating an example of the configuration of the station 400 according to an embodiment of the present disclosure. Referring to FIG. 11, the station 400 is equipped with an antenna unit 410, a wireless communication unit 420, a storage unit 430, and a processing unit 440.

(1) Antenna Unit 410

The antenna unit 410 emits a signal output by the wireless communication unit 420 into space as a radio wave. Additionally, the antenna unit 410 converts a radio wave from space into a signal, and outputs the signal to the wireless communication unit 420.

(2) Wireless Communication Unit 420

The wireless communication unit 420 transmits and receives signals. For example, the wireless communication unit 420 transmits and receives signals with a frequency band for the cellular system and/or a frequency band (that is, the shared band) shared between the cellular system and the wireless LAN.

(3) Storage Unit 430

The storage unit 430 temporarily or permanently stores programs and data for the operation of the station 400.

(4) Processing Unit 440

The processing unit 440 provides various functions of the station 400. The processing unit 440 includes an information acquiring unit 441 and a communication processing unit 443. The processing unit 440 may further include any other component in addition to these components. In other words, the processing unit 440 can perform an operation other than operations of these components.

Operations of the information acquiring unit 441 and the communication processing unit 443 will be described in detail below.

4. FIRST EMBODIMENT

Next, a first embodiment of the present disclosure will be described with reference to FIGS. 12 to 18.

4.1. Overview (1) Technical Problem

For example, a frequency band (for example, a channel of a wireless LAN included in a band of 5 GHz) is shared between a cellular system and the wireless LAN. In this case, communication of the cellular system is performed in the frequency band (that is, the shared band) within a certain period and communication of the wireless LAN is performed in the frequency band within another period.

However, depending on a period in which communication of the wireless LAN is performed in the frequency band, it is difficult for a terminal device to maintain synchronization for communication of the cellular system in the frequency band.

For example, the terminal device may not receive the synchronization signal in the frequency band without transmitting the synchronization signal of the cellular system in the frequency band over a period in which the communication of the wireless LAN is performed in the frequency band. Therefore, when the period is long, for example, the terminal device may not maintain the synchronization for the communication of the cellular system in the frequency band. As a result, for example, the terminal device acquires the synchronization again after the period, and use efficiency of the frequency band in the cellular system can be lowered.

In addition, for example, even when the period in which the communication of the wireless LAN is performed in the frequency band is short, the terminal device may not receive the synchronization signal at the time of the communication of the wireless LAN in the frequency band within the subframe in which the synchronization signal of the cellular system is transmitted. Therefore, for example, the terminal device may not maintain the synchronization for the communication of the cellular system in the frequency band. As a result, for example, the terminal device acquires the synchronization again, and the use efficiency of the frequency band in the cellular system can be lowered.

Accordingly, it is desirable to provide a structure enabling a terminal device to more easily maintain synchronization for communication of a cellular system in a frequency band (that is, a shared band) shared between the cellular system and a wireless LAN.

(2) Technical Means

In the first embodiment, the base station 100 performs communication of the cellular system in the frequency band (that is, the shared band) shared between the cellular system and the wireless LAN within a first period (hereinafter referred to as an "execution period") and stops the communication of the cellular system in the frequency band within a second period (hereinafter referred to as a "stop period"). The execution period is one or more subframes including a subframe in which the synchronization signal of the cellular system is transmitted. The stop period is one or more other subframes not including the subframe in which the synchronization signal is transmitted.

Thus, for example, the terminal device can more easily maintain the synchronization for the communication of the cellular system in the frequency band (that is, the shared band) shared between the cellular system and the wireless LAN.

4.2. Technical Features

Next, technical features according to the first embodiment will be described with reference to FIG. 12.
(1) Execution/Stop of Communication in Shared Band As described above, the base station 100 (the communication processing unit 153) performs communication of the cellular system in the frequency band (that is, the shared band) shared between the cellular system and the wireless LAN within the first period (that is, the execution period) and stops the communication of the cellular system in the frequency band within the second period (that is, the stop period).

(a) Shared Band
(a-1) Example of Shared Band

For example, the shared band is the channel of the wireless LAN. More specifically, for example, the shared band is a channel of a band of 5 GHz (or a band of 2.4 GHz) and has a bandwidth of 20 MHz.

Also, the shared band is not limited to this example and may be a frequency band included in another band such as a band of 3.5 GHz or a band of 60 GHz.
(a-2) Use as CC For example, the base station 100 uses the shared band as a component carrier (CC). More specifically, for example, the base station 100 uses the shared band as a secondary component carrier (SCC) of the terminal device.
(a-3) Downlink Dedicated Frequency Band The base station 100 uses the shared band as a downlink dedicated frequency band. That is, the base station 100 can perform only transmission of a downlink signal in the shared band.

(b) Execution Period/Stop Period
(b-1) Synchronization Signal

As described above, the execution period is one or more subframes including a subframe in which the synchronization signal of the cellular system is transmitted. The stop period is one or more other subframes not including a subframe in which the synchronization signal is transmitted.

For example, the execution period is one or more subframes including a subframe in which a primary synchronization signal (PSS) and/or a secondary synchronization signal (SSS) is transmitted. For example, in a case of frequency division duplex (FDD), subframes in which the PSS is transmitted are subframes of which subframe numbers are 0 and 5 and subframes in which the SSS is transmitted are subframes of which subframe numbers are also 0 and 5. For example, in a case of time division duplex (TDD), subframes in which the PSS is transmitted are subframes of which subframe numbers are 1 and 6 and subframes in which the SSS is transmitted are subframes of which subframe numbers are 0 and 5.

(b-2) Period in Which Subframes have Predetermined Subframe Numbers

For example, the one or more subframes (that is, the execution period) are subframes which have predetermined subframe numbers and the one or more other subframes (that is, the stop period) are subframes which have other predetermined subframe numbers.

Thus, for example, it is possible to more easily design the structure of the communication in the shared band.
(b-3) Repeated Period For example, the execution period and the stop period are periods repeated at a cycle of a radio frame (for example, 10 subframes). For example, a sum of a length of the execution period and a length of the stop period is the length (for example, 10 ms) of the radio frame. The execution period and the stop period are mutually adjacent and are repeated at the cycle (for example, a cycle of 10 ms) of the radio frame.

Thus, for example, it is possible to perform the communication of the cellular system in the shared band within each radio frame.
(b-4) Plurality of Continuous Subframes For example, the execution period is a plurality of continuous subframes including a subframe in which the synchronization signal is transmitted.

For example, the stop period is a plurality of other continuous subframes not including a subframe in which the synchronization signal is transmitted. Thus, for example, the shared band can be used together to a certain extent in the wireless LAN. Therefore, it is possible to improve use efficiency of the shared band in the wireless LAN.

(b-5) Examples of Execution Period/Stop Period

Examples of Execution Period/Stop Period

Figure 12:
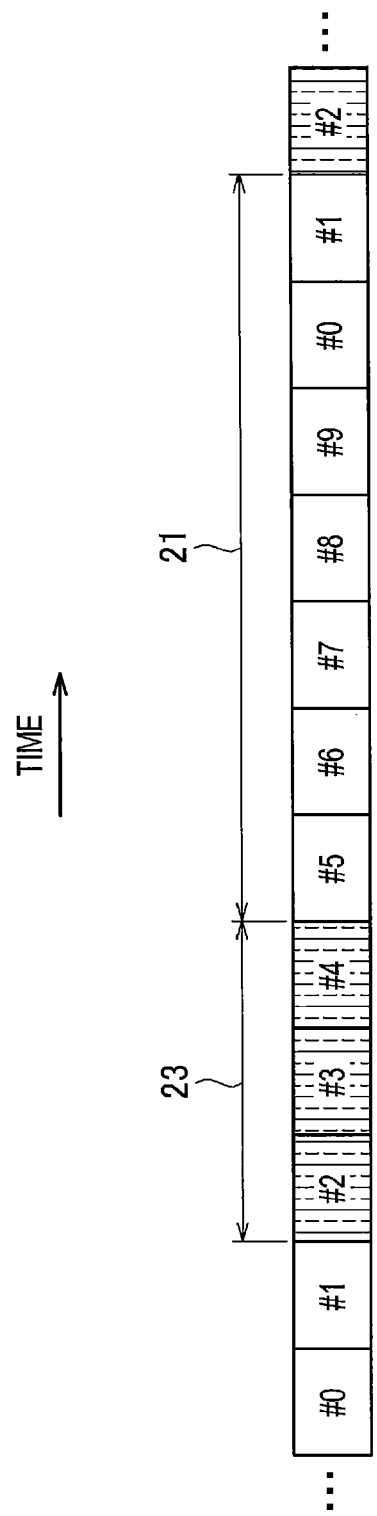
FIG. 12 is an explanatory diagram illustrating an example of an execution period and a stop period.

FIG. 12 is an explanatory diagram illustrating an example of an execution period and a stop period. Referring to FIG. 12, 12 subframes are illustrated. In this example, an execution period 21 is subframes of which subframe numbers are 5 to 1 (5, 6, 7, 8, 9, 0, and 1) and a stop period 23 is subframes of which subframe numbers are 2 to 4. That is, the base station 100 performs communication of the cellular system in the shared band within the subframes of which the subframe numbers are 5 to 1 (that is, the execution period 21) and stops the communication of the cellular system in the shared band within the subframes of which the subframe numbers are 2 to 4 (that is, the stop period 23). The execution period 21 and the stop period 23 are repeated at a cycle of a radio frame (10 subframes). The base station 100 performs communication in the shared band within each execution period 21 and stops the communication in the shared band within each stop period 23.

Other Examples of Execution Period/Stop Period

Also, the execution period and the stop period according to the first embodiment are not, of course, limited to the example illustrated in FIG. 12.

As an example, the execution period may be subframes of which subframe numbers are 0 to 6 and the stop period may be subframes of which subframe numbers are 7 to 9.

As another example, in the case of the FDD, the execution period may be subframes of which subframe numbers are 0 to 5 and the stop period may be subframes of which subframe numbers are 6 to 9. Alternatively, in the case of the FDD, the execution period may be subframes of which subframe numbers are 5 to 0 (5, 6, 7, 8, 9, and 0) and the stop period may be subframes of which subframe numbers are 1 to 4.

As still another example, subframes immediately before a subframe in which the synchronization signal is transmitted may be included in the execution period. For example, in the case of the FDD, the execution period may be subframes of which subframe numbers are 4 to 0 (4, 5, 6, 7, 8, 9, and 0) rather than the subframes of which subframe numbers 5 to 0. In this case, the stop period may be subframes of which subframe numbers are 1 to 3. Thus, for example, even when the wireless LAN frame does not end within the stop period, there is a low possibility of the wireless LAN frame interfering with the synchronization signal.

(c) Communication of Cellular System

For example, the communication of the cellular system in the shared band includes downlink transmission in the shared band. Further, the downlink transmission includes the transmission of the synchronization signal.

Also, the shared band may not be a downlink dedicated frequency band. In this case, the communication of the cellular system in the shared band may include uplink reception in the shared band.

(d) Process for Execution/Stop

As a first example, the communication processing unit 153 allocates radio resources of the shared band. In this case, the communication processing unit 153 allocates the radio resources of the shared band within the execution period to one or more terminal devices and does not allocate the radio resources of the shared band within the stop period to any terminal device.

As a second example, the communication processing unit 153 performs a transmission process (encoding, modulating, and mapping of signals to radio resources, and the like) for downlink transmission in the shared band. In this case, the communication processing unit 153 performs the transmission process for the downlink transmission within the execution period and does not perform the transmission process for the downlink transmission within the stop period. Also, the communication processing unit 153 may perform a reception process (demapping of signals from radio resources, demodulating, decoding, and the like) for uplink reception in the shared band. In this case, the communication processing unit 153 performs the reception process for the uplink reception within the execution period and does not perform the reception process for the uplink reception within the stop period.

As a third example, the communication processing unit 153 may switch an ON/OFF state of communication in the shared band. In this case, the communication processing unit 153 may cause the communication in the shared band within the execution period to enter the ON state and cause the communication in the shared band within the stop period to enter the OFF state.

For example, through such a process, the base station 100 performs communication in the shared band within the execution period and stops the communication in the shared band within the stop period.

As described above, the base station 100 performs the communication in the shared band within the execution period and the stops the communication in the shared band within the stop period. Thus, for example, the terminal device can more easily maintain the synchronization for the communication of the cellular system in the shared band. More specifically, for example, since the synchronization signal of the cellular system is continuously transmitted without interfering with the communication of the wireless LAN, the terminal device can more easily maintain the synchronization for the communication of the cellar system.

(2) Operation for Terminal Device (a) First Example: Transmission of Period Information (a-1) Operation of Base Station For example, the base station 100 (the communication processing unit 153) transmits information indicating the execution period or the stop period (hereinafter referred to as "period information") to a terminal device 200 performing communication of the cellular system.

For example, the base station 100 (the communication processing unit 153) transmits system information including the period information. Alternatively, the base station 100 (the communication processing unit 153) may individually transmit a message including the period information to the terminal device 200.

As a specific process, for example, the communication processing unit 153 performs a transmission process (for example, generating, scheduling, mapping to radio resources, encoding, and/or modulating of the system information or the message) for the period information.

(a-2) Operation of Terminal Device

For example, the terminal device 200 performs measurement on the shared band based on the period information indicating the execution period (that is, a period in which the communication of the cellular system in the shared band is performed) or the stop period (that is, a period in which the communication of the cellular system in the shared band is stopped).

For example, the information acquiring unit 241 acquires the period information and the measurement unit 243 performs measurement on the shared band based on the period information. Specifically, for example, the measurement unit 243 performs measurement on the shared band using a signal (for example, a reference signal) transmitted in the shared band in the execution period (in other words, a period other than the stop period).

For example, the measurement includes measurement of a channel state of the shared band. More specifically, for example, the measurement includes measurement of channel quality indicators (CQI), precoding matrix indicators (PMI), precoding type indicators (PTI) and/or rank indicators (RI).

For example, the measurement includes measurement of reception power and/or reception quality of a reference signal (for example, a cell-specific reference signal (CRS)) transmitted in the shared band. More specifically, for example, the measurement includes measurement of reference signal received power (RSRP) and/or reference signal received quality (RSRQ).

Thus, for example, the base station 100 stops the communication in the shared band. As a result, the terminal device 200 can appropriately perform measurement even when a signal (for example, a reference signal) of the cellular system in the shared band is not transmitted.

(b) Second Example: MBSFN Subframe

The base station 100 (the communication processing unit 153) may use the one or more other subframes (that is, the stop period) as multimedia broadcast multicast service (MBMS) over single frequency network (MBSFN) subframes.

As an example, the base station 100 (the communication processing unit 153) may transmit system information (for example, SIB2) indicating the one or more other subframes (that is, the stop period) as the MBSFN subframes.

Thus, for example, the base station 100 stops the communication in the shared band. As a result, the terminal device 200 can appropriately perform measurement even when the signal (for example, the reference signal) of the cellular system in the shared band is not transmitted.

(3) Coordination of Execution Period/Stop Period Between Base Stations

The execution period and the stop period may be a common period between the base station 100 and an adjacent base station to the base station 100. That is, the base station 100 and the adjacent base station may perform communication in the shared band within the execution period and stop the communication in the shared band within the stop period.

As an example, the base station 100 may transmit the period information to the adjacent base station and the adjacent base station may receive and acquire the period information. Alternatively, the adjacent base station may transmit the period information to the base station 100 and the base station 100 may receive and acquire the period information.

As another example, any control device may transmit the period information to the base station 100 and the adjacent base station, and each of the base station 100 and the adjacent base station may receive and acquire the period information.

As still another example, the execution period and the stop period may be decided in advance and may be set in advance in the base station 100 and the adjacent base station.

As a result of the examples, for example, the base station 100 and the adjacent base station perform the communication in the shared band within the execution period and stop the communication in the shared band within the stop period. Therefore, it is possible to avoid a situation in which a wireless LAN node receiving both a signal transmitted by the base station 100 and a signal transmitted by the adjacent base station may not receive a signal in the shared band over a long time.

4.3. Flow of Process

Figure 13:
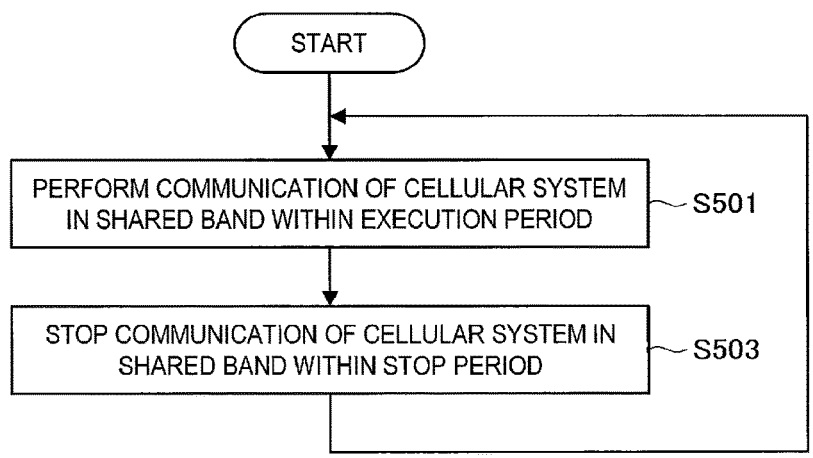
FIG. 13 is a flowchart illustrating an example of a schematic flow of a process of a base station according to the first embodiment.

Next, an example of a process according to the first embodiment will be described with reference to FIG. 13. FIG. 13 is a flowchart illustrating an example of a schematic flow of the process of the base station 100 according to the first embodiment.

The base station 100 (the communication processing unit 153) performs communication of the cellular system in the shared band within the execution period (S501).

The base station 100 (the communication processing unit 153) stops the communication of the cellular system in the shared band within the stop period (S503). Then, the process returns to step S501.

4.4. First Modification Example

Next, a first modification example of the first embodiment will be described with reference to FIGS. 14 and 15.

(1) Technical Features

In the first modification example, the base station 100 (the communication processing unit 153) transmits a wireless LAN frame in the shared band in tune with starting of the execution period. The wireless LAN frame includes duration information which is duration information for setting an NAV and indicates a duration corresponding to the length of the execution period.

Thus, for example, a wireless LAN node (for example, an access point and a station) close to the base station 100 sets the NAV based on the duration information and does not transmit a signal in the shared band within the execution period. Therefore, it is possible to suppress interference in the communication of the cellular system in the shared band.

(a) Wireless LAN Frame

As an example, the wireless LAN frame is a beacon frame including a parameter regarding a control free period (CFP) for a PCF operation, and the parameter includes the duration information. More specifically, the parameter is a contention free (CF) parameter and the duration information is a CFP max-duration or a CFP duration remaining. The base station 100 transmits the beacon frame in the shared band in tune with the starting of the execution period.

As another example, the wireless LAN frame may be an RTS frame or a CTS frame. That is, the base station 100 may transmit the RTS frame or the CTS frame in the shared band in tune with the starting of the execution period.

(b) Transmission Interval

For example, the base station 100 (the communication processing unit 153) transmits the wireless LAN frame in the shared band at a radio frame interval. Thus, for example, when the execution period is repeated at the radio frame interval, the interference in the communication of the cellular system in the shared band is continuously suppressed.

(c) Process for Transmission

As a specific process, the communication processing unit 153 performs a transmission process (for example, generating, encoding, and/or demodulating of the wireless LAN frame) for the wireless LAN frame.

(d) Operation of Wireless LAN Node

For example, the wireless LAN node (the access point 300 or the station 400) sets the NAV of the shared band based on the duration information according to reception of the wireless LAN frame transmitted in the shared band by the base station 100. An information acquiring unit (the information acquiring unit 351 or the information acquiring unit 441) of the wireless LAN node acquires the duration information according to reception of the wireless LAN frame transmitted in the shared band by the base station 100. A communication processing unit (the communication processing unit 353 or the communication processing unit 443) of the wireless LAN node sets the NAV of the shared band based on the duration information.

As described above, the duration information indicates a duration corresponding to the length of the execution period. For example, the duration information indicates a duration which is substantially the same as the length of the execution period. As a result, the wireless LAN node (the access point 300 or the station 400) sets a value of the duration which is the execution period as the NAV, and the NAV is 0 at an ending time point of the execution period. Therefore, the wireless LAN node (the access point 300 or the station 400) does not transmit a signal in the shared band from starting to ending of the execution period. Hereinafter, a specific example of this point will be described with reference to FIG. 14.

Figure 14:
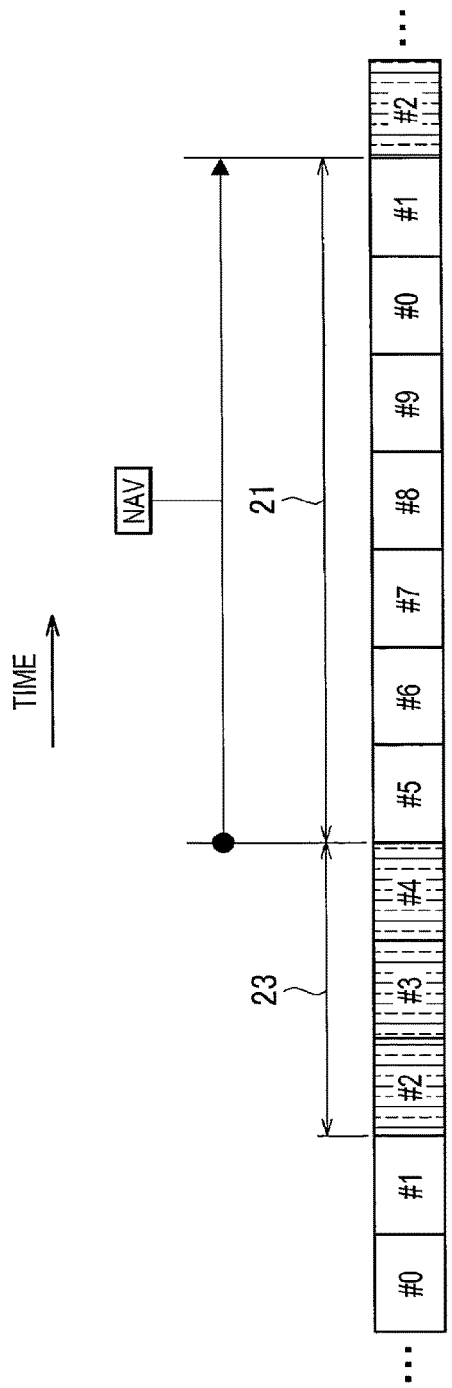
FIG. 14 is an explanatory diagram illustrating an operation of a wireless LAN node receiving a wireless LAN frame transmitted by the base station.

FIG. 14 is an explanatory diagram illustrating an operation of a wireless LAN node receiving a wireless LAN frame transmitted by the base station 100. Referring to FIG. 14, the execution period 21 and the stop period 23 are illustrated as in FIG. 12. The base station 100 transmits a wireless LAN frame including the duration information in the shared band in tune with starting of the execution period 21 (that is, starting of a subframe of which a subframe number is 5). The duration information indicates a duration which is substantially the same as the length of the execution period 21 (that is, 7 subframes: 7 ms). The access point 300 and the station 400 receive the wireless LAN frame transmitted in the shared band and set the duration time (7 ms) as the NAV of the shared band. Since the NAV is 0 as the ending time point of the execution period 21, the access point 300 and the station 400 do not transmit a signal in the shared band within the execution period 21. Therefore, it is possible to suppress interference in the communication of the cellular system in the shared band.

(2) Flow of Process

Figure 15:
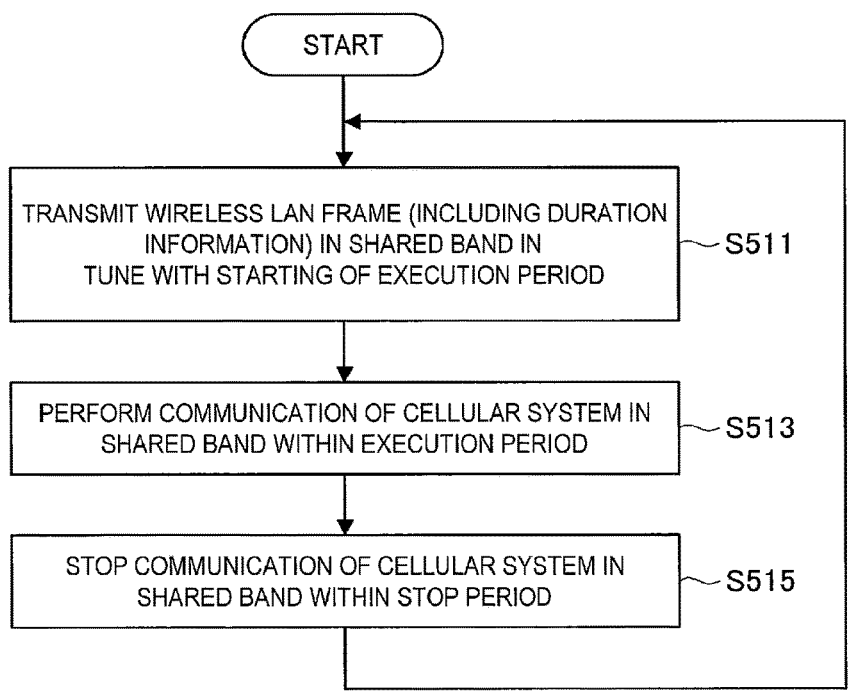
FIG. 15 is a flowchart illustrating an example of a schematic flow of a process of a base station according to a first modification example of the first embodiment.

FIG. 15 is a flowchart illustrating an example of a schematic flow of a process of the base station 100 according to the first modification example of the first embodiment.

The base station 100 (the communication processing unit 153) transmits the wireless LAN frame in the shared band in tune with starting of the execution period (S511). The wireless LAN frame includes the duration information for setting the NAV. The duration information indicates a duration corresponding to the length of the execution period.

The base station 100 (the communication processing unit 153) performs communication of the cellular system in the shared band within the execution period (S513).

The base station 100 (the communication processing unit 153) stops the communication of the cellular system in the shared band within the stop period (S515). Then, the process returns to step S511.

4.5. Second Modification Example

Next, a second modification example of the first embodiment will be described with reference to FIGS. 16 and 17.

(1) Technical Features (a) Notification of Period to Wireless LAN Node

In the second modification example, the base station 100 (the communication processing unit 153) notifies a wireless LAN node of the execution period or the stop period.

The wireless LAN node is the access point 300 or the station 400. As an example, the wireless LAN node is the access point 300 that supports a PCF operation.

(a-1) Notification Technique

First Example: Notification via Terminal Device

Operation of Base Station 100

As a first example, the base station 100 (the communication processing unit 153) notifies the wireless LAN node of the execution period or the stop period by transmitting information regarding the execution period or the stop period (hereinafter referred to as a "period-relevant information") to the terminal device 200 that is able to perform communication in both the cellular system and the wireless LAN.

For example, the base station 100 (the communication processing unit 153) transmits system information including the period-relevant information. Alternatively, the base station 100 (the communication processing unit 153) may individually transmit a message including the period-relevant information to the terminal device 200.

As a specific process, for example, the communication processing unit 153 performs a transmission process (for example, generating, scheduling, mapping to radio resources, encoding, and/or modulating of the system information or the message) for the period-relevant information.

Operation of Terminal Device 200

For example, the terminal device 200 (the information acquiring unit 241) acquires the period-relevant information. Then, for example, the terminal device 200 (the communication processing unit 245) transmits the wireless LAN frame including the period-relevant information to the wireless LAN node.

As an example, the wireless LAN frame is a data frame.

As a specific process, for example, the communication processing unit 245 performs a transmission process (for example, generating, encoding, and/or demodulating of the wireless LAN frame) for the wireless LAN frame.

Second Example: Notification to Wireless LAN Node that is Able to Perform Communication in Cellular System As a second example, the wireless LAN node may be able to perform communication in the cellular system. In this case, the base station 100 (the communication processing unit 153) may notify the wireless LAN node of the execution period or the stop period by transmitting the period-relevant information to the wireless LAN node. That is, the base station 100 may directly notify the wireless LAN node of the execution period or the stop period according to a communication scheme of the cellular system.

The base station 100 (the communication processing unit 153) may transmit the system information including the period-relevant information. Alternatively, the base station 100 (the communication processing unit 153) may individually transmit a message including the period-relevant information to the wireless LAN node.

As a specific process, the communication processing unit 153 may perform a transmission process (for example, generating, scheduling, mapping to radio resources, encoding, and/or modulating of the system information or the message) for the period-relevant information.

Third Example: Notification with Wireless LAN Frame

As a third example, the base station 100 (the communication processing unit 153) may notify the wireless LAN node of the execution period or the stop period by transmitting the wireless LAN frame including the period-relevant information. That is, the base station 100 may directly notify the wireless LAN node of the execution period or the stop period according to the communication scheme of the wireless LAN.

As an example, the wireless LAN frame may be a data frame.

As a specific process, the communication processing unit 153 may perform a transmission process (for example, generating, encoding, and/or demodulating of the wireless LAN frame) for the wireless LAN frame.

Fourth Example: Notification via Backhauling

As a fourth example, the base station 100 (the communication processing unit 153) may notify the wireless LAN node of the execution period or the stop period by transmitting the period-relevant information to the wireless LAN node via backhauling.

As a specific process, the communication processing unit 153 may perform a transmission process (for example, generating and/or encoding of the message) for the message including the period-relevant information.

For example, as described above, the base station 100 (the communication processing unit 153) notifies the wireless LAN node of the execution period or the stop period. Thus, for example, the wireless LAN node can be caused to perform an operation of suppressing interference in the communication of the cellular system in the shared band within the execution period.

(a-2) Period-Relevant Information

For example, the period-relevant information (that is, information regarding the execution period or the stop period) includes information indicating the length of the execution period or the stop period.

For example, the period-relevant information includes information indicating a starting time point (offset) of the execution period or the stop period. Also, the period-relevant information may not include the information indicating the starting time point. The wireless LAN node ascertains the ending time point of the execution period (that is, the starting time point of the stop period) through carrier sense. In addition, the wireless NAN node ascertains the starting time point of the execution period from the ending time point of the execution period (that is, the starting time point of the stop period) and the length of the execution period or the stop period.

The period-relevant information may include information indicating a cycle of the execution period or the stop period.

(b) Transmission of Wireless LAN Frame

In the second modification example, the wireless LAN node (that is, the access point 300 or the station 400) transmits the wireless LAN frame in the shared band in tune with starting of the execution period or the stop period. The wireless LAN frame includes the duration information for setting the NAV.

The information acquiring unit (the information acquiring unit 351 or the information acquiring unit 441) of the wireless LAN node acquires information (that is, the period-relevant information) regarding the execution period or the stop period. The communication processing unit (the information communication processing unit 353 or the communication processing unit 443) of the wireless LAN node transmits the wireless LAN frame in the shared band in tune with the execution period or the stop period.

Thus, for example, another wireless LAN node (for example, an access point and a station) close to the wireless LAN node sets the NAV based on the duration information and does not transmit a signal in the shared band within the execution period or the stop period in self-determination. Therefore, it is possible to suppress interference in the communication of the cellular system in the shared band.

(b-1) Wireless LAN Frame

As an example, the wireless LAN frame is a beacon frame including a parameter regarding a CFP for a PCF operation, and the parameter includes the duration information. More specifically, the parameter is a CF parameter and the duration information is a CFP max-duration or a CFP duration remaining.

As another example, the wireless LAN frame may be an RTS frame or a CTS frame.

(b-2) Transmission Interval

For example, the wireless LAN node (the communication processing unit) transmits the wireless LAN frame in the shared band at a radio frame interval. Thus, for example, when the execution period and the stop period are repeated at the radio frame interval, the interference in the communication of the cellular system in the shared band is continuously suppressed.

(b-3) Process for Transmission

As a specific process, the communication processing unit (that is, the information acquiring unit 351 or the information acquiring unit 441) of the wireless LAN node performs a transmission process (for example, generating, encoding, and/or demodulating of the wireless LAN frame) for the wireless LAN frame.

(b-4) Example of Transmission of Wireless LAN Frame and Operation Related to Transmission First Example: Transmission in Tune with Starting of Stop Period As a first example, the wireless LAN node is the access point 300, and the access point 300 (the information acquiring unit 351) transmits the wireless LAN frame in the shared band in tune with starting of the stop period. In this case, the wireless LAN frame is a beacon frame including a parameter regarding the CFP for the PCF operation and the parameter includes the duration information. Further, the duration information indicates a duration corresponding to the length of the stop period.

On the other hand, for example, the station 400 sets the NAV of the shared band based on the duration information according to reception of the beacon frame transmitted in the shared band by the access point 300.

As described above, the duration information indicates a duration corresponding to the length of the stop period. For example, the duration information indicates a duration which is substantially the same as the length of the stop period. As a result, the station 400 sets a value of the duration which is substantially the same as the length of the stop period as the NAV, and the NAV is 0 as an ending time point of the stop period. Therefore, the station 400 does not transmit a signal in the shared band from starting to ending of the stop period unless polling is performed by the access point 300. Hereinafter, a specific example of this point will be described with reference to FIG. 16.

Figure 16:
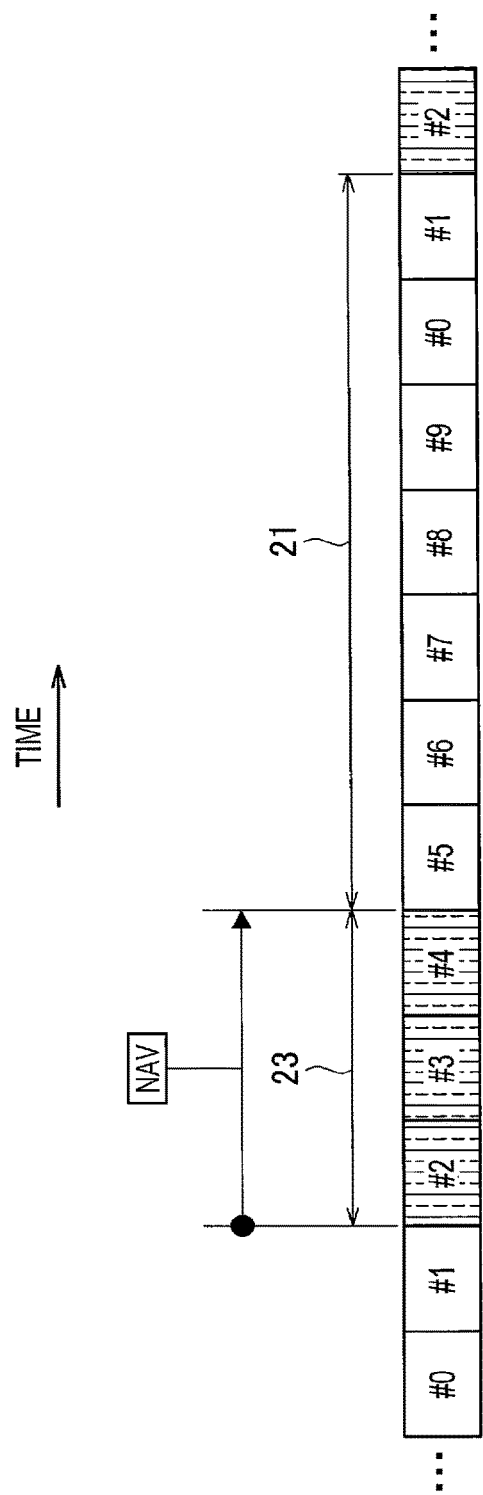
FIG. 16 is an explanatory diagram illustrating an operation of a station 400 receiving a beacon frame transmitted by the access point.

FIG. 16 is an explanatory diagram illustrating an operation of a station 400 receiving the beacon frame transmitted by the access point 300. Referring to FIG. 16, the execution period 21 and the stop period 23 are illustrated as in FIG. 12. The access point 300 transmits a beacon frame including the duration information in the shared band in tune with starting of the stop period 23 (that is, starting of a subframe of which a subframe number is 2). The duration information indicates a duration which is substantially the same as the length of the stop period 23 (that is, 3 subframes: 3 ms). The station 400 receives the beacon frame transmitted in the shared band and sets the duration time (3 ms) as the NAV of the shared band. Since the NAV is 0 as the ending time point of the stop period 23, the station 400 does not transmit a signal in the shared band within the stop period 23 unless polling is performed by the access point 300. Accordingly, according to the appropriate polling by the access point 300, the radio frame transmitted by the station 400 does not reach up to the execution period 21 beyond the stop period 23. Therefore, it is possible to suppress interference in the communication of the cellular system in the shared band. In addition, for example, the base station 100 can guarantee the shared band more reliably. Also, it is possible to perform the communication of the wireless LAN by the PCF in the shared band within the stop period 23.

As described above, according to the first example, it is possible to suppress interference in the communication of the cellular system in the shared band. In addition, for example, since the communication of the wireless LAN in the stop period is controlled by the PCF, the base station 100 can guarantee the shared band from the starting time point of the execution period more reliably and start the communication of the cellular system.

Second Example: Transmission in Tune with Starting of Execution Period

As a second example, the wireless LAN node (the information acquiring unit 351 or the information acquiring unit 441) transmits the wireless LAN frame in the shared band in tune with starting of the execution period. The duration information indicates a duration corresponding to the length of the execution period. Also, the wireless LAN frame may be a beacon frame including a parameter regarding the CFP for the PCF operation or may be an RTS frame or a CTS frame.

On the other hand, for example, another wireless LAN node (the access point 300 or the station 400) sets the NAV of the shared band based on the duration information according to the reception of the wireless LAN frame transmitted by the wireless LAN node in the shared band.

As described above, the duration information indicates a duration corresponding to the length of the execution period. For example, the duration information indicates a duration which is substantially the same as the length of the execution period. As a result, the other wireless LAN node (the access point 300 or the station 400) sets the value of the duration which is the execution period as the NAV, and the NAV is 0 as the ending time point of the execution period. Therefore, the other wireless LAN node (the access point 300 or the station 400) does not transmit a signal in the shared band from starting to ending of the execution period.

Referring back to FIG. 14, the wireless LAN node transmits the wireless LAN frame including the duration information in the shared band in tune with starting of the execution period 21 (that is, starting of the subframe of which a subframe number is 5). The duration information indicates a duration which is substantially the same as the length of the execution period 21 (that is, 7 subframes: 7 ms). Another wireless LAN node receives the wireless LAN frame transmitted in the shared band and sets the duration (7 ms) as the NAV of the shared band. Since the NAV is 0 as the ending time point of the execution period 21, the other wireless LAN node does not transmit a signal in the shared band within the execution period 21. Therefore, it is possible to suppress interference in the communication of the cellular system in the shared band.

As described above, according to the first embodiment, it is possible to suppress the interference in the communication of the cellular system in the shared band.

(2) Flow of Process (a) First Example

Figure 17:
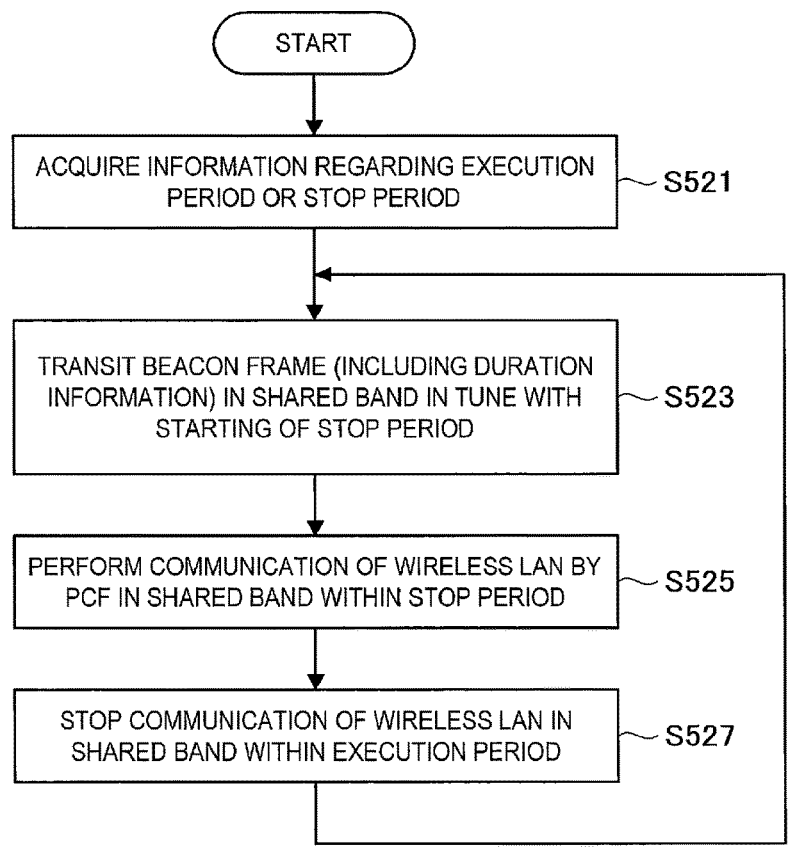
FIG. 17 is a flowchart illustrating a first example of a schematic flow of a process of an access point according to a second modification example of the first embodiment.

FIG. 17 is a flowchart illustrating a first example of a schematic flow of a process of the access point 300 according to the second modification example of the first embodiment.

The access point 300 (the information acquiring unit 351) acquires information (that is, the period-relevant information) regarding the execution period or the stop period (S521).

The access point 300 (the information acquiring unit 353) transmits the beacon frame in the shared band in tune with starting of the stop period (S523). The beacon frame is a beacon frame including a parameter regarding the CFP for the PCF operation and the parameter includes the duration information for setting the NAV. Further, the duration information indicates a duration corresponding to the length of the stop period.

The access point 300 (the communication processing unit 353) performs the communication of the wireless LAN by the PCF in the shared band within the stop period (S525). For example, the access point 300 (the communication processing unit 353) performs polling and transmission and reception of data.

The access point 300 (the communication processing unit 353) stops the communication of the wireless LAN in the shared band within the execution period (S527). Then, the process returns to step S523.

(b) Second Example

Figure 18:
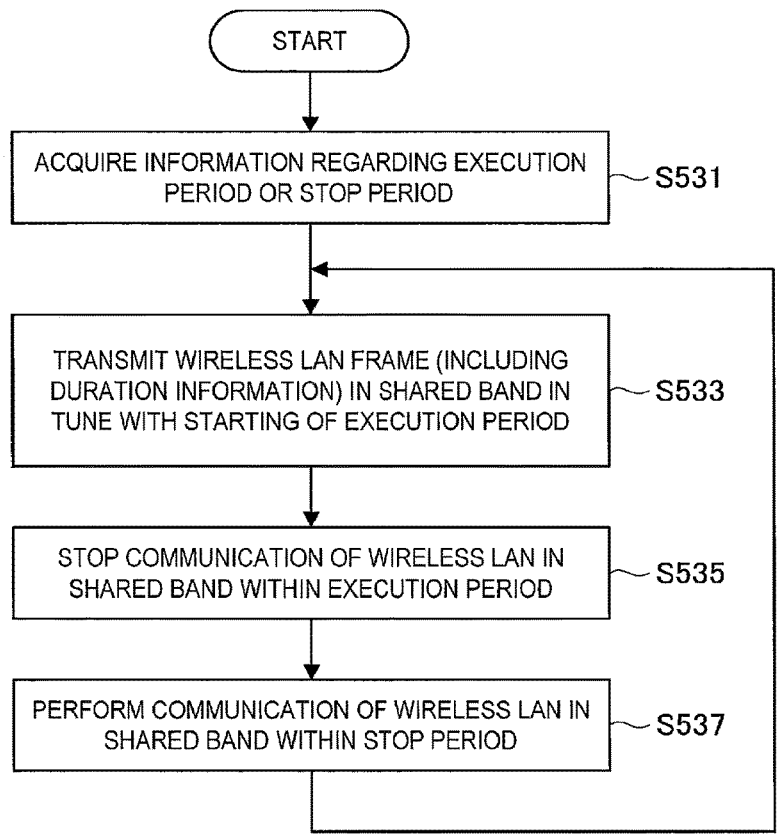
FIG. 18 is a flowchart illustrating a second example of a schematic flow of a process of a wireless LAN node according to a second modification example of the first embodiment.

FIG. 18 is a flowchart illustrating a second example of a schematic flow of a process of the wireless LAN node according to the second modification example of the first embodiment. The wireless LAN node is the access point 300 or the station 400.

The wireless LAN node (the information acquiring unit 351 or the information acquiring unit 441) acquires the information (that is, the period-relevant information) regarding the execution period or the stop period (S531).

The wireless LAN node (the communication processing unit 353 or the communication processing unit 443) transmits the wireless LAN frame in the shared band in tune with starting of the execution period (S533). The wireless LAN frame includes the duration information for setting the NAV. The duration information indicates a duration corresponding to the length of the execution period.

The wireless LAN node (the communication processing unit 353 or the communication processing unit 443) stops the communication of the wireless LAN in the shared band within the execution period (S535).

The wireless LAN node (the communication processing unit 353 or the communication processing unit 443) performs the communication of the wireless LAN in the shared band within the stop period (S537). Then, the process returns to step S533.

5. SECOND EMBODIMENT

Next, a second embodiment of the present disclosure will be described with reference to FIGS. 19 to 22.

5.1. Overview (1) Technical Problem

For example, a frequency band (for example, a channel of a wireless LAN included in a band of 5 GHz) is shared between a cellular system and the wireless LAN. In this case, communication of the cellular system is performed in the frequency band (that is, the shared band) within a certain period and communication of the wireless LAN is performed in the frequency band within another period.

However, when a frequency band is shared between the cellular system and the wireless LAN, interference can occur between the cellular system and the wireless LAN. As a result, communication quality of the cellular system and/or the wireless LAN may deteriorate.

Accordingly, it is desirable to provide a structure enabling interference between a cellular system and a wireless LAN to further decrease in a frequency band (that is, a shared band) shared between the cellular system and the wireless LAN.

(2) Technical Means

In the second embodiment, the base station 100 transmits a beacon frame in a frequency band (that is, a shared band) shared between a cellular system and a wireless LAN. The beacon frame includes a parameter regarding a CFP for a PCF operation and the parameter includes duration information for setting an NAV. The base station 100 performs communication of the cellular system in the frequency band within a period corresponding to the duration information after the beacon frame is transmitted.

Thus, for example, it is possible to enable the interference between the cellular system and the wireless LAN to further decrease in the frequency band (that is, the shared band) shared between the cellular system and the wireless LAN.

5.2. Technical Features

Next, technical features according to the second embodiment will be described with reference to FIGS. 19 and 20.
(1) Transmission of Beacon Frame and Communication of Cellular System in Shared Band As described above, the base station 100 (the communication processing unit 153) transmits a beacon frame in the frequency band (that is, the shared band) shared between the cellular system and the wireless LAN. The beacon frame includes the parameter regarding the CFP for the PCF operation and the parameter includes duration information for setting the NAV.

The base station 100 (the communication processing unit 153) performs the communication of the cellular system in the frequency band (that is, the shared band) within the period corresponding to the duration information after the beacon frame is transmitted. For example, the base station 100 (the communication processing unit 153) stops the communication of the cellular system in the frequency band other than in the period
(a) Shared Band The description of the shared band does not differ between the first and second embodiments. Accordingly, repeated description thereof will be omitted.
(b) Parameter For example, the parameter is a CF parameter and the duration information is a CFP max-duration or a CFP duration remaining.
(c) Period Corresponding to Duration Information For example, the period corresponding to the duration information is a period of which a length is substantially the same as the duration indicated by the duration information.
(d) Process for Transmission As a specific process, the communication processing unit 153 performs a transmission process (for example, generating, encoding, and/or demodulation of the wireless LAN frame) for the wireless LAN frame.

(e) Operation of Station 400

For example, the station 400 sets the NAV of the shared band based on the duration information according to reception of the beacon frame transmitted by the base station 100 in the shared band. The information acquiring unit 441 acquires the duration information according to reception of the beacon frame transmitted by the base station 100 in the shared band. The communication processing unit 443 sets the NAV of the shared band based on the duration information.
(f) Example of Transmission of Beacon Frame and Communication in Shared Band
(f-1) First Example For example, the base station 100 (the communication processing unit 153) transmits the beacon frame at a beacon interval longer than the length of the period. Hereinafter, a specific example will be described with reference to FIG. 19.

Figure 19:
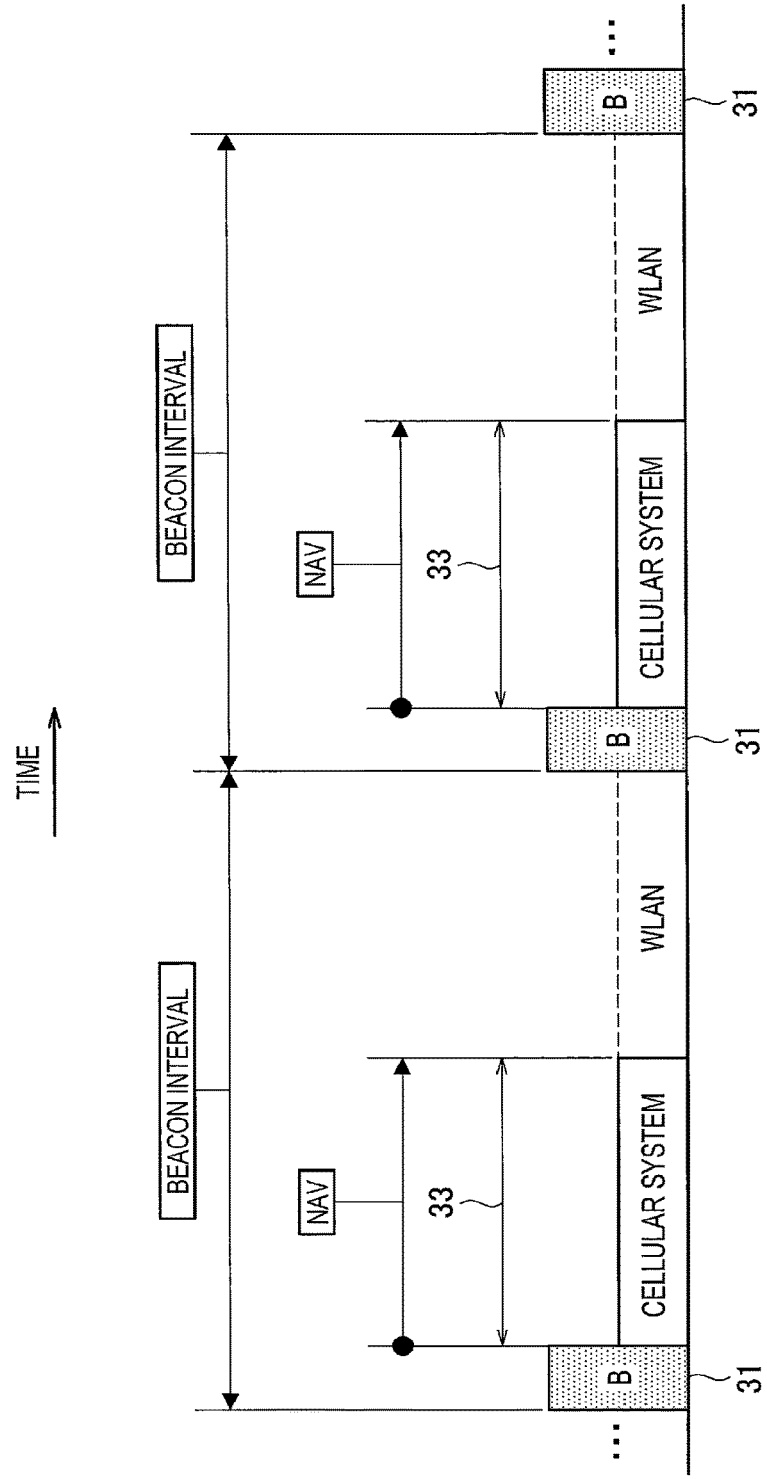
FIG. 19 is an explanatory diagram illustrating a first example of transmission of a beacon frame and communication in a shared band.

FIG. 19 is an explanatory diagram illustrating a first example of transmission of the beacon frame and communication in a shared band. Referring to FIG. 19, the base station 100 transmits a beacon frame 31 including the duration information in the shared band. Then, the base station 100 performs the communication of the cellular system in the shared band within a period 33 corresponding to the duration information (a period shorter than the beacon interval). On the other hand, the station 400 sets the NAV based on the duration information and stops the communication of the wireless LAN in the shared band over the period 33 according to reception of the beacon frame 31. After the period 33 elapses, the NAV becomes 0 and the station 400 performs the communication of the wireless LAN in the shared band. Then, the base station 100 transmits the beacon frame 31 again after the beacon interval elapses.

Thus, for example, a transmission frequency of the beacon frame is further lowered.
(f-2) Second Example The base station 100 (the communication processing unit 153) may alternately perform transmission of the beacon frame and transmission of another beacon frame at a beacon interval which is substantially the same as the length of the period. For example, the other beacon frame does not include the duration information. Alternatively, the other beacon frame may include the duration information and the duration information indicate 0 or a very short duration. Hereinafter, a specific example will be described with reference to FIG. 20.

Figure 20:
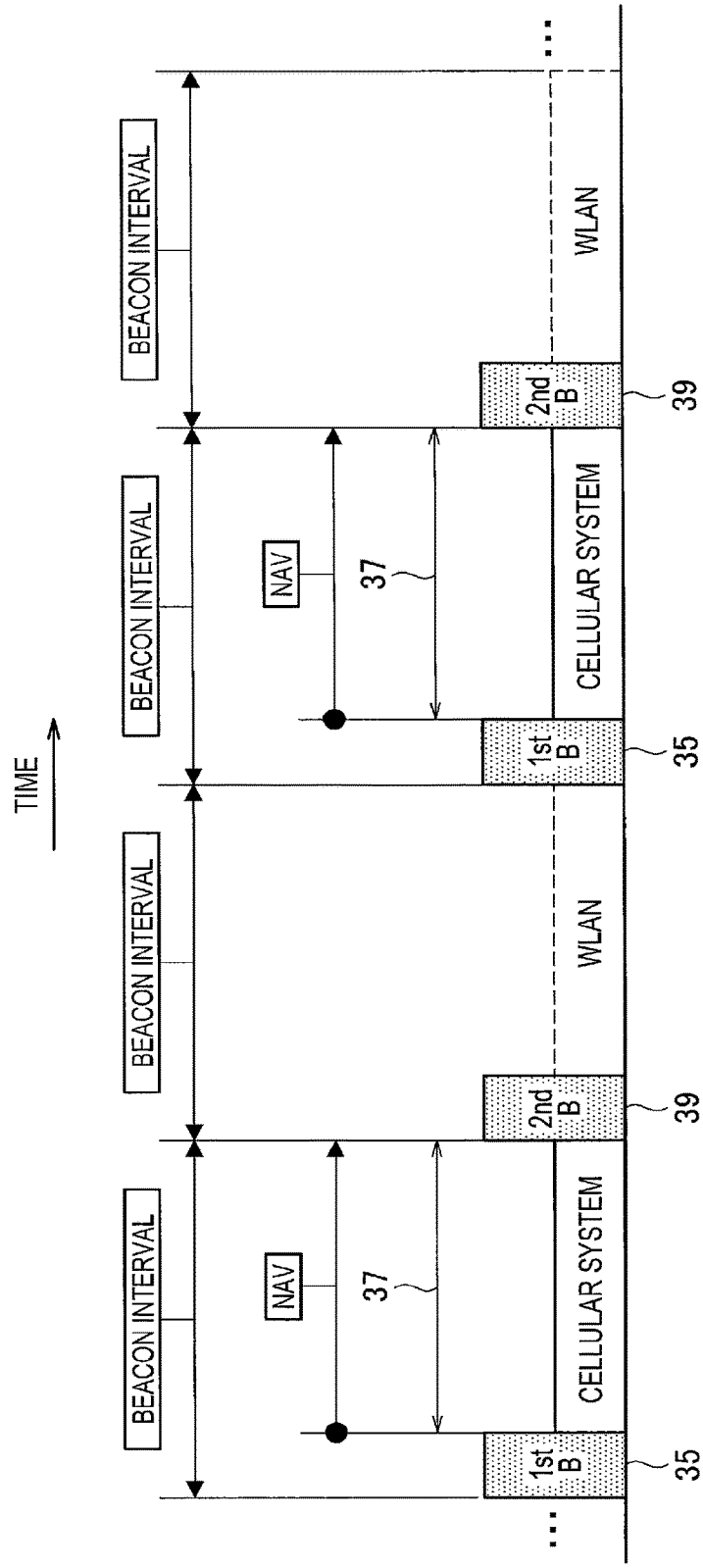
FIG. 20 is an explanatory diagram illustrating a second example of transmission of beacon frames and communication in a shared band.

FIG. 20 is an explanatory diagram illustrating a second example of transmission of beacon frames and communication in the shared band. Referring to FIG. 20, the base station 100 transmits a first beacon frame 35 including the duration information in the shared band. Then, the base station 100 performs the communication of the cellular system in the shared band within a period 37 corresponding to the duration information (a period with a length which is substantially the same as the beacon interval). On the other hand, the station 400 sets the NAV based on the duration information and stops the communication of the wireless LAN in the shared band over the period 37 according to reception of the first beacon frame 35. The base station 100 transmits a second beacon frame 39 after the beacon interval which is substantially the same as the period 37 elapses. The second beacon frame 39 does not include the duration information (or includes duration information indicating 0 or a very short duration) and the station 400 performs the communication of the wireless LAN in the shared band after the second beacon frame 39. Then, after the beacon interval elapses, the base station 100 transmits the first beacon frame 35 again.

Thus, for example, it is possible to suppress the communication of the wireless LAN node in the shared band over a maximum possible duration indicated by the duration information.

As described above, the base station 100 performs the communication of the cellular system in the shared band within the period corresponding to the duration information after the beacon frame is transmitted. Thus, for example, it is possible to further decrease the interference between the cellular system and the wireless LAN in the shared band. More specifically, for example, the wireless LAN node does not transmit a signal in the shared band while the communication of the cellular system is performed in the shared band. Therefore, it is possible to further decrease the interference from the wireless LAN to the cellular system in the shared band.

(2) Transmission of Period Information to Terminal Device (a) Operation of Base Station For example, the base station 100 (the communication processing unit 153) transmits information indicating the period or another period in which the communication of the cellular system in the shared band is stopped (hereinafter referred to as "period information") to the terminal device 200.

For example, the base station 100 (the communication processing unit 153) transmits system information including the period information. Alternatively, the base station 100 (the communication processing unit 153) may individually transmit a message including the period information to the terminal device 200.

As a specific process, for example, the communication processing unit 153 performs a transmission process (for example, generating, scheduling, mapping to radio resources, encoding, and/or modulating of the system information or the message) for the period information.

(b) Operation of Terminal Device

For example, the terminal device 200 performs measurement on the shared band based on information (that is, period information) indicating the period in which communication of the cellular system in the shared band is performed or another period in which the communication of the cellular system in the shared band is stopped.

For example, the information acquiring unit 241 acquires the period information and the measurement unit 243 performs measurement on the shared band based on the period information. Specifically, for example, the measurement unit 243 performs the measurement on the shared band using a signal (for example, a reference signal) transmitted in the shared band in the period (in other words, a period other than the other period).

For example, the measurement includes measurement of a channel state of the shared band. More specifically, for example, the measurement includes measurement of CQI, PMI, PTI, and/or RI.

For example, the measurement includes measurement of reception power and/or reception quality of a reference signal (for example, a CRS) transmitted in the shared band. More specifically, for example, the measurement includes measurement of RSRP and/or RSRQ.

Thus, for example, the base station 100 stops the communication in the shared band. As a result, the terminal device 200 can appropriately perform measurement even when a signal (for example, a reference signal) of the cellular system in the shared band is not transmitted.

(3) Coordination of Beacon Between Base Stations

A transmission timing of the beacon frame and the duration information included in the beacon frame may be a common period between the base station 100 and an adjacent base station to the base station 100. That is, the base station 100 and the adjacent base station may transmit beacon frames including the same duration information at the same timing.

As an example, the base station 100 may transmit information indicating the timing (hereinafter referred to as "timing information") and the duration information to the adjacent base station and the adjacent base station may receive and acquire the timing information and the duration information. Alternatively, the adjacent base station may transmit the timing information and the duration information to the base station 100 and the base station 100 may receive and acquire the timing information and the duration information.

As another example, any control device may transmit the timing information and the duration information to the base station 100 and the adjacent base station, and each of the base station 100 and the adjacent base station may receive and acquire the timing information and the duration information.

As still another example, the timing information and the duration information may be decided in advance and may be set in advance in the base station 100 and the adjacent base station.

As a result of the examples, for example, the base station 100 and the adjacent base station transmit the beacon frame including the duration information in the shared band at the timing indicated by the timing information and subsequently perform the communication in the shared band within a period corresponding to the duration information. Therefore, it is possible to avoid a situation in which a wireless LAN node receiving both a signal transmitted by the base station 100 and a signal transmitted by the adjacent base station may not receive a signal in the shared band over a long time.

5.3. Flow of Process

Next, examples of processes according to the second embodiment will be described with reference to FIGS. 21 and 22.

(1) First Example

Figure 21:
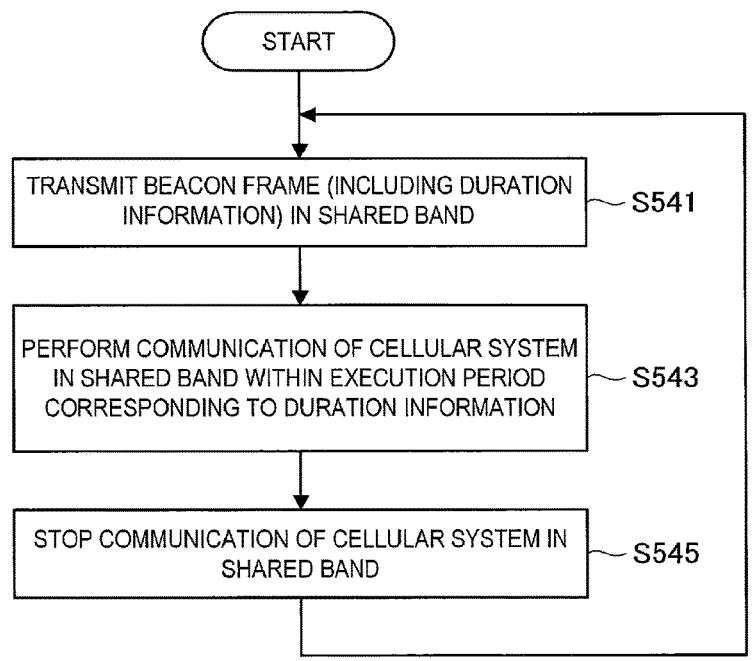
FIG. 21 is a flowchart illustrating the first example of a schematic flow of a process of a base station according to the second embodiment.

FIG. 21 is a flowchart illustrating the first example of a schematic flow of a process of the base station 100 according to the second embodiment. In the first example, the base station 100 transmits the beacon frame at a beacon interval which is longer than a period in which the base station 100 performs the communication of the cellular system in the shared band.

The base station 100 (the communication processing unit 153) transmits the beacon frame in the shared band (S541). The beacon frame includes a parameter regarding the CFP for the PCF operation and the parameter includes duration information for setting the NAV.

The base station 100 (the communication processing unit 153) performs the communication of the cellular system in the shared band within the period corresponding to the duration information (S543). The period is a period shorter than the beacon interval.

Thereafter, the base station 100 (the communication processing unit 153) stops the communication of the cellular system in the shared band (S545). Then, the process returns to step S541.

(2) Second Example

Figure 22:
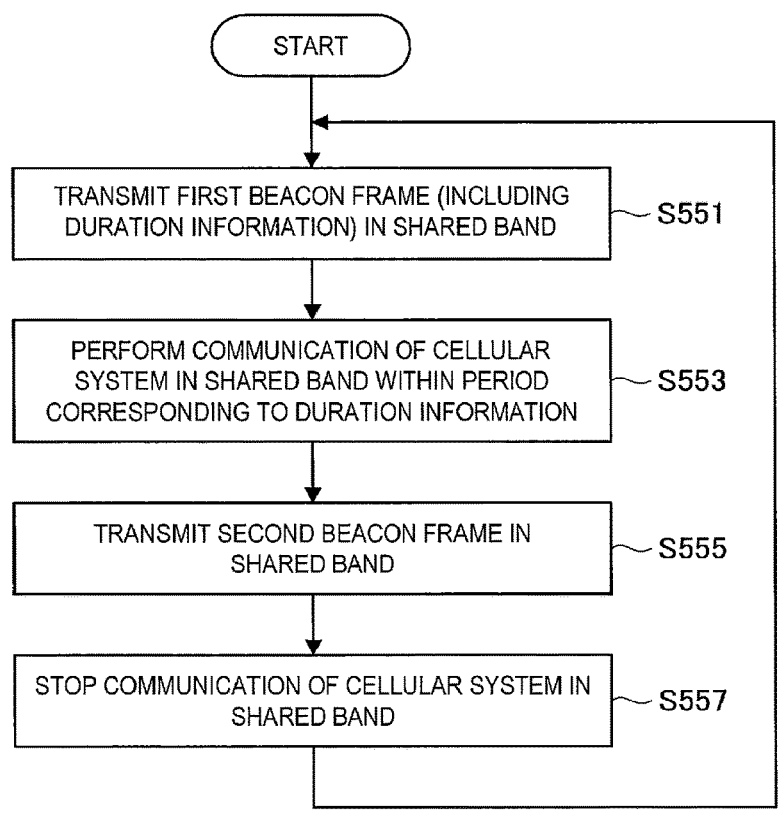
FIG. 22 is a flowchart illustrating the second example of a schematic flow of a process of a base station according to the second embodiment.

FIG. 22 is a flowchart illustrating the second example of a schematic flow of a process of the base station 100 according to the second embodiment. In the second example, at a beacon interval which is substantially the same as the length of the period in which the base station 100 performs the communication of the cellular system in the shared band, the base station 100 alternately performs transmission of a first beacon frame and transmission of a second beacon frame.

The base station 100 (the communication processing unit 153) transmits the first beacon frame in the shared band (S551). The first beacon frame includes the parameter regarding the CFP for the PCF operation and the parameter includes the duration information for setting the NAV.

The base station 100 (the communication processing unit 153) performs the communication of the cellular system in the shared band within the period corresponding to the duration information (S553). The period is a period with a length which is substantially the same as the beacon interval.

Further, the base station 100 (the communication processing unit 153) transmits the second beacon frame in the shared band (S555). For example, the second beacon frame does not include the duration information. Alternatively, the second beacon frame may include the duration information and the duration information may indicate 0 or a very short duration.

The base station 100 (the communication processing unit 153) stops the communication of the cellular system in the shared band (S557). Then, the process returns to step S551.

6. THIRD EMBODIMENT

Next, a third embodiment of the present disclosure will be described with reference to FIGS. 23 to 30.

6.1. Overview (1) Technical Problem

For example, a frequency band (for example, a channel of a wireless LAN included in a band of 5 GHz) is shared between a cellular system and the wireless LAN. In this case, communication of the cellular system is performed in the frequency band (that is, the shared band) within a certain period and communication of the wireless LAN is performed in the frequency band within another period.

However, when a frequency band is shared between the cellular system and the wireless LAN, interference can occur between the cellular system and the wireless LAN. As a result, communication quality of the cellular system and/or the wireless LAN may deteriorate.

Accordingly, it is desirable to provide a structure enabling interference between a cellular system and a wireless LAN to further decrease in a frequency band (that is, a shared band) shared between the cellular system and the wireless LAN.

(2) Technical Means

In the third embodiment, in tune with starting of a first period (hereinafter referred to as an "execution period") in which the base station 100 performs communication in a frequency band (that is, a shared band) shared between a cellular system and a wireless LAN and starting of a second period (hereinafter referred to as a "stop period") in which the base station 100 stops the communication in the frequency band, the access point 300 transmits a beacon frame in the shared band. The beacon frame includes a parameter regarding a CFP for a PCF operation and the parameter includes duration information for setting an NAV.

Thus, for example, it is possible to further decrease interference between the cellular system and the wireless LAN in the frequency band (that is, the shared band) shared between the cellular system and the wireless LAN.

6.2. Technical Features

Next, technical features according to the third embodiment will be described with reference to FIGS. 23 to 27.

(1) Notification of Period to Access Point

For example, the base station 100 notifies the access point 300 of the wireless LAN supporting the PCF operation of the first period (that is, the execution period) in which the base station 100 performs communication in the frequency band (that is, the shared band) shared between the cellular system and the wireless LAN or the second period (that is, the stop period) in which the base station 100 stops the communication in the frequency band.

For example, the information acquiring unit 151 acquires information regarding the execution period or the stop period (hereinafter referred to as "period-relevant information"). The communication processing unit 153 notifies the access point 300 of the execution period or the stop period.

(a) Execution Period/Stop Period

For example, the execution period and the stop period are periodically repeated periods.

For example, the stop period is a period with a length which is substantially the same as the execution period. As an example, the stop period is a period with a length which is substantially the same as the execution period.

(b) Period-Relevant Information

For example, the period-relevant information (that is, information regarding the execution period or the stop period) includes information indicating the length of the execution period or the stop period.

For example, the period-relevant information includes information indicating a starting time point (offset) of the execution period or the stop period. Also, the period-relevant information may not include the information indicating the starting time point. The access point 300 ascertains an ending time point of the execution period (that is, a starting time point of the stop period) through carrier sense. In addition, the access point 300 also ascertains the starting time point of the execution period from the ending time point of the execution period (that is, the starting time point of the stop period) and the length of the execution period or the stop period.

The period-relevant information may include information indicating a cycle of the execution period or the stop period.

(c) Notification Technique (c-1) First Example: Notification via Terminal Device Operation of Base Station 100

As a first example, the base station 100 (the communication processing unit 153) notifies the access point 300 of the execution period or the stop period by transmitting the period-relevant information to the terminal device 200 capable of performing communication in both the cellular system and the wireless LAN.

For example, the base station 100 (the communication processing unit 153) transmits system information including the period-relevant information. Alternatively, the base station 100 (the communication processing unit 153) may individually transmit a message including the period-relevant information to the terminal device 200.

As a specific process, for example, the communication processing unit 153 performs a transmission process (for example, generating, scheduling, mapping to radio resources, encoding, and/or modulating of the system information or the message) for the period-relevant information.

Operation of Terminal Device 200

For example, the terminal device 200 (the information acquiring unit 241) acquires the period-relevant information. Then, for example, the terminal device 200 (the communication processing unit 245) transmits the wireless LAN frame including the period-relevant information to the access point 300.

As an example, the wireless LAN frame is a data frame.

As a specific process, for example, the communication processing unit 245 performs a transmission process (for example, generating, encoding, and/or demodulating of the wireless LAN frame) for the wireless LAN frame.

(b-2) Second Example: Notification to Access Point that is Able to Perform Communication in Cellular System As a second example, the access point 300 may be able to perform communication in the cellular system. In this case, the base station 100 (the communication processing unit 153) may notify the access point 300 of the execution period or the stop period by transmitting the period-relevant information to the access point 300. That is, the base station 100 may directly notify the access point 300 of the execution period or the stop period according to a communication scheme of the cellular system.

The base station 100 (the communication processing unit 153) may transmit the system information including the period-relevant information. Alternatively, the base station 100 (the communication processing unit 153) may individually transmit a message including the period-relevant information to the access point 300.

As a specific example, the communication processing unit 153 may perform a transmission process (for example, generating, scheduling, mapping to radio resources, encoding, and/or modulating of the system information or the message) for the period-relevant information.

(b-3) Third Example: Notification with Wireless LAN Frame

As a third example, the base station 100 (the communication processing unit 153) may notify the access point 300 of the execution period or the stop period by transmitting the wireless LAN frame including the period-relevant information. That is, the base station 100 may directly notify the access point 300 of the execution period or the stop period according to the communication scheme of the wireless LAN.

As an example, the wireless LAN frame may be a data frame.

As a specific process, the communication processing unit 153 may perform a transmission process (for example, generating, encoding, and/or demodulating of the wireless LAN frame) for the wireless LAN frame.

Fourth Example: Notification via Backhauling

As a fourth example, the base station 100 (the communication processing unit 153) may notify the access point 300 of the execution period or the stop period by transmitting the period-relevant information to the access point 300 via backhauling.

As a specific process, the communication processing unit 153 may perform a transmission process (for example, generating and/or encoding of the message) for the message including the period-relevant information.

For example, as described above, the base station 100 (the communication processing unit 153) notifies the access point 300 of the execution period or the stop period. Thus, for example, the access point 300 can be caused to perform an operation of suppressing interference in the communication of the cellular system in the shared band within the execution period.

(2) Transmission of Beacon Frame

As described above, the access point 300 transmits the beacon frame in the shared band in tune with starting of the execution period or the stop period. The beacon frame includes a parameter regarding the CFP for the PCF operation and the parameter includes duration information for setting an NAV.

The information acquiring unit 351 acquires information regarding the execution period or the stop period (that is, the period-relevant information). The communication processing unit 353 transmits the beacon frame in the shared band in tune with starting of the execution period or the stop period.

Thus, for example, it is possible to further decrease interference between the cellular system and the wireless LAN in the shared band. More specifically, for example, the station 400 close to the access point 300 sets the NAV based on the duration information and does not transmit a signal in the shared band within the execution period or the stop period in self-determination. Therefore, it is possible to suppress the interference in the communication of the cellular system in the shared band.

(a) Shared Band

The description of the shared band does not differ between the first and second embodiments. Accordingly, repeated description thereof will be omitted.

(b) Parameter

For example, the parameter is a CF parameter and the duration information is a CFP max-duration or a CFP duration remaining.

(d) Example of Transmission of Beacon Frame and Operation Related to the Transmission (d-1) First Case For example, as a first case, the access point 300 (the communication processing unit 353) transmits the beacon frame in the shared band in tune with starting of one of the execution period and the stop period at a beacon interval which is substantially the same as a sum of the length of the execution period and the length of the stop period.

First Example

Figure 23:
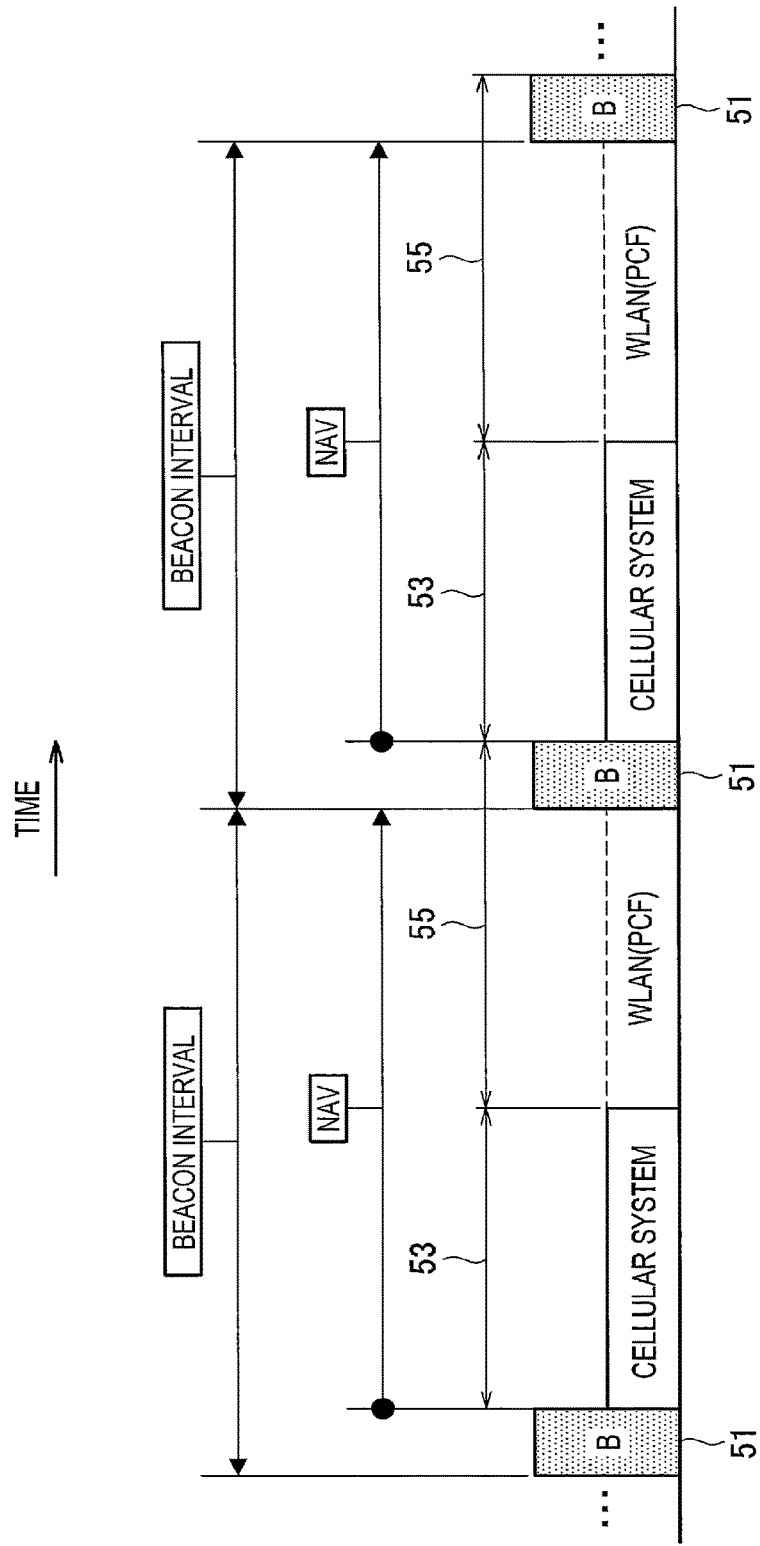
FIG. 23 is an explanatory diagram illustrating a first example of transmission of a beacon frame and an operation related to the transmission in a first case.

FIG. 23 is an explanatory diagram illustrating a first example of transmission of a beacon frame and an operation related to the transmission in the first case.

The access point 300 transmits a beacon frame 51 in the shared band in tune with starting of an execution period 53 in which the base station 100 performs communication in the shared band. The beacon frame 51 includes duration information indicating a duration corresponding to a sum of the length the execution period 53 and the length of a stop period 55 (for example, a duration which is substantially the same as the sum).

The base station 100 performs communication of the cellular system in the shared band within the execution period 53 and subsequently stops the communication of the cellular system in the shared band and within the stop period 55.

On the other hand, the station 400 sets the NAV based on the duration information according to reception of the beacon frame 51. As a result, the station 400 does not transmit a signal in the shared band over the execution period 53 and the stop period 55 unless polling is performed by the access point 300. The access point 300 does not transmit a signal in the shared band over the execution period 53 (of course, does not perform polling either). After the execution period 53 elapses, the access point 300 and the station 400 perform communication of the wireless LAN by the PCF in the shared band within the stop period 55.

Further, after a beacon interval which is substantially the same as the sum of the length of the execution period 53 and the length of the stop period 55 elapses, the access point 300 transmits the beacon frame 51 again.

Thus, for example, it is possible to suppress the interference in the communication of the cellular system in the shared band. In addition, since the communication of the wireless LAN in the stop period is controlled by the PCF, the base station 100 can guarantee the shared band from the starting time point of the execution period more reliably and start the communication of the cellular system.

Second Example

Figure 24:
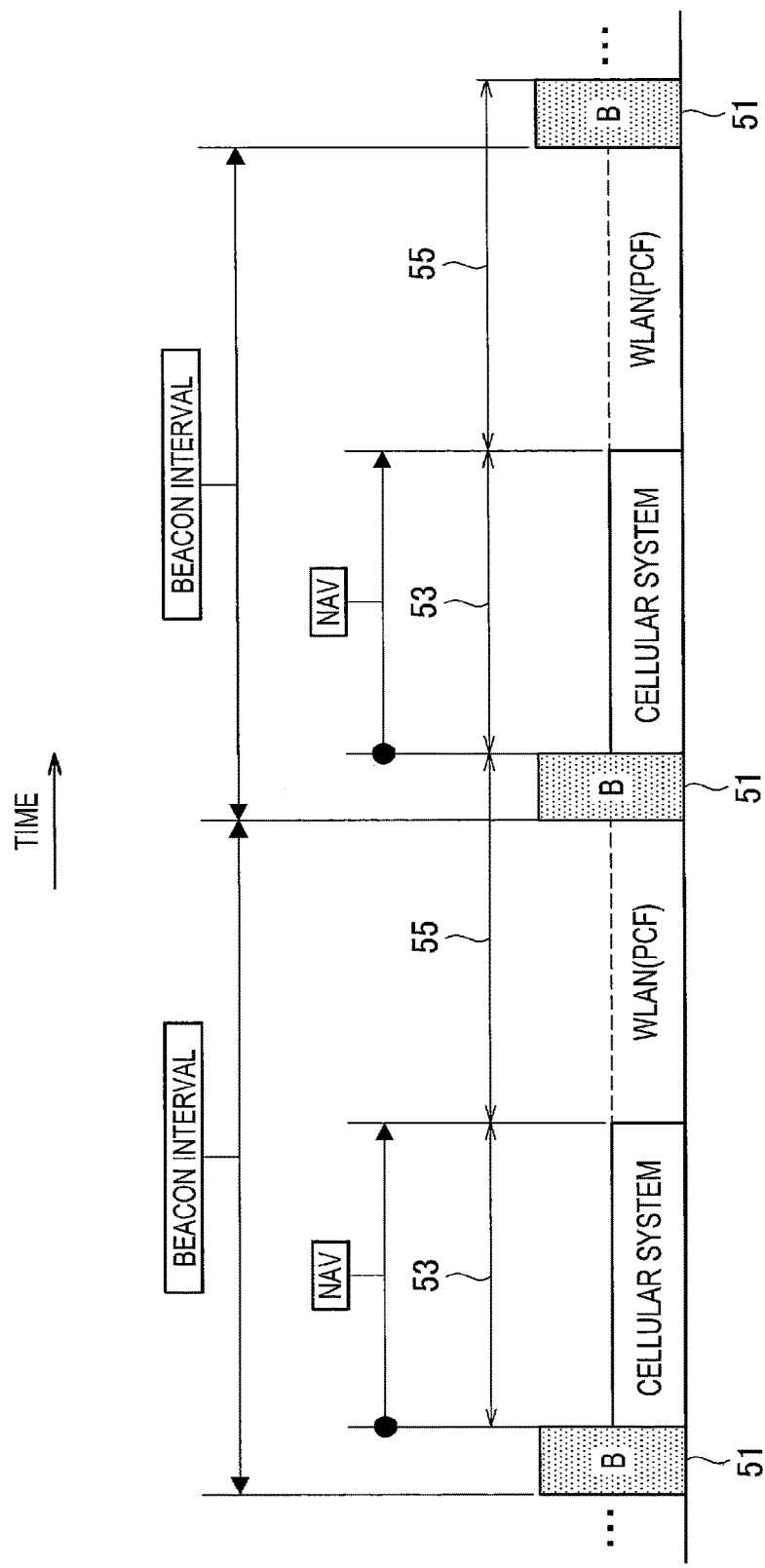
FIG. 24 is an explanatory diagram illustrating a second example of transmission of a beacon frame and an operation related to the transmission in a first case.

FIG. 24 is an explanatory diagram illustrating a second example of transmission of a beacon frame and an operation related to the transmission in the first case.

The access point 300 transmits the beacon frame 51 in the shared band in tune with starting of the execution period 53 in which the base station 100 performs the communication in the shared band. The beacon frame 51 includes duration information indicating a duration corresponding to the length of the execution period 53 (for example, a duration which is substantially the same as the length of the execution period 53).

The base station 100 performs communication of the cellular system in the shared band within the execution period 53 and subsequently stops the communication of the cellular system in the shared band and within the stop period 55.

On the other hand, the station 400 sets the NAV based on the duration information according to reception of the beacon frame 51. As a result, the station 400 does not transmit a signal in the shared band over the execution period 53 unless polling is performed by the access point 300. The access point 300 does not transmit a signal in the shared band over the execution period 53 (of course, does not perform polling either). After the execution period 53 elapses, the NAV of the station 400 becomes 0 and the access point 300 and the station 400 perform communication of the wireless LAN by the DCF in the shared band within the stop period 55.

Further, after a beacon interval which is substantially the same as the sum of the length of the execution period 53 and the length of the stop period 55 elapses, the access point 300 transmits the beacon frame 51 again.

Thus, for example, it is possible to suppress the interference in the communication of the cellular system in the shared band. Further, it is possible to perform the communication of the wireless LAN by the DCF in the stop period.

Third Example

Figure 25:
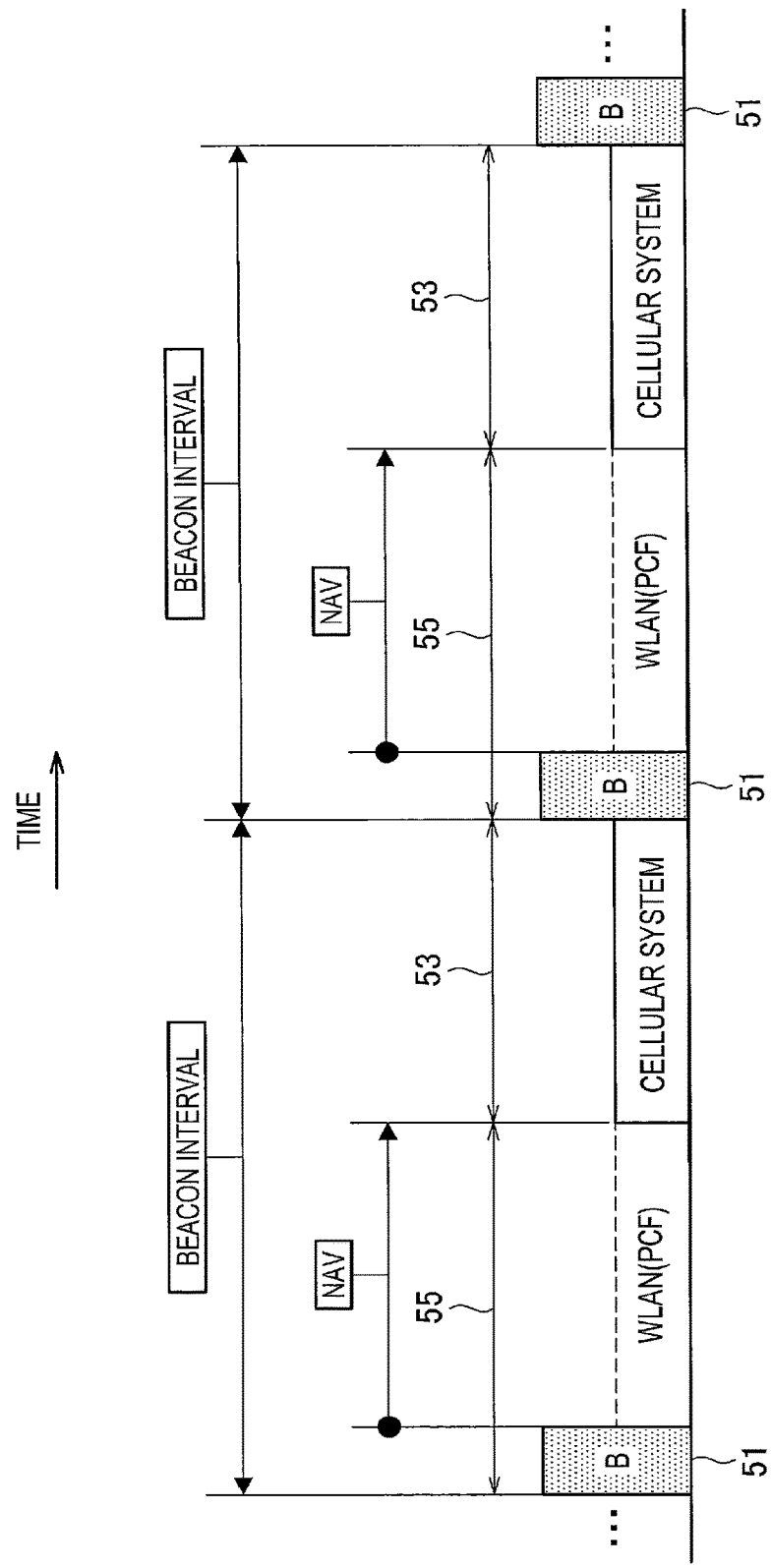
FIG. 25 is an explanatory diagram illustrating a third example of transmission of a beacon frame and an operation related to the transmission in a first case.

FIG. 25 is an explanatory diagram illustrating a third example of transmission of a beacon frame and an operation related to the transmission in the first case.

The access point 300 transmits the beacon frame 51 in the shared band in tune with starting of the stop period 55 in which the base station 100 stops the communication in the shared band. The beacon frame 51 includes duration information indicating a duration corresponding to the length of the stop period 55 (for example, a duration which is substantially the same as the length of the stop period 55).

The base station 100 stops the communication of the cellular system in the shared band and within the stop period 55 and subsequently performs communication of the cellular system in the shared band within the execution period 53.

On the other hand, the station 400 sets the NAV based on the duration information according to reception of the beacon frame 51. As a result, the station 400 does not transmit a signal in the shared band over the stop period 55 unless polling is performed by the access point 300. The access point 300 and the station 400 perform the communication of the wireless LAN by the PCF in the shared band within the stop period 55. After the stop period 55 elapses, the NAV of the station 400 becomes 0. However, since the communication of the cellular system is performed within the execution period 53, the shared band is in a busy state. Therefore, the access point 300 and the station 400 do not transmit a signal in the shared band over the execution period 53 as a result of the carrier sense.

Further, after a beacon interval which is substantially the same as the sum of the length of the execution period 53 and the length of the stop period 55 elapses, the access point 300 transmits the beacon frame 51 again.

Thus, for example, it is possible to suppress the interference in the communication of the cellular system in the shared band. In addition, for example, since the communication of the wireless LAN in the stop period is controlled by the PCF, the base station 100 can guarantee the shared band from the starting time point of the execution period more reliably and start the communication of the cellular system.

(d-2) Second Case

As a second case, the execution period and the stop period may have substantially the same length. The access point 300 (the communication processing unit 353) may transmit the beacon frame in the shared band in tune with starting of each of the execution period and the stop period at a beacon interval which is substantially the same as the length of each of the execution period and the stop period.

First Example

Figure 26:
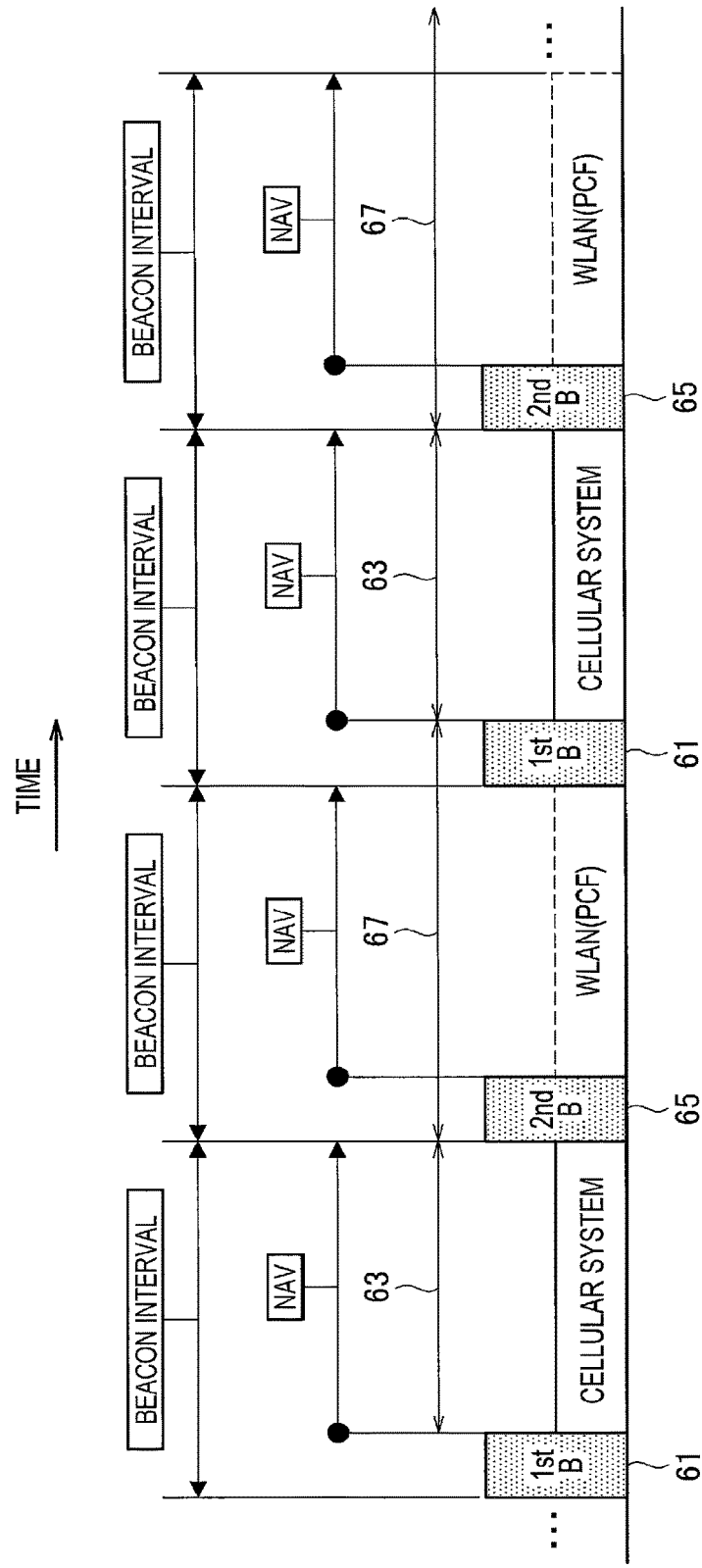
FIG. 26 is an explanatory diagram illustrating a first example of transmission of a beacon frame and an operation related to the transmission in a second case.

FIG. 26 is an explanatory diagram illustrating a first example of transmission of a beacon frame and an operation related to the transmission in the second case.

The access point 300 transmits a first beacon frame 61 in the shared band in tune with starting of an execution period 63 in which the base station 100 performs communication in the shared band. The first beacon frame 61 includes duration information indicating a duration corresponding to the length the execution period 63 (for example, a duration which is substantially the same as the length of the execution period 63).

The base station 100 performs the communication of the cellular system in the shared band within the execution period 63.

On the other hand, the station 400 sets the NAV based on the duration information according to reception of the first beacon frame 61. As a result, the station 400 does not transmit a signal in the shared band over the execution period 63 unless polling is performed by the access point 300. The access point 300 does not transmit a signal in the shared band over the execution period 63 (of course, does not perform polling either).

Further, the access point 300 transmits a second beacon frame 65 in the shared band in tune with starting of a stop period 67 in which the base station 100 stops the communication in the shared band (in other words, after a beacon interval which is substantially the same as the length of the execution period 63 elapses). The second beacon frame 65 includes duration information indicating a duration corresponding to the length of the stop period 67 (for example, a duration which is substantially the same as the length of the stop period 67).

The base station 100 stops the communication of the cellular system in the shared band within the stop period 67.

On the other hand, the station 400 sets the NAV based on the duration information according to reception of the second beacon frame 65. As a result, the station 400 does not transmit a signal in the shared band over the stop period 67 unless polling is performed by the access point 300. The access point 300 and the station 400 perform communication of the wireless LAN by the PCF in the shared band within the stop period 67.

Further, the access point 300 transmits the first beacon frame 61 in the shared band again in tune with starting of the execution period 63 (in other words, after a beacon interval which is substantially the same as the length of the stop period 67 elapses).

Thus, for example, it is possible to suppress the interference in the communication of the cellular system in the shared band. In addition, since the communication of the wireless LAN in the stop period is controlled by the PCF, the base station 100 can guarantee the shared band from the starting time point of the execution period more reliably and start the communication of the cellular system.

Second Example

Figure 27:
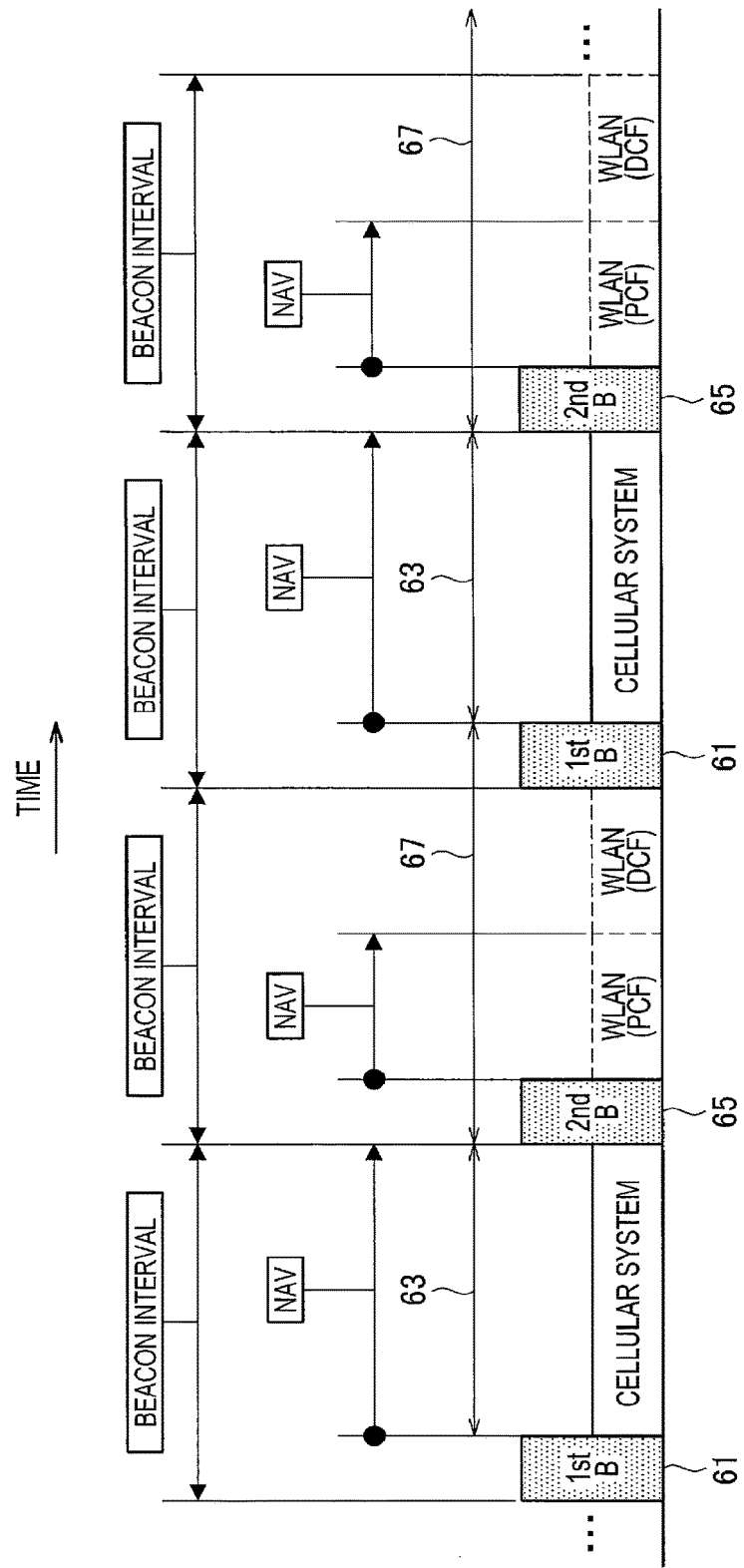
FIG. 27 is an explanatory diagram illustrating a second example of transmission of a beacon frame and an operation related to the transmission in a second case.

FIG. 27 is an explanatory diagram illustrating a second example of transmission of a beacon frame and an operation related to the transmission in the second case.

The access point 300 transmits the first beacon frame 61 in the shared band in tune with starting of the execution period 63 in which the base station 100 performs communication in the shared band. The first beacon frame 61 includes duration information indicating a duration corresponding to the length of the execution period 63 (for example, a duration which is substantially the same as the length of the execution period 63).

The base station 100 performs communication of the cellular system in the shared band within the execution period 63.

On the other hand, the station 400 sets the NAV based on the duration information according to reception of the first beacon frame 61. As a result, the station 400 does not transmit a signal in the shared band over the execution period 63 unless polling is performed by the access point 300. The access point 300 does not transmit a signal in the shared band over the execution period 63 (of course, does not perform polling either).

Further, the access point 300 transmits the second beacon frame 65 in the shared band in tune with starting of the stop period 67 in which the base station 100 stops the communication in the shared band (in other words, after the beacon interval which is substantially the same as the length of the execution period 63 elapses). The second beacon frame 65 includes the duration information indicating a shorter duration than the stop period 67.

The base station 100 stops the communication of the cellular system in the shared band within the stop period 67.

On the other hand, the station 400 sets the NAV based on the duration information according to reception of the second beacon frame 65. Then, the access point 300 and the station 400 perform the communication of the wireless LAN by the PCF in the shared band within the duration time indicated by the duration information (that is, a period shorter than the stop period 67) in the stop period 67. Thereafter, the access point 300 and the station 400 perform the communication of the wireless LAN by the DCF in the shared band within the remaining period of the stop period 67.

Further, the access point 300 transmits the first beacon frame 61 in the shared band again in tune with starting of the execution period 63 (in other words, after a beacon interval which is substantially the same as the length of the stop period 67 elapses).

Also, the second beacon frame 65 may include duration information indicating a duration of 0. As a result, the access point 300 and the station 400 may perform communication of the wireless LAN by the DCF in the shared band within the stop period 67.

Thus, for example, it is possible to suppress the interference in the communication of the cellular system in the shared band. Further, it is possible to perform the communication of the wireless LAN by the DCF (and the PCF) in the stop period.

(3) Operation for Terminal Device
(a) Operation of Base Station

For example, the base station 100 (the communication processing unit 153) transmits information indicating the execution period or the stop period (hereinafter referred to as "period information") to the terminal device 200 performing the communication of the cellular system. The description of this point does not differ between the first and third embodiments. Accordingly, repeated description thereof will be omitted.

(b) Operation of Terminal Device

For example, the terminal device 200 performs measurement on the shared band based on the period information indicating the execution period (that is, a period in which the communication of the cellular system in the shared band is performed) or the stop period (that is, a period in which the communication of the cellular system in the shared band is stopped). The description of this point does not differ between the first and third embodiments. Accordingly, repeated description thereof will be omitted.

(4) Coordination of Execution Period/Stop Period Between Base Stations

The execution period and the stop period may be a common period between the base station 100 and an adjacent base station to the base station 100. The description of this point does not differ between the first and third embodiments. Accordingly, repeated description thereof will be omitted.

6.3. Flow of Process

Next, examples of processes according to the third embodiment will be described with reference to FIGS. 28 to 30.

(1) Process of Base Station 100

Figure 28:
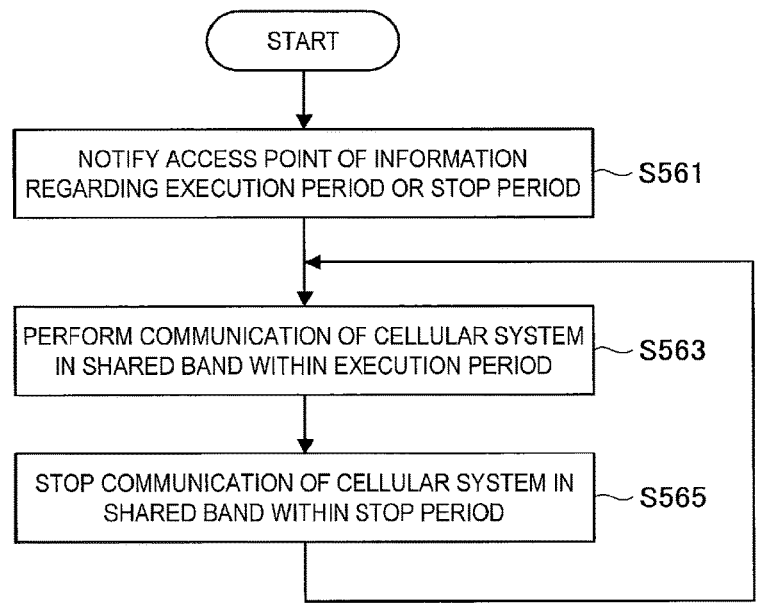
FIG. 28 is a flowchart illustrating an example of a schematic flow of a process of a base station according to the third embodiment.

FIG. 28 is a flowchart illustrating an example of a schematic flow of a process of the base station 100 according to the third embodiment.

The base station 100 (the information acquiring unit 151) acquires the information (that is, the period-relevant information) regarding the execution period or the stop period. The base station 100 (the communication processing unit 153) notifies the access point 300 of the execution period or the stop period (S561).

The base station 100 (the communication processing unit 153) performs the communication of the cellular system in the shared band within the execution period (S563).

The base station 100 (the communication processing unit 153) stops the communication of the cellular system in the shared band within the stop period (S565). Then, the process returns to step S563.

(1) Process of Access Point 300
(a) First Example

Figure 29:
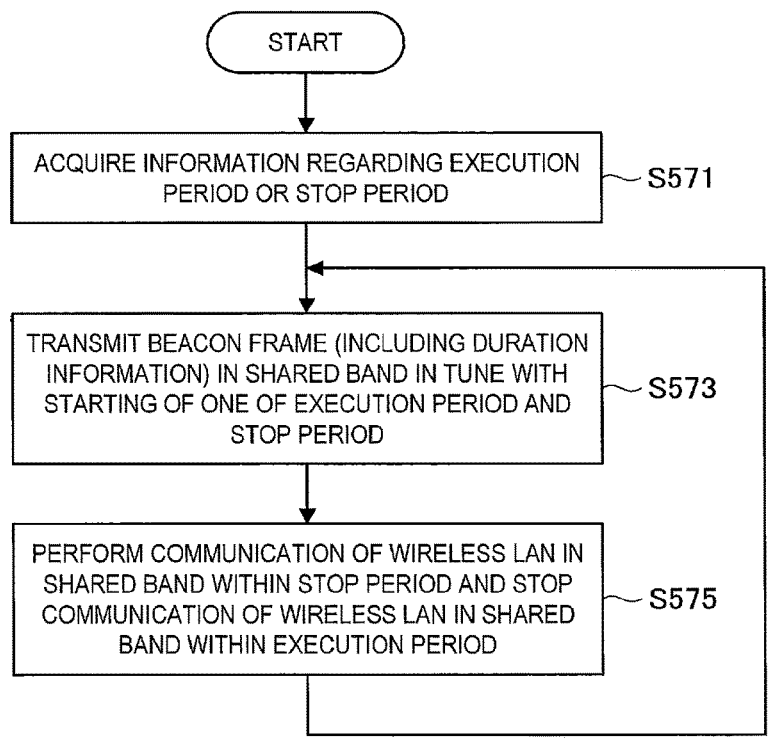
FIG. 29 is a flowchart illustrating a first example of a schematic flow of a process of an access point according to the third embodiment.

FIG. 29 is a flowchart illustrating a first example of a schematic flow of a process of the access point 300 according to the third embodiment. The first example is a process corresponding to the above-described first case.

The access point 300 (the information acquiring unit 351) acquires the information regarding the execution period or the stop period (that is, the period-relevant information) (S571).

The access point 300 (the communication processing unit 353) transmits the beacon frame in the shared band in tune with starting of one of the execution period and the stop period (S573). The beacon frame includes a beacon frame including the parameter regarding the CFP for the PCF operation and the parameter includes the duration information for setting the NAV.

The access point 300 (the communication processing unit 353) performs the communication of the wireless LAN in the shared band within the stop period and stops the communication of the wireless LAN in the shared band within the execution period (S575). Then, the process returns to step S573.

(b) Second Example

Figure 30:
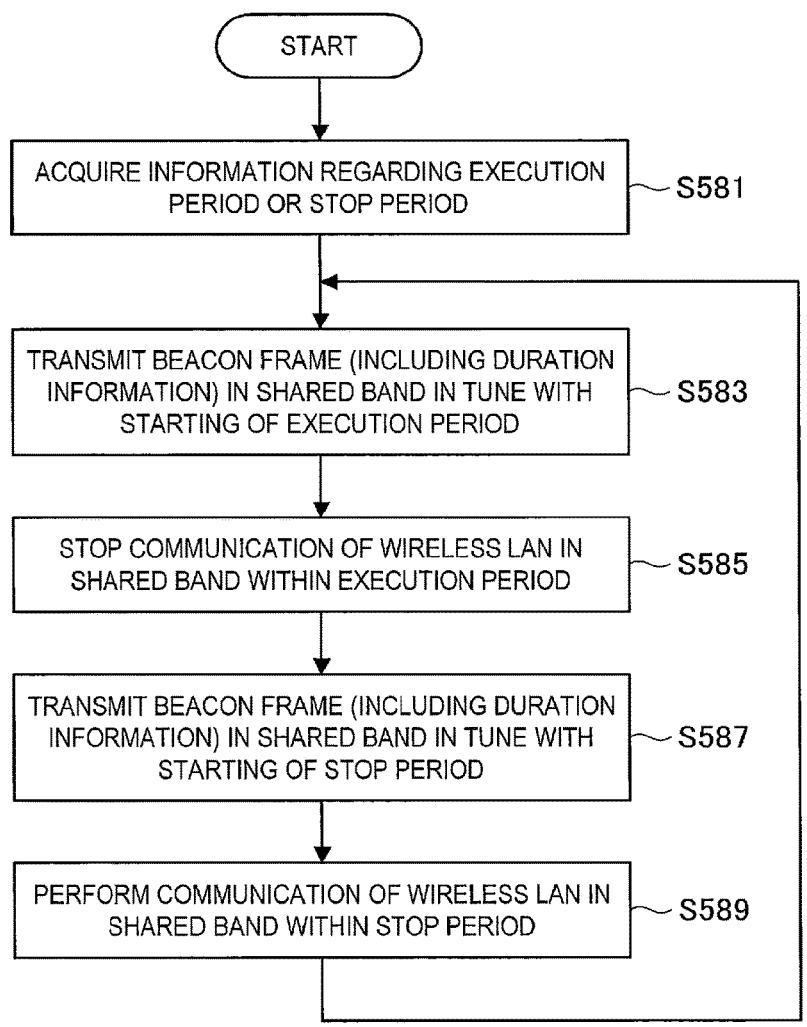
FIG. 30 is a flowchart illustrating a second example of a schematic flow of a process of an access point according to the third embodiment.

FIG. 30 is a flowchart illustrating a second example of a schematic flow of a process of the access point 300 according to the third embodiment. The second example is a process corresponding to the above-described second case.

The access point 300 (the information acquiring unit 351) acquires the information regarding the execution period or the stop period (that is, the period-relevant information) (S581).

The access point 300 (the communication processing unit 353) transmits the beacon frame in the shared band in tune with starting of the execution period (S583). The beacon frame is a beacon frame including the parameter regarding the CFP for the PCF operation and the parameter includes the duration information for setting the NAV. The duration information indicates a duration corresponding to the length of the execution period.

The access point 300 (the communication processing unit 353) stops the communication of the wireless LAN in the shared band within the execution period (S585).

The access point 300 (the communication processing unit 353) transmits the beacon frame in the shared band in tune with starting of the stop period (S587). The beacon frame is also the beacon frame including the parameter regarding the CFP for the PCF operation and the parameter includes the duration information for setting the NAV.

The access point 300 (the communication processing unit 353) performs the communication of the wireless LAN in the shared band within the stop period (S589). Then, the process returns to step S583.

7. APPLICATION EXAMPLES

Technology according to the present disclosure is applicable to various products. For example, the base station 100 may be implemented as a type of eNB such as a macro eNB or a small eNB. The small eNB may be an eNB to cover a cell smaller than a macro cell such as a pico eNB, a micro eNB, or a home (femto) eNB. Conversely, the base station 100 may also be realized as another type of base station, such as a Node B or a base transceiver station (BTS). The base station 100 may also include a main unit that controls wireless communication (also called a base station device), and one or more remote radio heads (RRHs) placed in a location separate from the main unit. Also, various types of terminals to be described below temporarily or semi-permanently execute a base station function and therefore may operate as the base station 100. Further, at least part of components of the base station 100 may be implemented in a base station device or a module for the base station device.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, at least a part of constituent elements of the terminal device 200 may be realized in a module mounted onboard these terminals (for example, an integrated circuit module configured on a single die).

For example, the access point 300 may be realized as a wireless LAN access point (which is also referred to as a wireless base station) that has no router function or has a router function. The access point 300 may be realized as a mobile wireless LAN router. Furthermore, at least a part of constituent elements of the access point 300 may be realized in wireless communication modules mounted in such devices (for example, integrated circuit modules configured in one die).

For example, the station 400 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the station 400 may be realized as terminals (also referred to as machine type communication (MTC) terminals) which perform machine to machine (M2M) communication, such as smart meters, vending machine, remote monitoring apparatuses and point of sale (POS) terminals. Furthermore, at least a part of constituent elements of the station 400 may be realized in wireless communication modules mounted in such terminals (for example, integrated circuit modules configured in one die).

Figure 31:
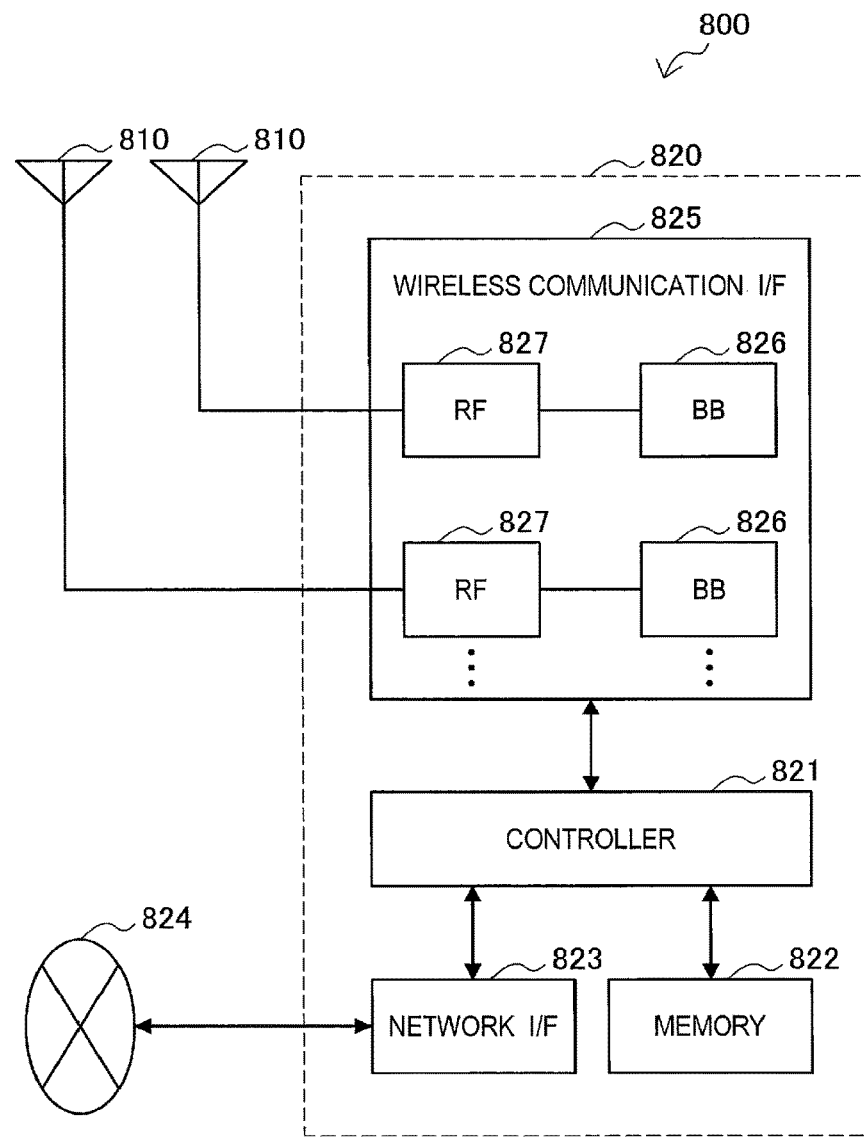
FIG. 31 is a block diagram illustrating a first example of a schematic configuration of an eNB.

7.1. Application Examples Regarding Base Station (1) First Application Example FIG. 31 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 31. For example, the multiple antennas 810 may be compatible with multiple frequency bands used by the eNB 800. Although FIG. 31 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as LTE and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-mentioned logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 31. For example, the multiple BB processors 826 may be compatible with multiple frequency bands used by the eNB 800. The wireless communication interface 825 may include the multiple RF circuits 827, as illustrated in FIG. 31. For example, the multiple RF circuits 827 may be compatible with multiple antenna elements. Although FIG. 31 illustrates the example in which the wireless communication interface 825 includes the multiple BB processors 826 and the multiple RF circuits 827, the wireless communication interface 825 may also include a single BB processor 826 or a single RF circuit 827.

Further, the wireless communication interface 825 may support wireless LAN communication schemes (for example, one or more of the wireless LAN standards such as IEEE 802.11a, 11b, 11g, 11n, 11ac, and 11ad) in addition to the cellular communication scheme. In this case, the wireless communication interface 825 may include the BB processor 826 (and the RF circuit 827) of the wireless LAN communication scheme.

In the eNB 800 illustrated in FIG. 31, the information acquiring unit 151 and/or the communication processing unit 153 described with reference to FIG. 8 may be implemented in the wireless communication interface 825. Alternatively, at least a part of these constituent elements may be implemented in the controller 821. As one example, the eNB 800 is equipped with a module including a part (for example, the BB processor 826) or all of the wireless communication interface 825 and/or the controller 821, and the information acquiring unit 151 and/or the communication processing unit 153 may be implemented in the module. In this case, the above-mentioned module may store a program for causing the processor to function as the information acquiring unit 151 and/or the communication processing unit 153 (in other words, a program for causing the processor to execute the operation of the information acquiring unit 151 and/or the communication processing unit 153) and execute the program. As another example, a program for causing the processor to function as the information acquiring unit 151 and/or the communication processing unit 153 is installed in the eNB 800, and the wireless communication interface 825 (for example, the BB processor 826) and/or the controller 821 may execute the program. As mentioned above, the eNB 800, the base station device 820, or the above-mentioned module may be provided as the device including the information acquiring unit 151 and/or the communication processing unit 153, and the program for causing the processor to function as the information acquiring unit 151 and/or the communication processing unit 153 may be provided. Also, a readable storage medium storing the above-mentioned program may be provided.

Also, in the eNB 800 illustrated in FIG. 31, the wireless communication unit 120 described with reference to FIG. 8 may be implemented in the wireless communication interface 825 (for example, the RF circuit 827). Also, the antenna unit 110 may be implemented in the antenna 810. Also, the network communication unit 130 may be implemented in the controller 821 and/or the network interface 823.

(2) Second Application Example

Figure 32:
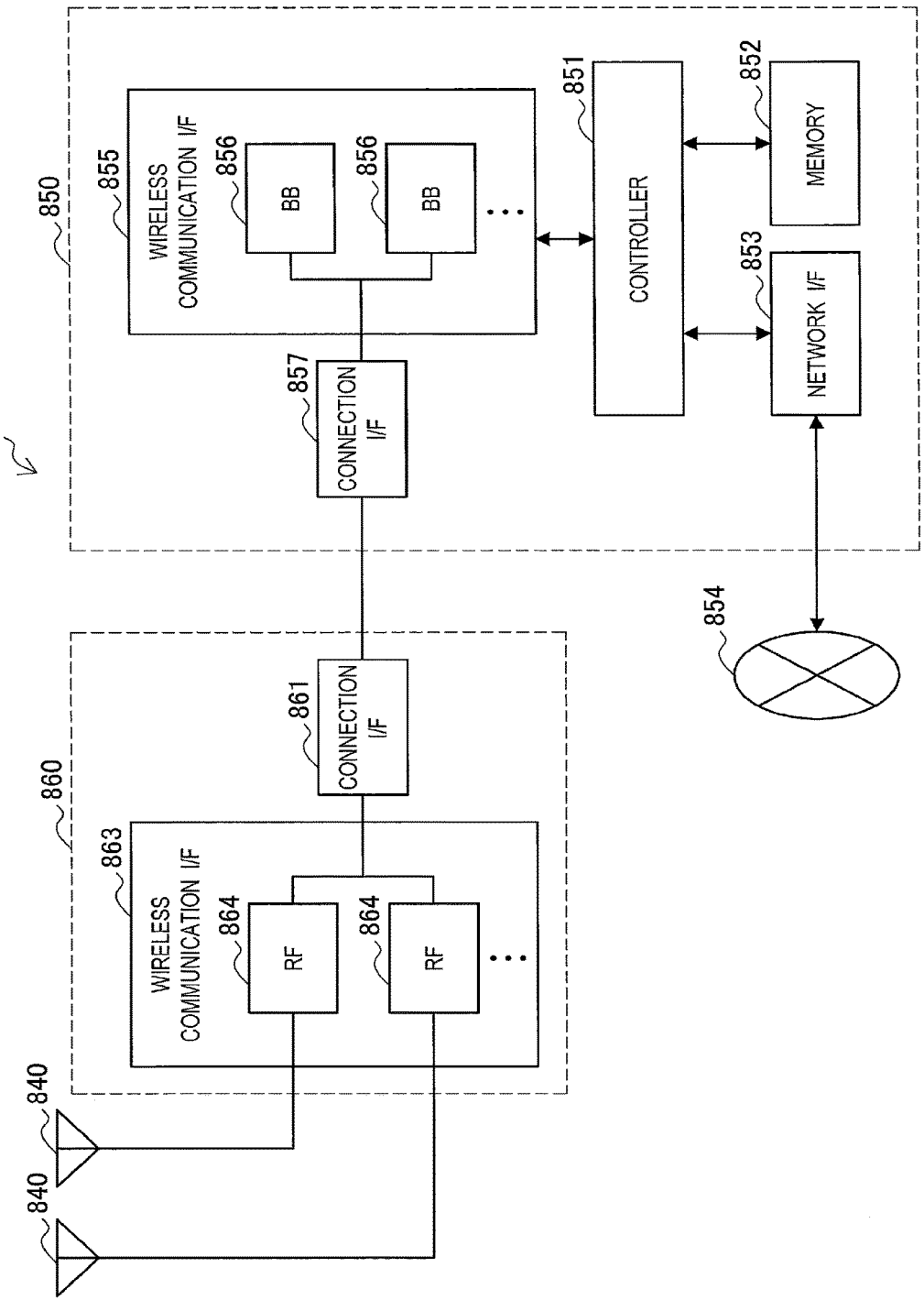
FIG. 32 is a block diagram illustrating a second example of a schematic configuration of an eNB.

FIG. 32 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 32. For example, the multiple antennas 840 may be compatible with multiple frequency bands used by the eNB 830. Although FIG. 32 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 31.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 31, except the BB processor 856 is connected to the RF circuit 864 of the RRH 860 via the connection interface 857. The wireless communication interface 855 may include the multiple BB processors 856, as illustrated in FIG. 32. For example, the multiple BB processors 856 may be compatible with multiple frequency bands used by the eNB 830. Although FIG. 32 illustrates the example in which the wireless communication interface 855 includes the multiple BB processors 856, the wireless communication interface 855 may also include a single BB processor 856.

Further, the wireless communication interface 855 may support wireless LAN communication schemes (for example, one or more of the wireless LAN standards such as IEEE 802.11a, 11b, 11g, 11n, 11ac, and 11ad) in addition to the cellular communication scheme. In this case, the wireless communication interface 855 may include the BB processor 856 of the wireless LAN communication scheme.

Furthermore, in addition to a cellular communication scheme, the wireless communication interface 855 may support a radio LAN communication scheme. In that case, the wireless communication interface 825 may include the BB processor 856 in the radio LAN communication scheme.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-mentioned high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 32. For example, the multiple RF circuits 864 may support multiple antenna elements. Although FIG. 32 illustrates the example in which the wireless communication interface 863 includes the multiple RF circuits 864, the wireless communication interface 863 may also include a single RF circuit 864.

In the eNB 830 illustrated in FIG. 32, the information acquiring unit 151 and/or the communication processing unit 153 described with reference to FIG. 8 may be implemented in the wireless communication interface 855 or the wireless communication interface 863. Alternatively, at least a part of these constituent elements may be implemented in the controller 851. As one example, the eNB 830 is equipped with a module including a part (for example, the BB processor 856) or all of the wireless communication interface 855 and/or the controller 851, and the information acquiring unit 151 and/or the communication processing unit 153 may be implemented in the module. In this case, the above-mentioned module may store a program for causing the processor to function as the information acquiring unit 151 and/or the communication processing unit 153 (in other words, a program for causing the processor to execute the operation of the information acquiring unit 151 and/or the communication processing unit 153) and execute the program. As another example, a program for causing the processor to function as the information acquiring unit 151 and/or the communication processing unit 153 is installed in the eNB 830, and the wireless communication interface 855 (for example, the BB processor 856) and/or the controller 851 may execute the program. As mentioned above, the eNB 830, the base station device 850, or the above-mentioned module may be provided as the device including the information acquiring unit 151 and/or the communication processing unit 153, and the program for causing the processor to function as the information acquiring unit 151 and/or the communication processing unit 153 may be provided. Also, a readable storage medium storing the above-mentioned program may be provided.

Also, in the eNB 830 illustrated in FIG. 32, the wireless communication unit 120 described, for example, with reference to FIG. 8 may be implemented in the wireless communication interface 863 (for example, the RF circuit 864). Also, the antenna unit 110 may be implemented in the antenna 840. Also, the network communication unit 130 may be implemented in the controller 851 and/or the network interface 853.

Figure 33:
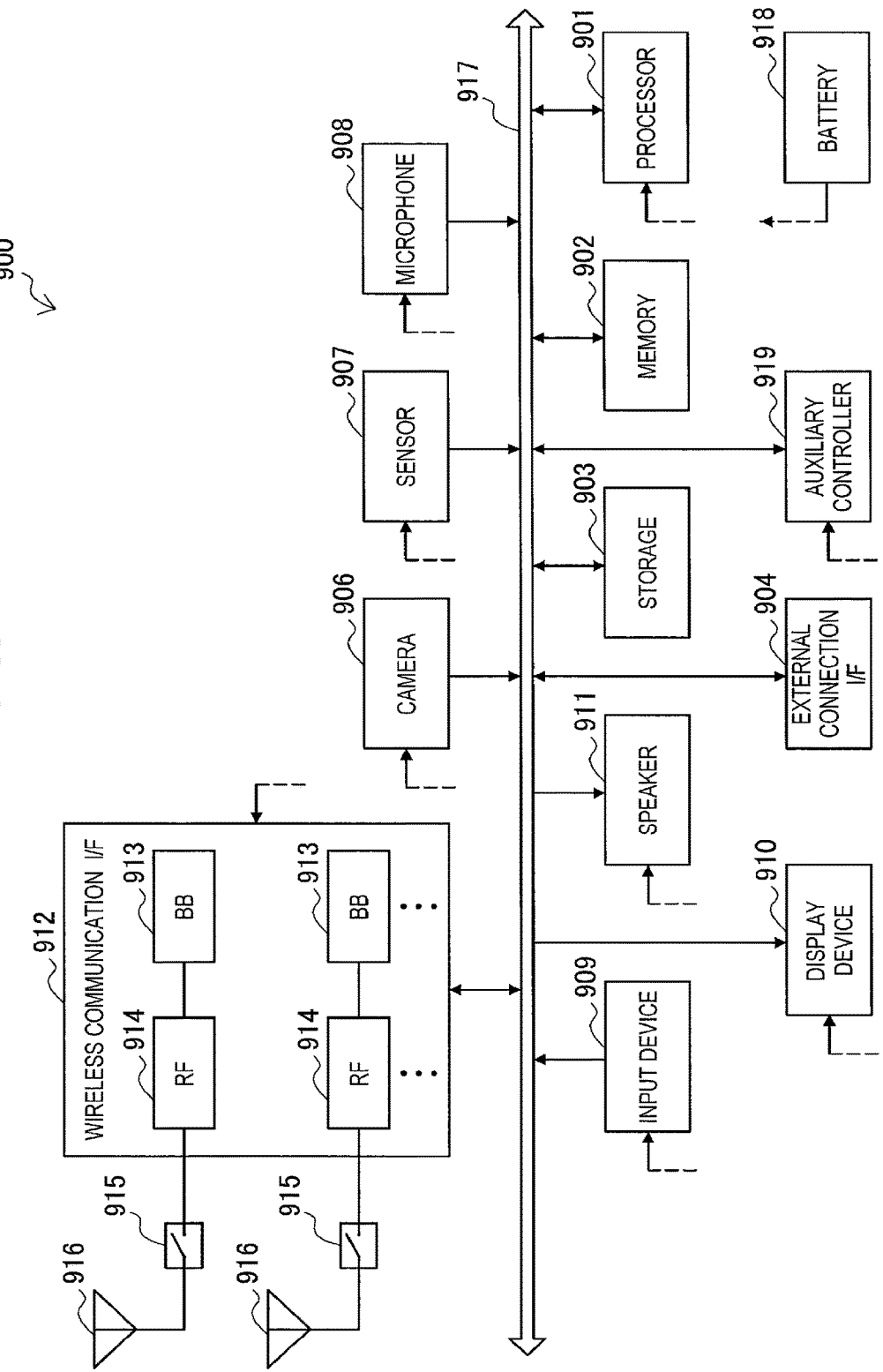
FIG. 33 is a block diagram illustrating an example of a schematic configuration of a smartphone.

7.2. Application Examples Regarding Terminal Device and Station (1) First Application Example FIG. 33 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 934 and the multiple RF circuits 914, as illustrated in FIG. 33. Although FIG. 33 illustrates the example in which the wireless communication interface 912 includes the multiple BB processors 913 and the multiple RF circuits 914, the wireless communication interface 912 may also include a single BB processor 913 or a single RF circuit 914.

Further, the wireless communication interface 912 may support wireless LAN communication schemes (for example, one or more of the wireless LAN standards such as IEEE 802.11a, 11b, 11g, 11n, 11ac, and 11ad) in addition to the cellular communication scheme. In this case, the wireless communication interface 912 may include the BB processor 913 (and the RF circuit 914) of the wireless LAN communication scheme. In addition, the wireless communication interface 912 may support another type of wireless communication scheme such as a short-range wireless communication scheme or a proximity wireless communication scheme. In this case, the wireless communication interface 912 may include the BB processor 913 (and the RF circuit 914) for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 33. Although FIG. 33 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 33 via feeder lines, which are partially shown as dashed lines in the figure. The auxiliary controller 919 operates a minimum necessary function of the smartphone 900, for example, in a sleep mode.

In the smartphone 900 illustrated in FIG. 33, one or more constituent elements (the information acquiring unit 241, the measurement unit 243 and/or the communication processing unit 245) included in the processing unit 240 described with reference to FIG. 9 may be implemented in the wireless communication interface 912. Alternatively, at least a part of these constituents elements may be implemented in the processor 901 or the auxiliary controller 919. As one example, the smartphone 900 is equipped with a module including a part (for example, the BB processor 913) or all of the wireless communication interface 912, the processor 901 and/or the auxiliary controller 919, and the above-mentioned one or more constituent elements may be implemented in the module. In this case, the above-mentioned module may store a program for causing the processor to function as the above-mentioned one or more constituent elements (in other words, a program for causing the processor to execute the operation of the above-mentioned one or more constituent elements) and execute the program. As another example, a program for causing the processor to function as the above-mentioned one or more constituent elements is installed in the smartphone 900, and the wireless communication interface 912 (for example, the BB processor 913), the processor 901, and/or the auxiliary controller 919 may execute the program. As mentioned above, the smartphone 900 or the above-mentioned module may be provided as the device including the above-mentioned one or more constituent elements, and the program for causing the processor to function as the above-mentioned one or more constituent elements may be provided. Also, a readable storage medium storing the above-mentioned program may be provided. In regard to this point, the information acquiring unit 441 and/or the communication processing unit 443 described with reference to FIG. 11 is the same as the one or more constituent elements included in the processing unit 240.

Also, in the smartphone 900 illustrated in FIG. 33, the wireless communication unit 220 described, for example, with reference to FIG. 9 may be implemented in the wireless communication interface 912 (for example, the RF circuit 914). Also, the antenna unit 210 may be implemented in the antenna 916. In regard to this point, the antenna unit 410 and/or the wireless communication unit 420 described with reference to FIG. 11 is the same as the antenna unit 210 and/or the wireless communication unit 220.

(2) Second Application Example

Figure 34:
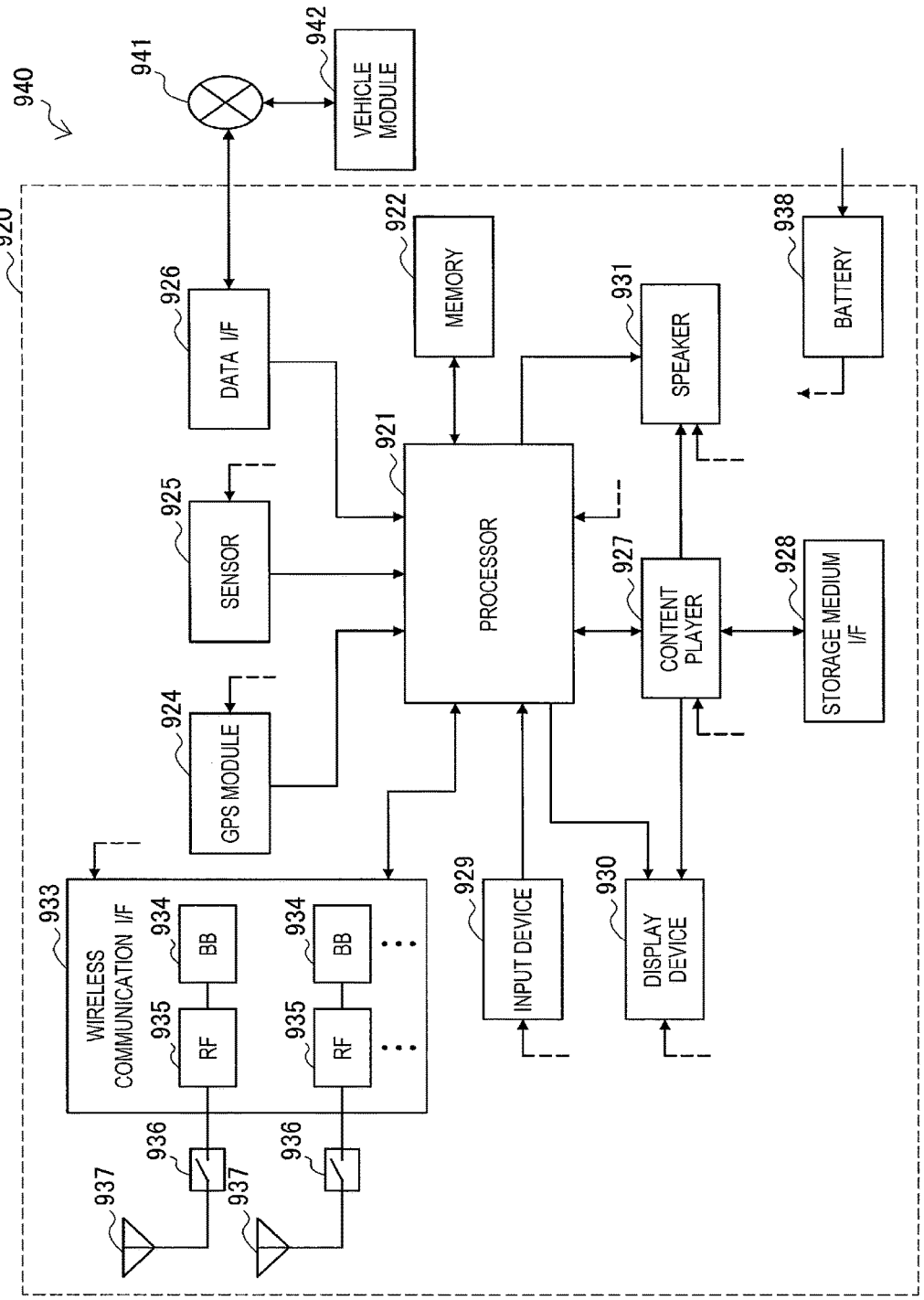
FIG. 34 is a block diagram illustrating an example of a schematic configuration of a car navigation device.

FIG. 34 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 34. Although FIG. 34 illustrates the example in which the wireless communication interface 933 includes the multiple BB processors 934 and the multiple RF circuits 935, the wireless communication interface 933 may also include a single BB processor 934 or a single RF circuit 935.

Further, the wireless communication interface 933 may support wireless LAN communication schemes (for example, one or more of the wireless LAN standards such as IEEE 802.11a, 11b, 11g, 11n, 11ac, and 11ad) in addition to the cellular communication scheme. In this case, the wireless communication interface 933 may include the BB processor 934 (and the RF circuit 935) of the wireless LAN communication scheme. In addition, the wireless communication interface 933 may support another type of wireless communication scheme such as a short-range wireless communication scheme or a proximity wireless communication scheme. In this case, the wireless communication interface 933 may include the BB processor 934 (and the RF circuit 935) for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 34. Although FIG. 34 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 34 via feeder lines that are partially shown as dashed lines in the figure. The battery 938 accumulates power supplied form the vehicle.

In the car navigation device 920 illustrated in FIG. 34, one or more constituent elements included in the processing unit 240 (the information acquiring unit 241, the measurement unit 243, and/or the communication processing unit 245) described with reference to FIG. 9 may be implemented in the wireless communication interface 933. Alternatively, at least a part of these constituent elements may be implemented in the processor 921. As one example, the car navigation device 920 is equipped with a module including a part (for example, the BB processor 934) or all of the wireless communication interface 933, and/or processor 921, and the above-mentioned one or more constituent elements may be implemented in the module. In this case, the above-mentioned module may store a program for causing the processor to function as the above-mentioned one or more constituent elements (in other words, a program for causing the processor to execute the operation of the above-mentioned one or more constituent elements) and execute the program. As another example, a program for causing the processor to function as the above-mentioned one or more constituent elements is installed in the car navigation device 920, and the wireless communication interface 933 (for example, the BB processor 934), and/or the processor 921 may execute the program. As mentioned above, the car navigation device 920 or the above-mentioned module may be provided as the device including the above-mentioned one or more constituent elements, and the program for causing the processor to function as the above-mentioned one or more constituent elements may be provided. Also, a readable storage medium storing the above-mentioned program may be provided. In regard to this point, the information acquiring unit 441 and/or the communication processing unit 443 described with reference to FIG. 11 is the same as the one or more constituent elements included in the processing unit 240.

Also, in the car navigation device 920 illustrated in FIG. 34, the wireless communication unit 220 described, for example, with reference to FIG. 9 may be implemented in the wireless communication interface 933 (for example, the RF circuit 935). Also, the antenna unit 210 may be implemented in the antenna 937. In regard to this point, the antenna unit 410 and/or the wireless communication unit 420 described with reference to FIG. 11 is the same as the antenna unit 210 and/or the wireless communication unit 220.

The technology of the present disclosure may also be realized as an in-vehicle system (or a vehicle) 940 including one or more blocks of the car navigation device 920, the in-vehicle network 941, and a vehicle module 942. That is, the in-vehicle system (or the vehicle) 940 may be provided as a device including one or more constituent elements included the processing unit 240 (the information acquiring unit 241, the measurement unit 243, and/or the communication processing unit 245). The vehicle module 942 generates vehicle data such as vehicle speed, engine speed, and trouble information, and outputs the generated data to the in-vehicle network 941. In regard to this point, the information acquiring unit 441 and/or the communication processing unit 443 described with reference to FIG. 11 is the same as the one or more constituent elements included in the processing unit 240.

7.3. Application Example Regarding Access Point

Figure 35:
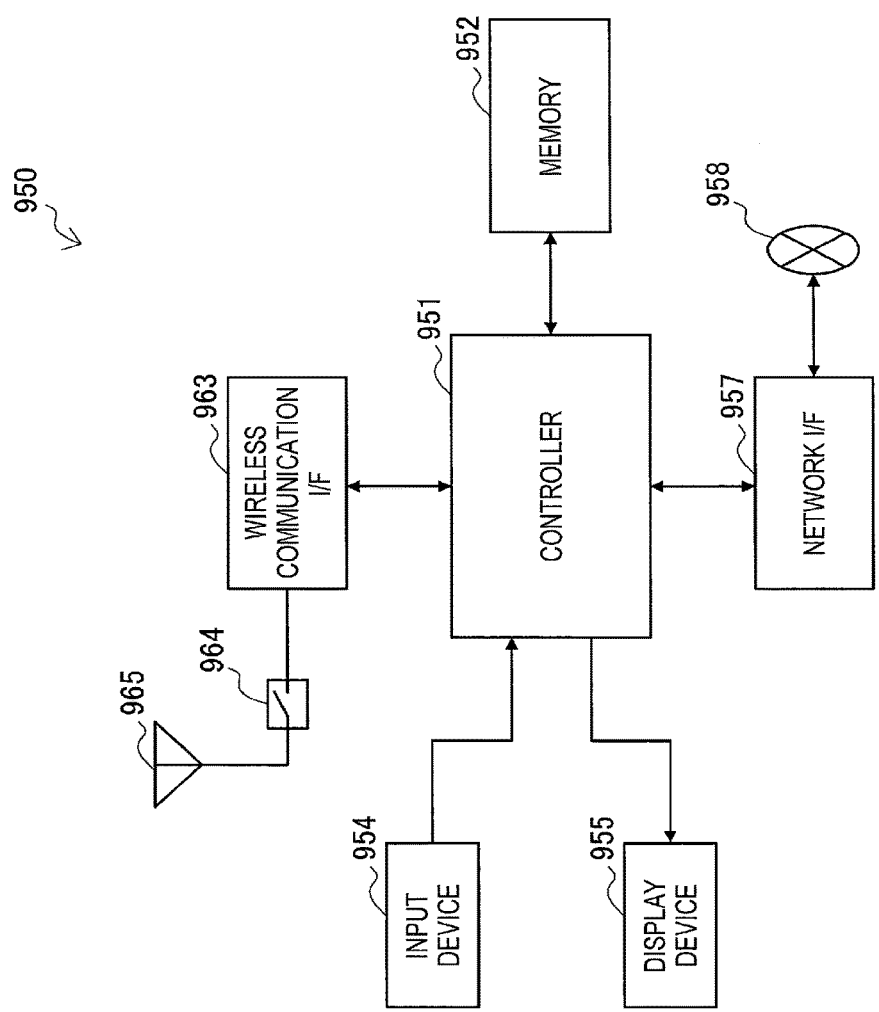
FIG. 35 is a block diagram illustrating an example of a schematic configuration of a wireless access point.

FIG. 35 is a block diagram showing an example of a schematic configuration of a wireless access point 1050 to which the technology of the present disclosure can be applied. The wireless access point 1050 includes a controller 1051, a memory 1052, an input device 1054, a display device 1055, a network interface 1057, a wireless communication interface 1063, an antenna switch 1064, and an antenna 1065.

The controller 1051 may be, for example, a CPU or a digital signal processor (DSP) and operates various functions (for example, access restriction, routing, encryption, firewall, and log management) of the Internet Protocol (IP) layer and higher layers of the wireless access point 1050. The memory 1052 includes a RAM and a ROM and stores a program to be executed by the controller 1051 and various kinds of control data (for example, a terminal list, a routing table, an encryption key, security setting, and a log).

The input device 1054 includes, for example, buttons or switches and receives manipulations from a user. The display device 1055 includes an LED lamp or the like and displays operation status of the wireless access point 1050.

The network interface 1057 is a wired communication interface that connects the wireless access point 1050 to a wired communication network 1058. The network interface 1057 may include a plurality of connection terminals. The wired communication network 1058 may be a LAN such as Ethernet (registered trademark) or a wide area network (WAN).

The wireless communication interface 1063 supports one or more wireless LAN standards of IEEE 802.11a, 11b, 11g, 11n, 11ac, and 11ad to provide a wireless connection to a terminal located nearby as an access point. The wireless communication interface 1063 can typically have a baseband processor, an RF circuit, a power amplifier, and the like. The wireless communication interface 1063 may be a single-chip module on which a memory that stores a communication control program, a processor that executes the program, and a relevant circuit are integrated. The antenna switch 1064 switches a connection destination of the antenna 1065 for a plurality of circuits included in the wireless communication interface 1063. The antenna 1065 has a single antenna element or a plurality of antenna elements and is used for transmission and reception of wireless signals from the wireless communication interface 1063.

In the wireless access point 1050 illustrated in FIG. 35, the information acquiring unit 351 and the communication processing unit 353 described with reference to FIG. 10 may be implemented in the controller 1051. Alternatively, at least a part of these constituent elements may be implemented in the wireless communication interface 1063. As one example, the wireless access point 1050 is equipped with a module including the controller 1051 and/or the wireless communication interface 1063, and the information acquiring unit 351 and the communication processing unit 353 may be implemented in the module. In this case, the above-mentioned module may store a program for causing the processor to function as the information acquiring unit 351 and the communication processing unit 353 (in other words, a program for causing the processor to execute the operation of the information acquiring unit 351 and the communication processing unit 353) and execute the program. As another example, a program for causing the processor to function as the information acquiring unit 351 and the communication processing unit 353 is installed in the wireless access point 1050, and the controller 1051 and/or the wireless communication interface 1063 may execute the program. As mentioned above, the wireless access point 1050 or the above-mentioned module may be provided as the device including the information acquiring unit 351 and the communication processing unit 353, and the program for causing the processor to function as the information acquiring unit 351 and the communication processing unit 353 may be provided. Also, a readable storage medium storing the above-mentioned program may be provided.

8. CONCLUSION

The devices and the processes according to the embodiments of the present disclosure have been described above with reference to FIGS. 6 to 35.

(1) First Embodiment

According to the first embodiment, the base station 100 includes the communication processing unit 153 that performs the communication of the cellular system in the frequency band (that is, the shared band) shared between the cellular system and the wireless LAN within the first period (that is, the execution period) and stops the communication of the cellular system in the frequency band within the second period (that is, the stop period). The first period is one or more subframes including a subframe in which a synchronization signal of the cellular system is transmitted. The second period is one or more other subframes not including the subframe in which the synchronization signal is transmitted.

Thus, for example, the terminal device can more easily maintain the synchronization for the communication of the cellular system in the frequency band (that is, the shared band) shared between the cellular system and the wireless LAN.

(2) Second Embodiment

According to the second embodiment, the base station 100 includes the communication processing unit 153 that transmits the beacon frame in the frequency band (that is, the shared band) shared between the cellular system and the wireless LAN. The beacon frame includes the parameter which is the parameter regarding the CFP for the PCF operation and includes the duration information for setting the NAV The communication processing unit 153 performs the communication of the cellular system in the frequency band within the period corresponding to the duration information after the beacon frame is transmitted.

Thus, for example, it is possible to further decrease the interference between the cellular system and the wireless LAN in the frequency band (that is, the shared band) shared between the cellular system and the wireless LAN.

(3) Third Embodiment

According to the third embodiment, the base station 100 includes the information acquiring unit 151 that acquires the information (that is, the period-relevant information) regarding the first period (that is, the execution period) in which the base station 100 performs the communication in the frequency band (that is, the shared band) shared between the cellular system and the wireless LAN and the second period (that is, the stop period) in which the base station 100 stops the communication in the frequency band and the communication processing unit 153 that notifies the access point 300 of the wireless LAN supporting the PCF operation of the first or second period.

According to the third embodiment, the access point 300 includes the information acquiring unit 351 that acquires the information (that is, the period-relevant information) regarding the first period (that is, the execution period) in which the base station 100 performs the communication in the frequency band (that is, the shared band) shared between the cellular system and the wireless LAN and the second period (that is, the stop period) in which the base station 100 stops the communication in the frequency band and the communication processing unit 353 that transmits the beacon frame in the frequency band in tune with starting of the first or second period. The beacon frame includes the parameter which is the parameter regarding the CFP for the PCF operation and includes the duration information for setting the NAV.

Thus, for example, it is possible to further decrease the interference between the cellular system and the wireless LAN in the frequency band (that is, the shared band) shared between the cellular system and the wireless LAN.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although an example in which the communication system is a system conforming to LTE, LTE-Advanced, or a compliant communication scheme has been described, the present disclosure is not limited to such an example. For example, the communication system may be the one conforming to another communication standard.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Further, it is also possible to create a computer program for making a processor (such as, for example, a CPU and a DSP) provided at apparatuses (such as, for example, a base station, a base station device or the module of the base station device, a terminal device or the module for the terminal device, an access point or the module for the access point, or a station or the module for the station) in the present specification function as components of the above-described apparatuses (for example, the information acquiring unit, the communication processing unit, and/or the measurement unit, and so on) (in other words, a computer program for making the processor execute operation of the components of the above-described apparatuses). Further, it is also possible to provide a recording medium having the above-described computer program recorded therein. Further, it is also possible to provide an apparatus (such as, for example, a base station, a base station device or the module of the base station device, a terminal device or the module for the terminal device, an access point or the module for the access point, or a station or the module for the station) including a memory having the above-described computer program stored therein and one or more processors which can execute the above-described computer program. Further, a method including the operation of the components (for example, the information acquiring unit, the communication processing unit, and/or the measurement unit, and so on) of the above-described apparatuses is included in the technique according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A device including:

a communication processing unit configured to perform communication of a cellular system in a frequency band shared between the cellular system and a wireless LAN within a first period and stop the communication of the cellular system in the frequency band within a second period, wherein the first period is one or more subframes including a subframe in which a synchronization signal of the cellular system is transmitted, and the second period is one or more other subframes not including the subframe in which the synchronization signal is transmitted.

(2)

The device according to (1), wherein the one or more subframes are subframes including a predetermined subframe number, and the one or more other subframes are subframes including another predetermined subframe number.

(3)

The device according to (1) or (2), wherein each of the first and second periods is a period repeated at a cycle of a radio frame.

(4)

The device according to any one of (1) to (3), wherein the communication processing unit transmits a wireless LAN frame in the frequency band in tune with starting of the first period, and the wireless LAN frame includes duration information which is duration information for setting a network allocation vector (NAV) and indicates a duration corresponding to a length of the first period.

(5)

The device according to (4), wherein the wireless LAN frame is a beacon frame including a parameter regarding a control free period (CFP) for a point control function (PCF) operation, and the parameter includes the duration information.

(6)

The device according to (4), wherein the wireless LAN frame is a request to send (RTS) frame or a clear to send (CTS) frame.

(7)

The device according to any one of (4) to (6), wherein the communication processing unit transmits the wireless LAN frame in the frequency band at a radio frame interval.

(8)

The device according to any one of (1) to (7), wherein the communication processing unit notifies a wireless LAN node of the first or second period.

(9)

The device according to (8), wherein the wireless LAN node is an access point that supports a PCF operation.

(10)

The device according to any one of (1) to (9), wherein the communication processing unit transmits information indicating the first or second period to a terminal device that performs the communication of the cellular system.

(11)
The device according to any one of (1) to (9),
wherein the communication processing unit uses the one or more other subframes as multimedia broadcast multicast service (MSMB) over single frequency network (MBSFN) subframes.

(12)
The device according to any one of (1) to (11),
wherein the frequency band is a channel of the wireless LAN.

(13)
A device including:
an acquiring unit configured to acquire information regarding a first period in which communication of a cellular system is performed in a frequency band shared between the cellular system and a wireless LAN or a second period in which the communication of the cellular system in the frequency band is stopped; and
a communication processing unit configured to transmit a wireless LAN frame in the frequency band in tune with starting of the first or second period,
wherein the wireless LAN frame includes duration information for setting an NAV.

(14)
The device according to (13),
wherein the first period is one or more subframes including a subframe in which a synchronization signal of the cellular system is transmitted, and
the second period is one or more other subframes not including the subframe in which the synchronization signal is transmitted.

(15)
The device according to (13) or (14),
wherein the communication processing unit transmits the wireless LAN frame in the frequency band in tune with starting of the second period,
the wireless LAN frame is a beacon frame including a parameter regarding a CFP for a PCF operation,
the parameter includes the duration information, and
the duration information indicates a duration corresponding to a length of the second period.

(16)
The device according to (13) or (14),
wherein the communication processing unit transmits the wireless LAN frame in the frequency band in tune with starting of the first period, and
the duration information indicates a duration corresponding to a length of the first period.

(17)
A device including:
an acquiring unit configured to acquire information indicating a first period in which communication of a cellular system is performed in a frequency band shared between the cellular system and a wireless LAN or a second period in which the communication of the cellular system in the frequency band is stopped; and
a measurement unit configured to perform measurement on the frequency band based on the information,
wherein the first period is one or more subframes including a subframe in which a synchronization signal of the cellular system is transmitted, and
the second period is one or more other subframes not including the subframe in which the synchronization signal is transmitted.

(18)
The device according to (17),
wherein the measurement includes measurement of a channel state of the frequency band or measurement of reception power or reception quality of a reference signal transmitted in the frequency band.

(19)
The device according to (17) or (18), further including:
a communication processing unit configured to transmit information regarding the first or second period to a wireless LAN node.

(20)
A device including:
an acquiring unit configured to acquire duration information included in a wireless LAN frame according to reception of the wireless LAN frame transmitted by a base station of a cellular system in a frequency band shared between the cellular system and a wireless LAN; and
a communication processing unit configured to set an NAV of the frequency band based on the duration information.

(21)
A device including:
a communication processing unit configured to transmit a beacon frame in a frequency band shared between a cellular system and a wireless LAN,
wherein the beacon frame includes a parameter which is a parameter regarding a CFP for a PCF operation and includes duration information for setting an NAV, and
the communication processing unit performs communication of the cellular system in the frequency band within a period corresponding to the duration information after the beacon frame is transmitted.

(22)
The device according to (21),
wherein the communication processing unit stops the communication of the cellular system in the frequency band, excluding the period.

(23)
The device according to (21) or (22),
wherein the communication processing unit transmits the beacon frame at a beacon interval longer than a length of the period.

(24)
The device according to (21) or (22),
wherein the communication processing unit alternately performs transmission of the beacon frame and transmission of another beacon frame at a beacon interval which is substantially the same as a length of the period.

(25)
The device according to any one of (21) to (24),
wherein the communication processing unit transmits information indicating the period or another period in which the communication of the cellular system in the frequency band is stopped to a terminal device performing the communication of the cellular system.

(26)
A device including:
an acquiring unit configured to acquire information indicating a period in which communication of a cellular system is performed in a frequency band shared between the cellular system and a wireless LAN and another period in which the communication of the cellular system in the frequency band is stopped; and
a measurement unit configured to perform measurement on the frequency band based on the information.

(27)
A device including:
an acquiring unit configured to acquire information regarding a first period in which a base station performs communication in a frequency band shared between a cellular system and a wireless LAN or a second period in which the base station stops the communication in the frequency band; and
a communication processing unit configured to notify an access point of the wireless LAN supporting a PCF operation of the first or second period.
(28)
The device according to (27),
wherein each of the first and second periods is a periodically repeated period.
(29)
A device including:
an acquiring unit configured to acquire information regarding a first period in which a base station performs communication in a frequency band shared between a cellular system and a wireless LAN and a second period in which the base station stops the communication in the frequency band; and
a communication processing unit configured to transmit a beacon frame in the frequency band in tune with starting of the first or second period,
wherein the beacon frame includes a parameter which is a parameter regarding a CFP for a PCF operation and includes duration information for setting an NAV
(30)
The device according to (29),
wherein each of the first and second periods is a periodically repeated period.
(31)
The device according to (29) or (30),
wherein the communication processing unit transmits the beacon frame in the frequency band in tune with starting of one of first and second periods at a beacon interval which is substantially the same as a sum of a length of the first period and a length of the second period.
(32)
The device according to (29) or (30),
wherein the first and second periods have substantially the same length, and
the communication processing unit transmits the beacon frame in the frequency band in tune with starting of each of the first and second periods at a beacon interval which is substantially the same as a length of each of the first and second periods.
(33)
The device according to any one of (1) to (12), (21) to (25), (27), and (28),
wherein the device is a base station of the cellular system, a base station device for the base station, or a module for the base station device.
(34)
The device according to any one of (17) to (19) and (26),
wherein the device is a terminal device or a module for the terminal device.
(35)
The device according to any one of (13) to (16) and (20),
wherein the device is a wireless LAN node or a module for the wireless LAN node.
(36)
The device according to any one of (29) to (32),
wherein the device is an access point of the wireless LAN or a module for the access point.

(37)
A method including:
performing, by a processor, communication of a cellular system in a frequency band shared between the cellular system and a wireless LAN within a first period; and
stopping, by the processor, the communication of the cellular system in the frequency band within a second period,
wherein the first period is one or more subframes including a subframe in which a synchronization signal of the cellular system is transmitted, and
the second period is one or more other subframes not including the subframe in which the synchronization signal is transmitted.
(38)
A program causing a processor to execute:
performing communication of a cellular system in a frequency band shared between the cellular system and a wireless LAN within a first period; and
stopping the communication of the cellular system in the frequency band within a second period,
wherein the first period is one or more subframes including a subframe in which a synchronization signal of the cellular system is transmitted, and
the second period is one or more other subframes not including the subframe in which the synchronization signal is transmitted.
(39)
A readable recording medium having a program recorded thereon, the program causing a processor to execute:
performing communication of a cellular system in a frequency band shared between the cellular system and a wireless LAN within a first period; and
stopping the communication of the cellular system in the frequency band within a second period,
wherein the first period is one or more subframes including a subframe in which a synchronization signal of the cellular system is transmitted, and
the second period is one or more other subframes not including the subframe in which the synchronization signal is transmitted.
(40)
A method including:
acquiring, by a processor, information regarding a first period in which communication of a cellular system is performed in a frequency band shared between the cellular system and a wireless LAN or a second period in which the communication of the cellular system in the frequency band is stopped; and
transmitting, by the processor, a wireless LAN frame in the frequency band in tune with starting of the first or second period,
wherein the wireless LAN frame includes duration information for setting an NAV.
(41)
A program causing a processor to execute:
acquiring information regarding a first period in which communication of a cellular system is performed in a frequency band shared between the cellular system and a wireless LAN or a second period in which the communication of the cellular system in the frequency band is stopped; and
transmitting a wireless LAN frame in the frequency band in tune with starting of the first or second period,
wherein the wireless LAN frame includes duration information for setting an NAV.

(42)

A readable recording medium having a program recorded thereon, the program causing a processor to execute:

acquiring information regarding a first period in which communication of a cellular system is performed in a frequency band shared between the cellular system and a wireless LAN or a second period in which the communication of the cellular system in the frequency band is stopped; and transmitting a wireless LAN frame in the frequency band in tune with starting of the first or second period, wherein the wireless LAN frame includes duration information for setting an NAV (43)

A method including:

acquiring, by a processor, information indicating a first period in which communication of a cellular system is performed in a frequency band shared between the cellular system and a wireless LAN or a second period in which the communication of the cellular system in the frequency band is stopped; and performing, by the processor, measurement on the frequency band based on the information, wherein the first period is one or more subframes including a subframe in which a synchronization signal of the cellular system is transmitted, and the second period is one or more other subframes not including the subframe in which the synchronization signal is transmitted.

(44)

A program causing a processor to execute:

acquiring information indicating a first period in which communication of a cellular system is performed in a frequency band shared between the cellular system and a wireless LAN or a second period in which the communication of the cellular system in the frequency band is stopped; and performing measurement on the frequency band based on the information, wherein the first period is one or more subframes including a subframe in which a synchronization signal of the cellular system is transmitted, and the second period is one or more other subframes not including the subframe in which the synchronization signal is transmitted.

(45)

A readable recording medium having a program recorded thereon, the program causing a processor to execute:

acquiring information indicating a first period in which communication of a cellular system is performed in a frequency band shared between the cellular system and a wireless LAN or a second period in which the communication of the cellular system in the frequency band is stopped; and performing measurement on the frequency band based on the information, wherein the first period is one or more subframes including a subframe in which a synchronization signal of the cellular system is transmitted, and the second period is one or more other subframes not including the subframe in which the synchronization signal is transmitted.

(46)

A method including:

acquiring, by a processor, duration information included in a wireless LAN frame according to reception of the wireless LAN frame transmitted by a base station of a cellular system in a frequency band shared between the cellular system and a wireless LAN; and setting, by the processor, an NAV of the frequency band based on the duration information.

(47)

A program causing a processor to execute:

acquiring duration information included in a wireless LAN frame according to reception of the wireless LAN frame transmitted by a base station of a cellular system in a frequency band shared between the cellular system and a wireless LAN; and setting an NAV of the frequency band based on the duration information.

(48)

A readable recording medium having a program recorded thereon, the program causing a processor to execute:

acquiring duration information included in a wireless LAN frame according to reception of the wireless LAN frame transmitted by a base station of a cellular system in a frequency band shared between the cellular system and a wireless LAN; and setting an NAV of the frequency band based on the duration information.

(49)

A method including:

transmitting, by a processor, a beacon frame in a frequency band shared between a cellular system and a wireless LAN, wherein the beacon frame includes a parameter which is a parameter regarding a CFP for a PCF operation and includes duration information for setting an NAV, and the method further includes performing communication of the cellular system in the frequency band within a period corresponding to the duration information after the beacon frame is transmitted.

(50)

A program causing a processor to execute:

transmitting a beacon frame in a frequency band shared between a cellular system and a wireless LAN, wherein the beacon frame includes a parameter which is a parameter regarding a CFP for a PCF operation and includes duration information for setting an NAV, and the program further causes the processor to execute performing communication of the cellular system in the frequency band within a period corresponding to the duration information after the beacon frame is transmitted.

(51)

A readable recording medium having a program recorded thereon, the program causing a processor to execute:

transmitting a beacon frame in a frequency band shared between a cellular system and a wireless LAN, wherein the beacon frame includes a parameter which is a parameter regarding a CFP for a PCF operation and includes duration information for setting an NAV, and the program further causes the processor to execute performing communication of the cellular system in the frequency band within a period corresponding to the duration information after the beacon frame is transmitted.

(52)

A method including:

acquiring, by a processor, information indicating a period in which communication of a cellular system is performed in a frequency band shared between the cellular system and a wireless LAN and another period in which the communication of the cellular system in the frequency band is stopped; and performing, by the processor, measurement on the frequency band based on the information.

(53)

A program causing a processor to execute:

acquiring information indicating a period in which communication of a cellular system is performed in a frequency band shared between the cellular system and a wireless LAN and another period in which the communication of the cellular system in the frequency band is stopped; and performing measurement on the frequency band based on the information.

(54)

A readable recording medium having a program recorded thereon, the program causing a processor to execute:

acquiring information indicating a period in which communication of a cellular system is performed in a frequency band shared between the cellular system and a wireless LAN and another period in which the communication of the cellular system in the frequency band is stopped; and performing measurement on the frequency band based on the information.

(55)

A method including:

acquiring, by a processor, information regarding a first period in which a base station performs communication in a frequency band shared between a cellular system and a wireless LAN or a second period in which the base station stops the communication in the frequency band; and notifying, by the processor, an access point of the wireless LAN supporting a PCF operation of the first or second period.

(56)

A program causing a processor to execute:

acquiring information regarding a first period in which a base station performs communication in a frequency band shared between a cellular system and a wireless LAN or a second period in which the base station stops the communication in the frequency band; and notifying an access point of the wireless LAN supporting a PCF operation of the first or second period.

(57)

A readable recording medium having a program recorded thereon, the program causing a processor to execute:

acquiring information regarding a first period in which a base station performs communication in a frequency band shared between a cellular system and a wireless LAN or a second period in which the base station stops the communication in the frequency band; and notifying an access point of the wireless LAN supporting a PCF operation of the first or second period.

(58)

A method including:

acquiring, by a processor, information regarding a first period in which a base station performs communication in a frequency band shared between a cellular system and a wireless LAN and a second period in which the base station stops the communication in the frequency band; and transmitting, by the processor, a beacon frame in the frequency band in tune with starting of the first or second period, wherein the beacon frame includes a parameter which is a parameter regarding a CFP for a PCF operation and includes duration information for setting an NAV.

(59)

A program causing a processor to execute:

acquiring information regarding a first period in which a base station performs communication in a frequency band shared between a cellular system and a wireless LAN and a second period in which the base station stops the communication in the frequency band; and transmitting a beacon frame in the frequency band in tune with starting of the first or second period, wherein the beacon frame includes a parameter which is a parameter regarding a CFP for a PCF operation and includes duration information for setting an NAV.

(60)

A readable recording medium having a program recorded thereon, the program causing a processor to execute:

acquiring information regarding a first period in which a base station performs communication in a frequency band shared between a cellular system and a wireless LAN and a second period in which the base station stops the communication in the frequency band; and transmitting a beacon frame in the frequency band in tune with starting of the first or second period, wherein the beacon frame includes a parameter which is a parameter regarding a CFP for a PCF operation and includes duration information for setting an NAV.

REFERENCE SIGNS LIST 1 system
21, 53, 63 execution period
23, 55, 67 stop period
31, 51 beacon frame
35, 61 first beacon frame
39, 65 second beacon frame
100 base station
151 information acquiring unit
153 communication processing unit
200 terminal device
241 information acquiring unit
243 measurement unit
245 communication processing unit
300 access point
351 information acquiring unit
353 communication processing unit
400 station
441 information acquiring unit
443 communication processing unit

The invention claimed is:

1. A device comprising:

circuitry configured to perform communication of a cellular system in a frequency band shared between the cellular system and a wireless local area network (LAN) within a first period and stop the communication of the cellular system in the frequency band within a second period, wherein the first period is one or more subframes including a subframe in which a synchronization signal of the cellular system is transmitted, the second period is one or more other subframes not including the subframe in which the synchronization signal is transmitted, the circuitry transmits a wireless LAN frame in the frequency band in tune with starting of the first period, the wireless LAN frame includes duration information which is duration information for setting a network allocation vector (NAV) and indicates a duration corresponding to a length of the first period, and the wireless LAN frame is a beacon frame including a parameter regarding a control free period (CFP) for a point control function (PCF) operation, and the parameter includes the duration information.

2. The device according to claim 1,
wherein the one or more subframes are subframes including a predetermined subframe number, and
the one or more other subframes are subframes including another predetermined subframe number.

3. The device according to claim 1,
wherein each of the first and second periods is a period repeated at a cycle of a radio frame.

4. The device according to claim 1,
wherein the wireless LAN frame is a request to send (RTS) frame or a clear to send (CTS) frame.

5. The device according to claim 1,
wherein the circuitry transmits the wireless LAN frame in the frequency band at a radio frame interval.

6. The device according to claim 1,
wherein the circuitry notifies a wireless LAN node of the first or second period.

7. The device according to claim 6,
wherein the wireless LAN node is an access point that supports a point control function (PCF) operation.

8. The device according to claim 1,
wherein the circuitry transmits information indicating the first or second period to a terminal device that performs the communication of the cellular system.

9. The device according to claim 1,
wherein the circuitry uses the one or more other subframes as multimedia broadcast multicast service (MSMB) over single frequency network (MBSFN) subframes.

10. The device according to claim 1,
wherein the frequency band is a channel of the wireless LAN.

11. A device comprising:
circuitry configured to
acquire information regarding a first period in which communication of a cellular system is performed in a frequency band shared between the cellular system and a wireless local area network (LAN) or a second period in which the communication of the cellular system in the frequency band is stopped; and
transmit a wireless LAN frame in the frequency band in tune with starting of the first or second period,
wherein the wireless LAN frame includes duration information for setting a network allocation vector (NAV), and
the circuitry transmits the wireless LAN frame in the frequency band in tune with starting of the second period,
the wireless LAN frame is a beacon frame including a parameter regarding a control free period (CFP) for a point control function (PCF) operation,
the parameter includes the duration information, and
the duration information indicates a duration corresponding to a length of the second period.

12. The device according to claim 11,
wherein the first period is one or more subframes including a subframe in which a synchronization signal of the cellular system is transmitted, and
the second period is one or more other subframes not including the subframe in which the synchronization signal is transmitted.

13. The device according to claim 11,
wherein the circuitry transmits the wireless LAN frame in the frequency band in tune with starting of the first period, and
the duration information indicates a duration corresponding to a length of the first period.

* * * * *